(12) United States Patent
Gupta et al.

(10) Patent No.: US 9,273,417 B2
(45) Date of Patent: Mar. 1, 2016

(54) WET-LAID PROCESS TO PRODUCE A BOUND NONWOVEN ARTICLE

(75) Inventors: Rakesh Kumar Gupta, Kingsport, TN (US); Melvin Glenn Mitchell, Penrose, NC (US); Daniel William Klosiewicz, Kingsport, TN (US); Mark Dwight Clark, Kingsport, TN (US); Chris Delbert Anderson, Perrysburg, OH (US); Marvin Lynn Mitchell, Parker, CO (US); Paula Hines Mitchell, Parker, CO (US); Amber Layne Wolfe, Landrum, SC (US)

(73) Assignee: Eastman Chemical Company, Kingsport, TN (US)

( * ) Notice: Subject to any disclaimer, the term of this patent is extended or adjusted under 35 U.S.C. 154(b) by 200 days.

(21) Appl. No.: 13/273,937

(22) Filed: Oct. 14, 2011

(65) Prior Publication Data

US 2012/0181720 A1     Jul. 19, 2012

Related U.S. Application Data

(60) Provisional application No. 61/405,312, filed on Oct. 21, 2010.

(51) Int. Cl.

| | |
|---|---|
| *D04H 1/4391* | (2012.01) |
| *D04H 1/587* | (2012.01) |
| *D04H 1/74* | (2006.01) |
| *D04H 1/435* | (2012.01) |
| *D21H 13/00* | (2006.01) |

(Continued)

(52) U.S. Cl.
CPC ............ *D04H 1/4391* (2013.01); *D04H 1/435* (2013.01); *D04H 1/587* (2013.01); *D04H 1/74* (2013.01); *D21H 13/00* (2013.01); *D21H 13/24* (2013.01); *D21H 21/18* (2013.01); *C08G 63/6886* (2013.01); *D01D 5/36* (2013.01); *D01F 8/14* (2013.01); *D01F 11/06* (2013.01); *Y10T 442/2008* (2015.04); *Y10T 442/608* (2015.04)

(58) Field of Classification Search
None
See application file for complete search history.

(56) References Cited

U.S. PATENT DOCUMENTS

| | | | |
|---|---|---|---|
| 1,814,155 | A | 7/1931 | Haughey |
| 2,862,251 | A | 12/1958 | Kalwaites |

(Continued)

FOREIGN PATENT DOCUMENTS

| | | |
|---|---|---|
| CA | 1290517 | 10/1991 |
| CN | 1824867 A | 8/2006 |

(Continued)

OTHER PUBLICATIONS

Polymer Blends, vols. 1 and 2, Edited by D. R. Paul and C. B. Bucknell, 2000, John Wiley & Sons, Inc. (Do Not Cite).

(Continued)

*Primary Examiner* — Benjamin Schiffman
(74) *Attorney, Agent, or Firm* — Polly C. Owen

(57) ABSTRACT

A versatile binder comprising at least one or more sulfopolyesters is provided. These sulfopolyester binders can enhance the dry tensile strength, wet tensile strength, tear force, and burst strength of the nonwoven articles in which they are incorporated. Additionally, the water permeability of these binders can be modified as desired by blending different types of sulfopolyesters to produce the binder. Therefore, the binder can be used in a wide array of nonwoven end products and can be modified accordingly based on the desired properties sought in the nonwoven products.

20 Claims, 2 Drawing Sheets

US 9,273,417 B2

Page 2

(51) Int. Cl.
*D21H 13/24* (2006.01)
*D21H 21/18* (2006.01)
D01F 8/14 (2006.01)
D01F 11/06 (2006.01)
D01D 5/36 (2006.01)
C08G 63/688 (2006.01)

(56) References Cited

U.S. PATENT DOCUMENTS

| | | |
|---|---|---|
| 2,999,788 A | 9/1961 | Morgan |
| 3,018,272 A | 1/1962 | Griffing et al. |
| 3,033,822 A | 5/1962 | Kibler et al. |
| 3,049,469 A | 8/1962 | Davison et al. |
| 3,075,952 A | 1/1963 | Coover et al. |
| 3,372,084 A | 3/1968 | Hanns |
| 3,485,706 A | 12/1969 | Evans |
| 3,528,947 A | 9/1970 | Lappin et al. |
| 3,556,932 A | 1/1971 | Coscia et al. |
| 3,592,796 A | 7/1971 | Trapasso et al. |
| 3,772,076 A | 11/1973 | Keim |
| 3,779,993 A | 12/1973 | Kibler et al. |
| 3,783,093 A | 1/1974 | Gallacher et al. |
| 3,803,210 A | 4/1974 | Rod et al. |
| 3,833,457 A | 9/1974 | Misumi et al. |
| 3,846,507 A | 11/1974 | Thomm et al. |
| 3,985,502 A | 10/1976 | Boorujy et al. |
| 3,998,740 A | 12/1976 | Bost et al. |
| 4,008,344 A | 2/1977 | Okamoto et al. |
| 4,073,777 A | 2/1978 | O'Neill et al. |
| 4,073,988 A | 2/1978 | Nishida et al. |
| 4,100,324 A | 7/1978 | Anderson et al. |
| 4,104,262 A | 8/1978 | Schade |
| 4,121,966 A | 10/1978 | Amano et al. |
| 4,127,696 A | 11/1978 | Okamoto |
| 4,137,393 A | 1/1979 | Sidebotham et al. |
| 4,145,469 A | 3/1979 | Newkirk et al. |
| 4,226,672 A | 10/1980 | Absolon et al. |
| 4,233,355 A | 11/1980 | Sato et al. |
| 4,234,652 A | 11/1980 | Vanoni et al. |
| 4,239,720 A | 12/1980 | Gerlach et al. |
| 4,240,918 A | 12/1980 | Lagasse et al. |
| 4,243,480 A | 1/1981 | Hernandez et al. |
| 4,288,503 A | 9/1981 | Goldberg |
| 4,297,412 A | 10/1981 | Achard et al. |
| 4,299,654 A | 11/1981 | Tlach et al. |
| 4,302,495 A | 11/1981 | Marra |
| 4,304,901 A | 12/1981 | O'Neill et al. |
| 4,342,801 A | 8/1982 | Gerlach et al. |
| 4,350,006 A | 9/1982 | Okamoto et al. |
| 4,365,041 A | 12/1982 | Okamoto et al. |
| 4,381,335 A | 4/1983 | Okamoto |
| 4,410,579 A | 10/1983 | Johns |
| 4,427,557 A | 1/1984 | Stockburger |
| 4,460,649 A | 7/1984 | Park et al. |
| 4,480,085 A | 10/1984 | Larson |
| 4,496,619 A | 1/1985 | Okamoto |
| 4,517,715 A | 5/1985 | Yoshida et al. |
| 4,552,909 A | 11/1985 | Czerwinski et al. |
| 4,569,343 A | 2/1986 | Kimura et al. |
| 4,618,524 A | 10/1986 | Groitzsch et al. |
| 4,647,497 A | 3/1987 | Weeks |
| 4,652,341 A | 3/1987 | Prior |
| 4,699,845 A | 10/1987 | Oikawa et al. |
| 4,738,785 A | 4/1988 | Langston et al. |
| 4,755,421 A | 7/1988 | Manning et al. |
| 4,795,668 A | 1/1989 | Krueger et al. |
| 4,804,719 A | 2/1989 | Weaver et al. |
| 4,810,775 A | 3/1989 | Bendix et al. |
| 4,863,785 A | 9/1989 | Berman et al. |
| 4,873,273 A | 10/1989 | Allan et al. |
| 4,910,292 A | 3/1990 | Blount |
| 4,921,899 A | 5/1990 | Phan et al. |
| 4,940,744 A | 7/1990 | Tortorici et al. |
| 4,943,477 A | 7/1990 | Kanamura et al. |
| 4,946,932 A | 8/1990 | Jenkins |
| 4,966,808 A | 10/1990 | Kawano |
| 4,973,656 A | 11/1990 | Blount |
| 4,990,593 A | 2/1991 | Blount |
| 4,996,252 A | 2/1991 | Phan et al. |
| 5,006,598 A | 4/1991 | Adams et al. |
| 5,039,339 A | 8/1991 | Phan et al. |
| 5,057,368 A | 10/1991 | Largman et al. |
| 5,069,970 A | 12/1991 | Largman et al. |
| 5,073,436 A | 12/1991 | Antonacci et al. |
| 5,108,820 A | 4/1992 | Kaneko et al. |
| 5,124,194 A | 6/1992 | Kawano |
| 5,158,844 A | 10/1992 | Hagens et al. |
| 5,162,074 A | 11/1992 | Hills |
| 5,162,399 A | 11/1992 | Sharma et al. |
| 5,171,767 A | 12/1992 | Buckley et al. |
| 5,176,952 A | 1/1993 | Joseph et al. |
| 5,218,042 A | 6/1993 | Kuo et al. |
| 5,242,640 A | 9/1993 | Butler et al. |
| 5,254,399 A | 10/1993 | Oku et al. |
| 5,258,220 A | 11/1993 | Joseph |
| 5,262,460 A | 11/1993 | Suzuki et al. |
| 5,274,025 A | 12/1993 | Stockl et al. |
| 5,277,976 A | 1/1994 | Hogle et al. |
| 5,281,306 A | 1/1994 | Kakiuchi et al. |
| 5,286,843 A | 2/1994 | Wood |
| 5,290,626 A | 3/1994 | Nishioi et al. |
| 5,290,631 A | 3/1994 | Fleury et al. |
| 5,290,654 A | 3/1994 | Sacripante et al. |
| 5,292,075 A | 3/1994 | Bartlett |
| 5,292,581 A | 3/1994 | Viazmensky et al. |
| 5,292,855 A | 3/1994 | Krutak et al. |
| 5,296,286 A | 3/1994 | Allen et al. |
| 5,308,697 A | 5/1994 | Muramoto et al. |
| 5,336,552 A | 8/1994 | Strack et al. |
| 5,338,406 A | 8/1994 | Smith |
| 5,342,863 A | 8/1994 | Buckley et al. |
| 5,366,804 A | 11/1994 | Dugan |
| 5,368,928 A | 11/1994 | Okamura et al. |
| 5,369,210 A | 11/1994 | George et al. |
| 5,369,211 A | 11/1994 | George et al. |
| 5,374,357 A | 12/1994 | Comstock et al. |
| 5,375,306 A | 12/1994 | Roussin-Moynier |
| 5,378,757 A | 1/1995 | Blount, Jr. et al. |
| 5,382,400 A | 1/1995 | Pike et al. |
| 5,386,003 A | 1/1995 | Greene et al. |
| 5,389,068 A | 2/1995 | Keck |
| 5,395,693 A | 3/1995 | Cho et al. |
| 5,405,698 A | 4/1995 | Dugan |
| 5,416,156 A | 5/1995 | Kamen |
| 5,423,432 A | 6/1995 | Krutak et al. |
| 5,431,994 A | 7/1995 | Kozulla |
| 5,446,079 A | 8/1995 | Buchanan et al. |
| 5,449,464 A | 9/1995 | El-Shall |
| 5,456,982 A | 10/1995 | Hansen et al. |
| 5,466,410 A | 11/1995 | Hills |
| 5,466,518 A | 11/1995 | Isaac et al. |
| 5,468,536 A | 11/1995 | Whitcomb et al. |
| 5,472,600 A | 12/1995 | Ellefson et al. |
| 5,482,772 A | 1/1996 | Strack et al. |
| 5,486,418 A | 1/1996 | Ohmory et al. |
| 5,496,627 A | 3/1996 | Bagrodia et al. |
| 5,498,468 A | 3/1996 | Blaney |
| 5,502,091 A | 3/1996 | Dasgupta |
| 5,508,101 A | 4/1996 | Patnode et al. |
| 5,509,913 A | 4/1996 | Yeo |
| 5,525,282 A | 6/1996 | Dugan |
| 5,530,059 A | 6/1996 | Blount, Jr. et al. |
| 5,536,811 A | 7/1996 | Wood |
| 5,543,488 A | 8/1996 | Miller et al. |
| 5,545,481 A | 8/1996 | Harrington |
| 5,552,495 A | 9/1996 | Miller et al. |
| 5,559,171 A | 9/1996 | Buchanan et al. |
| 5,559,205 A | 9/1996 | Hansen et al. |
| 5,567,510 A | 10/1996 | Patnode et al. |
| 5,571,620 A | 11/1996 | George et al. |
| 5,575,918 A | 11/1996 | Virnig et al. |
| 5,580,911 A | 12/1996 | Buchanan et al. |
| 5,593,778 A | 1/1997 | Kondo et al. |

(56) References Cited

U.S. PATENT DOCUMENTS

| | | |
|---|---|---|
| 5,593,807 A | 1/1997 | Sacripante et al. |
| 5,599,858 A | 2/1997 | Buchanan et al. |
| 5,605,746 A | 2/1997 | Groeger et al. |
| 5,607,491 A | 3/1997 | Jackson et al. |
| 5,607,765 A | 3/1997 | Hansen et al. |
| 5,620,785 A | 4/1997 | Watt et al. |
| 5,630,972 A | 5/1997 | Patnode et al. |
| 5,635,071 A | 6/1997 | Al-Samadi |
| 5,637,385 A | 6/1997 | Mizuki et al. |
| 5,643,662 A | 7/1997 | Yeo et al. |
| 5,646,237 A | 7/1997 | George et al. |
| 5,652,048 A | 7/1997 | Haynes et al. |
| 5,654,086 A | 8/1997 | Nishijima et al. |
| 5,658,704 A | 8/1997 | Patel et al. |
| 5,660,965 A | 8/1997 | Mychajlowskij et al. |
| 5,672,415 A | 9/1997 | Sawyer et al. |
| 5,688,582 A | 11/1997 | Nagaoka et al. |
| 5,698,331 A | 12/1997 | Matsumura et al. |
| 5,709,940 A | 1/1998 | George et al. |
| 5,736,083 A | 4/1998 | Dugan |
| 5,750,605 A | 5/1998 | Blumenthal et al. |
| 5,753,351 A | 5/1998 | Yoshida et al. |
| 5,759,926 A | 6/1998 | Pike et al. |
| 5,762,758 A | 6/1998 | Hoffman |
| 5,763,065 A | 6/1998 | Patnode et al. |
| 5,779,736 A | 7/1998 | Frederick et al. |
| 5,783,503 A | 7/1998 | Gillespie et al. |
| 5,785,725 A | 7/1998 | Cusick et al. |
| 5,798,078 A | 8/1998 | Myers |
| 5,817,740 A | 10/1998 | Anderson et al. |
| 5,820,982 A | 10/1998 | Salsman |
| 5,837,658 A | 11/1998 | Stork |
| 5,843,311 A | 12/1998 | Richter et al. |
| 5,853,701 A | 12/1998 | George et al. |
| 5,853,944 A | 12/1998 | Foucher et al. |
| 5,871,845 A | 2/1999 | Dahringer et al. |
| 5,883,181 A | 3/1999 | Cicchiello et al. |
| 5,888,916 A | 3/1999 | Tadokoro et al. |
| 5,895,710 A | 4/1999 | Sasse et al. |
| 5,916,678 A | 6/1999 | Jackson et al. |
| 5,916,687 A | 6/1999 | Takanashi et al. |
| 5,916,725 A | 6/1999 | Patel et al. |
| 5,916,935 A | 6/1999 | Wiggins et al. |
| 5,935,880 A | 8/1999 | Wang et al. |
| 5,935,883 A | 8/1999 | Pike |
| 5,935,884 A | 8/1999 | Williams et al. |
| 5,948,710 A | 9/1999 | Pomplun et al. |
| 5,952,251 A | 9/1999 | Jackson et al. |
| 5,954,967 A | 9/1999 | Egraz et al. |
| 5,970,583 A | 10/1999 | Groten et al. |
| 5,976,694 A | 11/1999 | Tsai et al. |
| 5,993,668 A | 11/1999 | Duan |
| 5,993,834 A | 11/1999 | Shah et al. |
| 6,004,673 A | 12/1999 | Nishijima |
| 6,007,910 A | 12/1999 | Miller et al. |
| 6,020,420 A | 2/2000 | George |
| 6,037,055 A | 3/2000 | Aneja et al. |
| 6,057,388 A | 5/2000 | Wiggins et al. |
| 6,080,471 A | 6/2000 | Shigematsu et al. |
| 6,090,731 A | 7/2000 | Pike et al. |
| 6,110,249 A | 8/2000 | Medcalf et al. |
| 6,110,588 A | 8/2000 | Perez et al. |
| 6,110,636 A | 8/2000 | Foucher et al. |
| 6,114,407 A | 9/2000 | Myers |
| 6,120,889 A | 9/2000 | Turner et al. |
| 6,121,170 A | 9/2000 | Tsai et al. |
| 6,162,340 A | 12/2000 | Zakikhani |
| 6,162,890 A | 12/2000 | George et al. |
| 6,168,719 B1 | 1/2001 | Shimokawa et al. |
| 6,171,685 B1 | 1/2001 | George et al. |
| 6,174,602 B1 | 1/2001 | Matsui et al. |
| 6,177,193 B1 | 1/2001 | Tsai et al. |
| 6,177,607 B1 | 1/2001 | Blaney et al. |
| 6,183,648 B1 | 2/2001 | Kozak et al. |
| 6,200,669 B1 | 3/2001 | Marmon et al. |
| 6,211,309 B1 | 4/2001 | McIntosh et al. |
| 6,218,321 B1 | 4/2001 | Lorcks et al. |
| 6,225,243 B1 | 5/2001 | Austin |
| 6,235,392 B1 | 5/2001 | Luo et al. |
| 6,248,809 B1 | 6/2001 | Buckley et al. |
| 6,294,645 B1 | 9/2001 | Allen et al. |
| 6,296,933 B1 | 10/2001 | Goda et al. |
| 6,300,306 B1 | 10/2001 | Firkins et al. |
| 6,316,592 B1 | 11/2001 | Bates et al. |
| 6,322,887 B1 | 11/2001 | Matsui et al. |
| 6,331,606 B1 | 12/2001 | Sun |
| 6,332,994 B1 | 12/2001 | Karageorgiou |
| 6,335,092 B1 | 1/2002 | Takeda et al. |
| 6,348,679 B1 | 2/2002 | Ryan et al. |
| 6,352,948 B1 | 3/2002 | Pike et al. |
| 6,355,137 B1 | 3/2002 | Staib |
| 6,361,784 B1 | 3/2002 | Brennan et al. |
| 6,365,697 B1 | 4/2002 | Kim et al. |
| 6,369,136 B2 | 4/2002 | Sorriero et al. |
| 6,381,817 B1 | 5/2002 | Moody, III |
| 6,384,108 B1 | 5/2002 | Breton et al. |
| 6,402,870 B1 | 6/2002 | Groten et al. |
| 6,403,677 B1 | 6/2002 | Walker |
| 6,417,251 B1 | 7/2002 | Brady |
| 6,420,024 B1 | 7/2002 | Perez et al. |
| 6,420,027 B2 | 7/2002 | Kimura et al. |
| 6,428,900 B1 | 8/2002 | Wang |
| 6,429,253 B1 | 8/2002 | Guerro et al. |
| 6,430,348 B1 | 8/2002 | Asano et al. |
| 6,432,532 B2 | 8/2002 | Perez et al. |
| 6,432,850 B1 | 8/2002 | Takagi et al. |
| 6,436,855 B1 | 8/2002 | Iwata et al. |
| 6,440,556 B2 | 8/2002 | Matsui et al. |
| 6,441,267 B1 | 8/2002 | Dugan |
| 6,471,910 B1 | 10/2002 | Haggard et al. |
| 6,488,731 B2 | 12/2002 | Schultheiss et al. |
| 6,506,853 B2 | 1/2003 | Duan |
| 6,509,092 B1 | 1/2003 | Dugan |
| 6,512,024 B1 | 1/2003 | Thumma et al. |
| 6,533,938 B1 | 3/2003 | Dilorio et al. |
| 6,541,175 B1 | 4/2003 | Jiang et al. |
| 6,548,592 B1 | 4/2003 | Mumick et al. |
| 6,550,622 B2 | 4/2003 | Koslow |
| 6,551,353 B1 | 4/2003 | Baker et al. |
| 6,552,123 B1 | 4/2003 | Katayama et al. |
| 6,552,162 B1 | 4/2003 | Wang et al. |
| 6,554,881 B1 | 4/2003 | Healey |
| 6,573,204 B1 | 6/2003 | Philipp et al. |
| 6,576,716 B1 | 6/2003 | Wo |
| 6,579,466 B1 | 6/2003 | David et al. |
| 6,583,075 B1 | 6/2003 | Dugan |
| 6,586,529 B2 | 7/2003 | Mumick et al. |
| 6,589,426 B1 | 7/2003 | Husain et al. |
| 6,602,386 B1 | 8/2003 | Takeuchi et al. |
| 6,602,955 B2 | 8/2003 | Johnson et al. |
| H002086 H | 10/2003 | Amsler |
| 6,638,677 B2 | 10/2003 | Patel et al. |
| 6,657,017 B2 | 12/2003 | Wo et al. |
| 6,664,437 B2 | 12/2003 | Sawyer et al. |
| 6,692,825 B2 | 2/2004 | Qin et al. |
| 6,706,652 B2 | 3/2004 | Groten et al. |
| 6,720,063 B2 | 4/2004 | Kobayashi et al. |
| 6,730,387 B2 | 5/2004 | Rezai et al. |
| 6,743,506 B2 | 6/2004 | Bond et al. |
| 6,746,766 B2 | 6/2004 | Bond et al. |
| 6,746,779 B2 | 6/2004 | Hayes et al. |
| 6,759,124 B2 | 7/2004 | Royer et al. |
| 6,764,802 B2 | 7/2004 | Maric et al. |
| 6,767,498 B1 | 7/2004 | Talley, Jr. et al. |
| 6,776,858 B2 | 8/2004 | Bansal et al. |
| 6,780,560 B2 | 8/2004 | Farrugia et al. |
| 6,780,942 B2 | 8/2004 | Leon et al. |
| 6,787,245 B1 | 9/2004 | Hayes |
| 6,787,425 B1 | 9/2004 | Rotondaro et al. |
| 6,815,382 B1 | 11/2004 | Groten et al. |
| 6,821,672 B2 | 11/2004 | Zguris |
| 6,838,172 B2 | 1/2005 | Yoon et al. |
| 6,838,403 B2 | 1/2005 | Tsai et al. |
| 6,841,038 B2 | 1/2005 | Horenziak et al. |

(56) References Cited

U.S. PATENT DOCUMENTS

| | | |
|---|---|---|
| 6,844,062 B2 | 1/2005 | Matsui et al. |
| 6,844,063 B2 | 1/2005 | Matsui et al. |
| 6,849,329 B2 | 2/2005 | Perez et al. |
| 6,855,422 B2 | 2/2005 | Magill et al. |
| 6,860,906 B2 | 3/2005 | Malisz et al. |
| 6,861,142 B1 | 3/2005 | Wilkie et al. |
| 6,890,649 B2 | 5/2005 | Hobbs et al. |
| 6,893,711 B2 | 5/2005 | Williamson et al. |
| 6,900,148 B2 | 5/2005 | Yoneda et al. |
| 6,902,796 B2 | 6/2005 | Morell et al. |
| 6,946,506 B2 | 9/2005 | Bond et al. |
| 6,949,288 B2 | 9/2005 | Hodge et al. |
| 6,953,622 B2 | 10/2005 | Tsai et al. |
| 6,989,193 B2 | 1/2006 | Haile et al. |
| 6,989,194 B2 | 1/2006 | Bansal et al. |
| 7,008,485 B2 | 3/2006 | Heikkila et al. |
| 7,011,653 B2 | 3/2006 | Imsangjan et al. |
| 7,011,885 B2 | 3/2006 | Chang et al. |
| 7,014,803 B2 | 3/2006 | Perez et al. |
| 7,022,201 B2 | 4/2006 | Anderson et al. |
| 7,025,885 B2 | 4/2006 | Cote et al. |
| 7,026,033 B2 | 4/2006 | Fujimori et al. |
| 7,070,695 B2 | 7/2006 | Husain et al. |
| 7,087,301 B2 | 8/2006 | Musgrave et al. |
| 7,091,140 B1 | 8/2006 | Ferencz et al. |
| 7,097,904 B2 | 8/2006 | Ochi et al. |
| 7,112,389 B1 | 9/2006 | Arora et al. |
| 7,144,614 B2 | 12/2006 | Nakajima et al. |
| 7,160,612 B2 | 1/2007 | Magill et al. |
| 7,163,744 B2 | 1/2007 | Nightingale et al. |
| 7,166,225 B2 | 1/2007 | Pitt et al. |
| 7,179,376 B2 | 2/2007 | Kaleem et al. |
| 7,186,343 B2 | 3/2007 | Rabie et al. |
| 7,186,344 B2 | 3/2007 | Hughes |
| 7,193,029 B2 | 3/2007 | Hayes |
| 7,194,788 B2 | 3/2007 | Clark et al. |
| 7,195,814 B2 | 3/2007 | Ista et al. |
| 7,214,765 B2 | 5/2007 | Ringeisen et al. |
| 7,220,815 B2 | 5/2007 | Hayes |
| 7,238,415 B2 | 7/2007 | Rodriguez et al. |
| 7,238,423 B2 | 7/2007 | Calhoun et al. |
| 7,241,497 B2 | 7/2007 | Magill et al. |
| 7,276,139 B2 | 10/2007 | Katai et al. |
| 7,285,209 B2 | 10/2007 | Yu et al. |
| 7,291,270 B2 | 11/2007 | Gibson et al. |
| 7,291,389 B1 | 11/2007 | Bitler et al. |
| 7,304,125 B2 | 12/2007 | Ibar |
| 7,306,735 B2 | 12/2007 | Baggott et al. |
| 7,309,372 B2 | 12/2007 | Kahlbaugh et al. |
| 7,314,497 B2 | 1/2008 | Kahlbaugh et al. |
| 7,329,723 B2 | 2/2008 | Jernigan et al. |
| 7,338,664 B2 | 3/2008 | Tseng et al. |
| 7,344,775 B2 | 3/2008 | Stevens et al. |
| 7,347,947 B2 | 3/2008 | Nakamura et al. |
| 7,357,985 B2 | 4/2008 | Kurian et al. |
| 7,358,022 B2 | 4/2008 | Farrugia et al. |
| 7,358,323 B2 | 4/2008 | Maeda et al. |
| 7,358,325 B2 | 4/2008 | Hayes |
| 7,361,700 B2 | 4/2008 | Sunamori et al. |
| 7,365,118 B2 | 4/2008 | McCleskey et al. |
| 7,371,701 B2 | 5/2008 | Inagaki |
| 7,387,976 B2 | 6/2008 | Baba et al. |
| 7,388,058 B2 | 6/2008 | Kaku et al. |
| 7,405,171 B2 | 7/2008 | Tsujiyama et al. |
| 7,405,266 B2 | 7/2008 | Bentley et al. |
| 7,407,514 B2 | 8/2008 | Li et al. |
| 7,432,219 B2 | 10/2008 | Strandqvist et al. |
| 7,442,277 B2 | 10/2008 | Küpper et al. |
| 7,462,386 B2 | 12/2008 | Yamasaki et al. |
| 7,497,895 B2 | 3/2009 | Sabottke |
| 7,513,004 B2 | 4/2009 | Luckman et al. |
| 7,544,444 B2 | 6/2009 | Adachi et al. |
| 7,560,159 B2 | 7/2009 | Goda et al. |
| 7,576,019 B2 | 8/2009 | Bond et al. |
| 7,588,688 B2 | 9/2009 | Butters et al. |
| 7,622,188 B2 | 11/2009 | Kamiyama et al. |
| 7,635,745 B2 | 12/2009 | Gupta et al. |
| 7,655,070 B1 | 2/2010 | Dallas et al. |
| 7,666,500 B2 | 2/2010 | Magill et al. |
| 7,666,502 B2 | 2/2010 | Magill et al. |
| 7,666,504 B2 | 2/2010 | Ochi et al. |
| 7,674,510 B2 | 3/2010 | Kamiya |
| 7,687,143 B2 | 3/2010 | Gupta et al. |
| 7,695,812 B2 | 4/2010 | Peng et al. |
| 7,696,111 B2 | 4/2010 | Mangold et al. |
| 7,704,595 B2 | 4/2010 | Morin |
| 7,718,104 B2 | 5/2010 | MacDonald et al. |
| 7,727,627 B2 | 6/2010 | Sen et al. |
| 7,732,357 B2 | 6/2010 | Annis et al. |
| 7,732,557 B2 | 6/2010 | Phelps et al. |
| 7,736,737 B2 | 6/2010 | Van Dun et al. |
| 7,737,060 B2 | 6/2010 | Strickler et al. |
| 7,744,807 B2 | 6/2010 | Berrigan et al. |
| 7,754,123 B2 | 7/2010 | Verdegan et al. |
| 7,757,811 B2 | 7/2010 | Fox et al. |
| 7,765,647 B2 | 8/2010 | Smith et al. |
| 7,772,456 B2 | 8/2010 | Zhang et al. |
| 7,820,568 B2 | 10/2010 | Horiguchi et al. |
| 7,837,814 B2 | 11/2010 | Minami et al. |
| 7,858,732 B2 | 12/2010 | Bruchmann et al. |
| 7,883,604 B2 | 2/2011 | Dyer et al. |
| 7,884,037 B2 | 2/2011 | Sirovatka et al. |
| 7,887,526 B2 | 2/2011 | Van Gompel et al. |
| 7,892,672 B2 | 2/2011 | Nishikawa |
| 7,892,992 B2 | 2/2011 | Kamada et al. |
| 7,892,993 B2 | 2/2011 | Gupta et al. |
| 7,896,940 B2 | 3/2011 | Sundet et al. |
| 7,897,078 B2 | 3/2011 | Petersen et al. |
| 7,897,248 B2 | 3/2011 | Barrera et al. |
| 7,902,094 B2 | 3/2011 | Haile et al. |
| 7,902,096 B2 | 3/2011 | Brandner et al. |
| 7,910,207 B2 | 3/2011 | Kamiyama et al. |
| 7,914,866 B2 | 3/2011 | Shannon et al. |
| 7,918,313 B2 | 4/2011 | Gross et al. |
| 7,919,419 B2 | 4/2011 | Hurley et al. |
| 7,922,959 B2 | 4/2011 | Jones et al. |
| 7,923,143 B2 | 4/2011 | Tanaka et al. |
| 7,928,025 B2 | 4/2011 | Shipley et al. |
| 7,931,457 B2 | 4/2011 | Johnson et al. |
| 7,932,192 B2 | 4/2011 | Fujisawa et al. |
| 7,935,645 B2 | 5/2011 | Pourdeyhimi et al. |
| 7,947,142 B2 | 5/2011 | Fox et al. |
| 7,947,864 B2 | 5/2011 | Damay et al. |
| 7,951,313 B2 | 5/2011 | Matsubayashi et al. |
| 7,951,452 B2 | 5/2011 | Nakayama et al. |
| 7,959,848 B2 | 6/2011 | Reneker et al. |
| 8,021,457 B2 | 9/2011 | Dema et al. |
| 8,057,567 B2 | 11/2011 | Webb et al. |
| 8,129,019 B2 | 3/2012 | Pourdeyhimi et al. |
| 8,148,278 B2 | 4/2012 | Gupta et al. |
| 8,158,244 B2 | 4/2012 | Gupta et al. |
| 8,163,385 B2 | 4/2012 | Gupta et al. |
| 8,178,199 B2 | 5/2012 | Gupta et al. |
| 8,216,953 B2 | 7/2012 | Haile et al. |
| 8,227,362 B2 | 7/2012 | Haile et al. |
| 8,236,713 B2 | 8/2012 | Haile et al. |
| 8,247,335 B2 | 8/2012 | Haile et al. |
| 8,257,628 B2 | 9/2012 | Gupta et al. |
| 8,262,958 B2 | 9/2012 | Haile et al. |
| 8,273,451 B2 | 9/2012 | Gupta et al. |
| 8,277,706 B2 | 10/2012 | Gupta et al. |
| 8,314,041 B2 | 11/2012 | Gupta et al. |
| 8,388,877 B2 | 3/2013 | Gupta et al. |
| 8,398,907 B2 | 3/2013 | Gupta et al. |
| 8,435,908 B2 | 5/2013 | Haile et al. |
| 8,444,895 B2 | 5/2013 | Haile et al. |
| 8,444,896 B2 | 5/2013 | Haile et al. |
| 8,465,565 B2 | 6/2013 | Calis et al. |
| 8,512,519 B2 | 8/2013 | Gupta et al. |
| 8,513,147 B2 | 8/2013 | Gupta et al. |
| 8,557,374 B2 | 10/2013 | Gupta et al. |
| 8,613,363 B2 | 12/2013 | Koslow |
| 8,623,247 B2 | 1/2014 | Haile et al. |
| 8,871,052 B2 | 10/2014 | Parker et al. |

(56) References Cited

U.S. PATENT DOCUMENTS

| | | |
|---|---|---|
| 8,980,774 B2 | 3/2015 | Zhang et al. |
| 2002/0009590 A1 | 1/2002 | Matsui et al. |
| 2002/0030016 A1 | 3/2002 | Schmidt |
| 2002/0079121 A1 | 6/2002 | Ryan et al. |
| 2002/0090876 A1 | 7/2002 | Takase et al. |
| 2002/0106510 A1 | 8/2002 | Deguchi et al. |
| 2002/0123290 A1 | 9/2002 | Tsai et al. |
| 2002/0127937 A1 | 9/2002 | Lange et al. |
| 2002/0127939 A1 | 9/2002 | Hwo et al. |
| 2002/0146552 A1 | 10/2002 | Mumick et al. |
| 2002/0187329 A1 | 12/2002 | Ista et al. |
| 2003/0026986 A1 | 2/2003 | Matsui et al. |
| 2003/0057155 A1 | 3/2003 | Husain et al. |
| 2003/0077444 A1 | 4/2003 | Bond et al. |
| 2003/0091822 A1 | 5/2003 | Bond et al. |
| 2003/0092343 A1 | 5/2003 | Bond et al. |
| 2003/0104204 A1 | 6/2003 | Bond et al. |
| 2003/0111763 A1 | 6/2003 | Jen |
| 2003/0166370 A1 | 9/2003 | Harris et al. |
| 2003/0166371 A1 | 9/2003 | Fingal et al. |
| 2003/0168191 A1 | 9/2003 | Hansen et al. |
| 2003/0176132 A1 | 9/2003 | Moriyasu et al. |
| 2003/0194558 A1 | 10/2003 | Anderson |
| 2003/0196955 A1 | 10/2003 | Hughes |
| 2004/0054331 A1 | 3/2004 | Hamilton et al. |
| 2004/0081829 A1 | 4/2004 | Klier et al. |
| 2004/0157037 A1 | 8/2004 | Yamaguchi et al. |
| 2004/0194558 A1 | 10/2004 | Nagase |
| 2004/0209058 A1 | 10/2004 | Chou et al. |
| 2004/0211729 A1 | 10/2004 | Sunkara et al. |
| 2004/0214495 A1 | 10/2004 | Foss et al. |
| 2004/0242106 A1 | 12/2004 | Rabasco et al. |
| 2004/0242838 A1 | 12/2004 | Duan |
| 2004/0258910 A1 | 12/2004 | Haile et al. |
| 2004/0260034 A1 | 12/2004 | Haile et al. |
| 2005/0026527 A1 | 2/2005 | Schmidt et al. |
| 2005/0027098 A1 | 2/2005 | Hayes |
| 2005/0032450 A1 | 2/2005 | Haggard et al. |
| 2005/0079781 A1 | 4/2005 | Tsujimoto et al. |
| 2005/0115902 A1 | 6/2005 | Kaleem et al. |
| 2005/0125908 A1 | 6/2005 | Pourdeyhimi |
| 2005/0148261 A1 | 7/2005 | Close et al. |
| 2005/0171250 A1 | 8/2005 | Hayes |
| 2005/0208300 A1 | 9/2005 | Magill et al. |
| 2005/0215157 A1 | 9/2005 | Dugan et al. |
| 2005/0221709 A1 | 10/2005 | Jordan et al. |
| 2005/0222956 A1 | 10/2005 | Bristow et al. |
| 2005/0227068 A1 | 10/2005 | Dugan |
| 2005/0239359 A1 | 10/2005 | Jones et al. |
| 2005/0282008 A1 | 12/2005 | Haile et al. |
| 2005/0287895 A1 | 12/2005 | Bansal |
| 2006/0011544 A1 | 1/2006 | Sharma et al. |
| 2006/0019570 A1 | 1/2006 | Groten et al. |
| 2006/0021938 A1 | 2/2006 | Diallo |
| 2006/0030230 A1 | 2/2006 | Nagaoka et al. |
| 2006/0035556 A1 | 2/2006 | Yokoi et al. |
| 2006/0049386 A1 | 3/2006 | Kody et al. |
| 2006/0051575 A1 | 3/2006 | Yoon et al. |
| 2006/0057350 A1 | 3/2006 | Ochi et al. |
| 2006/0057373 A1 | 3/2006 | Inagaki et al. |
| 2006/0060529 A1 | 3/2006 | Cote et al. |
| 2006/0065600 A1 | 3/2006 | Sunkara et al. |
| 2006/0081330 A1 | 4/2006 | Minami et al. |
| 2006/0083917 A1 | 4/2006 | Dugan |
| 2006/0093814 A1 | 5/2006 | Chang |
| 2006/0093819 A1 | 5/2006 | Atwood et al. |
| 2006/0113033 A1 | 6/2006 | Bruner |
| 2006/0128247 A1 | 6/2006 | Skoog et al. |
| 2006/0135020 A1 | 6/2006 | Weinberg et al. |
| 2006/0147709 A1 | 7/2006 | Mizumura et al. |
| 2006/0155094 A1 | 7/2006 | Meckel et al. |
| 2006/0159918 A1 | 7/2006 | Dugan et al. |
| 2006/0177656 A1 | 8/2006 | Kolmes et al. |
| 2006/0189956 A1 | 8/2006 | Catalan |
| 2006/0194027 A1 | 8/2006 | Pourdeyhimi et al. |
| 2006/0194047 A1 | 8/2006 | Gupta et al. |
| 2006/0204753 A1 | 9/2006 | Simmonds et al. |
| 2006/0210797 A1 | 9/2006 | Masuda et al. |
| 2006/0230731 A1 | 10/2006 | Kalayci et al. |
| 2006/0234049 A1 | 10/2006 | Van Dun et al. |
| 2006/0234050 A1 | 10/2006 | Frankel |
| 2006/0234587 A1 | 10/2006 | Horiguchi et al. |
| 2006/0263601 A1 | 11/2006 | Wang et al. |
| 2006/0281383 A1 | 12/2006 | Schmitt et al. |
| 2007/0009736 A1 | 1/2007 | Chuang et al. |
| 2007/0020453 A1 | 1/2007 | Sen et al. |
| 2007/0021021 A1 | 1/2007 | Verdegan et al. |
| 2007/0031637 A1 | 2/2007 | Anderson |
| 2007/0031668 A1 | 2/2007 | Hietpas et al. |
| 2007/0039889 A1 | 2/2007 | Ashford |
| 2007/0048523 A1 | 3/2007 | Pollet et al. |
| 2007/0056906 A1 | 3/2007 | Kaleem et al. |
| 2007/0062872 A1 | 3/2007 | Parker et al. |
| 2007/0074628 A1 | 4/2007 | Jones et al. |
| 2007/0077427 A1 | 4/2007 | Dugan |
| 2007/0098982 A1 | 5/2007 | Nishida et al. |
| 2007/0102361 A1 | 5/2007 | Kiefer et al. |
| 2007/0110980 A1 | 5/2007 | Shah |
| 2007/0110998 A1 | 5/2007 | Steele et al. |
| 2007/0114177 A1 | 5/2007 | Sabottke |
| 2007/0122613 A1 | 5/2007 | Stevens et al. |
| 2007/0122614 A1 | 5/2007 | Peng et al. |
| 2007/0128404 A1 | 6/2007 | Tung et al. |
| 2007/0167096 A1 | 7/2007 | Scott |
| 2007/0179275 A1 | 8/2007 | Gupta et al. |
| 2007/0182040 A1 | 8/2007 | Suzuki et al. |
| 2007/0190319 A1 | 8/2007 | Kalayci |
| 2007/0232179 A1 | 10/2007 | Polat et al. |
| 2007/0232180 A1 | 10/2007 | Polat et al. |
| 2007/0243377 A1 | 10/2007 | Nishida et al. |
| 2007/0254153 A1 | 11/2007 | Nadkarni et al. |
| 2007/0258935 A1 | 11/2007 | McEntire et al. |
| 2007/0259029 A1 | 11/2007 | McEntire et al. |
| 2007/0259177 A1 | 11/2007 | Gupta et al. |
| 2007/0264520 A1 | 11/2007 | Wood et al. |
| 2007/0278151 A1 | 12/2007 | Musale |
| 2007/0278152 A1 | 12/2007 | Musale |
| 2008/0000836 A1 | 1/2008 | Wang et al. |
| 2008/0003400 A1 | 1/2008 | Tseng |
| 2008/0003905 A1 | 1/2008 | Tseng |
| 2008/0003912 A1 | 1/2008 | Pourdeyhimi et al. |
| 2008/0009574 A1 | 1/2008 | Huenefeld et al. |
| 2008/0009650 A1 | 1/2008 | Sluijmers et al. |
| 2008/0011680 A1 | 1/2008 | Partridge et al. |
| 2008/0038974 A1 | 2/2008 | Eagles |
| 2008/0039540 A1 | 2/2008 | Reitz |
| 2008/0064285 A1 | 3/2008 | Morton et al. |
| 2008/0134652 A1 | 6/2008 | Lim et al. |
| 2008/0152282 A1 | 6/2008 | Ouderkirk et al. |
| 2008/0160278 A1 | 7/2008 | Cheng et al. |
| 2008/0160856 A1 | 7/2008 | Chen et al. |
| 2008/0160859 A1 | 7/2008 | Gupta et al. |
| 2008/0170982 A1 | 7/2008 | Zhang et al. |
| 2008/0188151 A1 | 8/2008 | Yokoi et al. |
| 2008/0207833 A1 | 8/2008 | Bear et al. |
| 2008/0229672 A1 | 9/2008 | Woo et al. |
| 2008/0233850 A1 | 9/2008 | Woo et al. |
| 2008/0245037 A1 | 10/2008 | Rogers et al. |
| 2008/0264586 A1 | 10/2008 | Likitalo et al. |
| 2008/0287026 A1 | 11/2008 | Chakravarty et al. |
| 2008/0305389 A1 | 12/2008 | Arora et al. |
| 2008/0311815 A1 | 12/2008 | Gupta et al. |
| 2009/0025895 A1 | 1/2009 | Cowman |
| 2009/0036015 A1 | 2/2009 | Nhan et al. |
| 2009/0042475 A1 | 2/2009 | Pourdeyhimi |
| 2009/0163449 A1 | 6/2009 | Wempe |
| 2009/0249956 A1 | 10/2009 | Chi et al. |
| 2009/0258182 A1 | 10/2009 | Okamoto et al. |
| 2009/0274862 A1 | 11/2009 | Nakayama et al. |
| 2009/0294435 A1 | 12/2009 | Nhan et al. |
| 2009/0305592 A1 | 12/2009 | Shi et al. |
| 2010/0018660 A1 | 1/2010 | Varnell |
| 2010/0035500 A1 | 2/2010 | Kimura et al. |
| 2010/0044289 A1 | 2/2010 | Koslow |

(56) References Cited

U.S. PATENT DOCUMENTS

| | | |
|---|---|---|
| 2010/0072126 A1 | 3/2010 | Tsujimoto et al. |
| 2010/0112325 A1 | 5/2010 | Iwamoto et al. |
| 2010/0133173 A1 | 6/2010 | Inagaki |
| 2010/0133197 A1 | 6/2010 | Langner |
| 2010/0136312 A1 | 6/2010 | Inagaki |
| 2010/0143717 A1 | 6/2010 | Sakamoto et al. |
| 2010/0143731 A1 | 6/2010 | Dezurik et al. |
| 2010/0173154 A1 | 7/2010 | Shimotsu et al. |
| 2010/0180558 A1 | 7/2010 | Ito et al. |
| 2010/0187712 A1 | 7/2010 | Gupta et al. |
| 2010/0197027 A1 | 8/2010 | Zhang et al. |
| 2010/0200512 A1 | 8/2010 | Chase et al. |
| 2010/0203788 A1 | 8/2010 | Kimura et al. |
| 2010/0247894 A1 | 9/2010 | Beard |
| 2010/0272938 A1 | 10/2010 | Mitchell et al. |
| 2010/0273947 A1 | 10/2010 | Miyauchi et al. |
| 2010/0282682 A1 | 11/2010 | Eaton et al. |
| 2010/0285101 A1 | 11/2010 | Moore et al. |
| 2010/0291213 A1 | 11/2010 | Berrigan et al. |
| 2010/0310921 A1 | 12/2010 | Hayakawa et al. |
| 2011/0020590 A1 | 1/2011 | Yoneda et al. |
| 2011/0030885 A1 | 2/2011 | Anneaux et al. |
| 2011/0033705 A1 | 2/2011 | Komura et al. |
| 2011/0036487 A1 | 2/2011 | Rajala et al. |
| 2011/0039055 A1 | 2/2011 | Fujisawa et al. |
| 2011/0039468 A1 | 2/2011 | Baldwin, Jr. et al. |
| 2011/0040277 A1 | 2/2011 | Rajala et al. |
| 2011/0041471 A1 | 2/2011 | Sebastian et al. |
| 2011/0045042 A1 | 2/2011 | Sasaki et al. |
| 2011/0045231 A1 | 2/2011 | Kajiwara et al. |
| 2011/0045261 A1 | 2/2011 | Sellars |
| 2011/0046461 A1 | 2/2011 | McKenna |
| 2011/0049769 A1 | 3/2011 | Duchoslav et al. |
| 2011/0054429 A1 | 3/2011 | Lademann et al. |
| 2011/0056638 A1 | 3/2011 | Rosset |
| 2011/0059669 A1 | 3/2011 | He et al. |
| 2011/0064928 A1 | 3/2011 | Bonneh |
| 2011/0065573 A1 | 3/2011 | Mceneany et al. |
| 2011/0065871 A1 | 3/2011 | Nagano et al. |
| 2011/0067369 A1 | 3/2011 | Chung et al. |
| 2011/0068507 A1 | 3/2011 | Warren et al. |
| 2011/0074060 A1 | 3/2011 | Angadjivand et al. |
| 2011/0076250 A1 | 3/2011 | Belenkaya et al. |
| 2011/0084028 A1 | 4/2011 | Stanfel et al. |
| 2011/0091761 A1 | 4/2011 | Miller et al. |
| 2011/0094515 A1 | 4/2011 | Duffy |
| 2011/0104493 A1 | 5/2011 | Barnholtz et al. |
| 2011/0114274 A1 | 5/2011 | Takano et al. |
| 2011/0117176 A1 | 5/2011 | Klun et al. |
| 2011/0117353 A1 | 5/2011 | Henshaw et al. |
| 2011/0117439 A1 | 5/2011 | Yamada et al. |
| 2011/0123584 A1 | 5/2011 | Seidling et al. |
| 2011/0124769 A1 | 5/2011 | Moen et al. |
| 2011/0124835 A1 | 5/2011 | De Weijer et al. |
| 2011/0129510 A1 | 6/2011 | Liebmann et al. |
| 2011/0130063 A1 | 6/2011 | Matsubayashi et al. |
| 2011/0139386 A1 | 6/2011 | Gupta et al. |
| 2011/0142900 A1 | 6/2011 | Ohta et al. |
| 2011/0143110 A1 | 6/2011 | Tsuchiya et al. |
| 2011/0147299 A1 | 6/2011 | Stanfel et al. |
| 2011/0171535 A1 | 7/2011 | Ohnishi et al. |
| 2011/0171890 A1 | 7/2011 | Nakayama et al. |
| 2012/0015577 A1 | 1/2012 | Rudman et al. |
| 2012/0175074 A1 | 7/2012 | Gupta et al. |
| 2012/0175298 A1 | 7/2012 | Gupta et al. |
| 2012/0180968 A1 | 7/2012 | Gupta et al. |
| 2012/0181720 A1 | 7/2012 | Gupta et al. |
| 2012/0183861 A1 | 7/2012 | Gupta et al. |
| 2012/0183862 A1 | 7/2012 | Gupta et al. |
| 2012/0184164 A1 | 7/2012 | Gupta et al. |
| 2012/0219756 A1 | 8/2012 | Yoshida et al. |
| 2012/0219766 A1 | 8/2012 | Gupta et al. |
| 2013/0193086 A1 | 8/2013 | Parker et al. |
| 2013/0337712 A1 | 12/2013 | Zhang et al. |
| 2014/0273704 A1 | 9/2014 | Baer et al. |
| 2014/0311694 A1 | 10/2014 | Clark et al. |
| 2014/0311695 A1 | 10/2014 | Clark et al. |

FOREIGN PATENT DOCUMENTS

| | | |
|---|---|---|
| EP | 0028909 A1 | 11/1980 |
| EP | 0 340 763 A1 | 11/1989 |
| EP | 0396771 A1 | 11/1990 |
| EP | 0 610 894 A1 | 8/1994 |
| EP | 0 610 897 A1 | 8/1994 |
| EP | 0 830 466 A1 | 3/1998 |
| EP | 0 836 656 A1 | 4/1998 |
| EP | 0 859 073 A1 | 8/1998 |
| EP | 0 880 909 A1 | 12/1998 |
| EP | 0 666 344 B1 | 9/1999 |
| EP | 1 161 576 A1 | 12/2001 |
| EP | 1 243 675 A1 | 9/2002 |
| EP | 0 645 480 B1 | 11/2002 |
| EP | 0 961 847 B1 | 12/2002 |
| EP | 1359632 A2 | 4/2003 |
| EP | 0 935 682 B1 | 9/2003 |
| EP | 1 416 077 A2 | 5/2004 |
| EP | 1457591 A1 | 9/2004 |
| EP | 0 905 292 B1 | 10/2004 |
| EP | 1538686 A1 | 6/2005 |
| EP | 1 550 746 A1 | 7/2005 |
| EP | 1 322 802 B1 | 8/2005 |
| EP | 1 314 808 B1 | 1/2006 |
| EP | 1252219 B1 | 8/2006 |
| EP | 1 325 184 B1 | 9/2006 |
| EP | 1 715 089 A2 | 10/2006 |
| EP | 1 319 095 B1 | 11/2006 |
| EP | 1 731 634 A | 12/2006 |
| EP | 1 149 195 B1 | 1/2007 |
| EP | 1 412 567 B1 | 1/2007 |
| EP | 1 404 905 B1 | 4/2007 |
| EP | 0 842 310 B1 | 1/2008 |
| EP | 1 894 609 A1 | 3/2008 |
| EP | 1 903 134 A1 | 3/2008 |
| EP | 1 938 883 A1 | 7/2008 |
| EP | 2 082 082 A2 | 7/2009 |
| EP | 1 516 079 B1 | 12/2009 |
| EP | 2 135 984 A1 | 12/2009 |
| EP | 1 224 900 B1 | 6/2010 |
| EP | 2243872 A1 | 10/2010 |
| EP | 2283796 A1 | 2/2011 |
| EP | 2287374 A1 | 2/2011 |
| EP | 1 620 506 B1 | 3/2011 |
| EP | 0847263 B2 | 3/2011 |
| EP | 2292309 A1 | 3/2011 |
| EP | 1474555 B1 | 4/2011 |
| EP | 2308579 A1 | 4/2011 |
| EP | 2311542 A1 | 4/2011 |
| EP | 2311543 A1 | 4/2011 |
| FR | 2654674 A1 | 5/1991 |
| FR | 2867193 A1 | 9/2005 |
| GB | 1073640 | 6/1967 |
| JP | 52-066719 | 6/1977 |
| JP | 58-83046 A | 5/1983 |
| JP | 58174625 A | 10/1983 |
| JP | 58-220818 | 12/1983 |
| JP | 61-047822 | 3/1986 |
| JP | 61-296120 A | 12/1986 |
| JP | 62-078213 | 4/1987 |
| JP | 63-159523 A | 7/1988 |
| JP | S63-227898 A | 9/1988 |
| JP | 01-162825 A | 6/1989 |
| JP | 1-229899 A | 9/1989 |
| JP | 1-272820 A | 10/1989 |
| JP | 1-289838 A | 11/1989 |
| JP | 02-026920 A | 1/1990 |
| JP | 02-210092 A | 8/1990 |
| JP | 3-16378 B2 | 3/1991 |
| JP | 3-180587 A | 8/1991 |
| JP | 04-057918 A | 2/1992 |
| JP | 4327209 A | 11/1992 |
| JP | 5-18334 B2 | 3/1993 |
| JP | 05-263316 | 10/1993 |

(56) References Cited

FOREIGN PATENT DOCUMENTS

| | | |
|---|---|---|
| JP | 1993-263316 A | 10/1993 |
| JP | 5321106 | 12/1993 |
| JP | 6-002221 A | 1/1994 |
| JP | 6-25396 A | 2/1994 |
| JP | 9-77963 A | 3/1997 |
| JP | 9-100397 A | 4/1997 |
| JP | 9-249742 A | 9/1997 |
| JP | 09-291472 | 11/1997 |
| JP | 09-310230 | 12/1997 |
| JP | 2000-95850 | 4/2000 |
| JP | 3131100 B2 | 1/2001 |
| JP | 2001-123335 | 5/2001 |
| JP | 2003-253555 A | 9/2003 |
| JP | 2004-137319 | 5/2004 |
| JP | 2004-137418 A | 5/2004 |
| JP | 2005-002510 | 1/2005 |
| JP | 2005-154450 A | 6/2005 |
| JP | 2006-233365 A | 9/2006 |
| JP | 2007092235 A | 12/2007 |
| JP | 2010-070870 A | 4/2010 |
| JP | 2010-255173 A | 11/2010 |
| JP | 2007-092235 | 12/2010 |
| JP | 4648815 B2 | 3/2011 |
| KR | 2001-0044145 | 6/2001 |
| KR | 531939 B1 | 11/2005 |
| KR | 2011-031744 A | 3/2011 |
| KR | 2011-031746 A | 3/2011 |
| RU | 2414950 C1 | 3/2011 |
| RU | 2414960 C1 | 3/2011 |
| TW | 230212 B | 4/2005 |
| WO | WO 93/07197 A1 | 4/1993 |
| WO | WO 9414885 A1 | 7/1994 |
| WO | WO 94/24218 A | 10/1994 |
| WO | WO 95/03172 A1 | 2/1995 |
| WO | WO 99/47621 A1 | 9/1999 |
| WO | WO 99/48668 | 9/1999 |
| WO | WO 01/66666 A2 | 9/2001 |
| WO | WO 02/060497 A2 | 8/2002 |
| WO | WO 03/069038 A1 | 8/2003 |
| WO | WO 2004/067818 A2 | 8/2004 |
| WO | WO 2004/099314 A1 | 11/2004 |
| WO | WO 2004/113598 A2 | 12/2004 |
| WO | WO 2005/066403 A1 | 7/2005 |
| WO | WO 2005/103354 A1 | 11/2005 |
| WO | WO 2005/103357 A1 | 11/2005 |
| WO | WO 2006/001739 A1 | 1/2006 |
| WO | WO 2006/052732 A2 | 5/2006 |
| WO | WO 2006/098851 A2 | 9/2006 |
| WO | WO 2006/107695 A2 | 10/2006 |
| WO | WO 2007/089423 A2 | 8/2007 |
| WO | WO 2007/112443 A2 | 10/2007 |
| WO | WO 2008/028134 A1 | 3/2008 |
| WO | WO 2008/085332 A2 | 7/2008 |
| WO | WO 2009/024836 A1 | 2/2009 |
| WO | WO 2009/051283 A1 | 4/2009 |
| WO | WO 2009/076401 A1 | 6/2009 |
| WO | WO 2009/088564 A1 | 7/2009 |
| WO | WO 2009/140381 A1 | 11/2009 |
| WO | WO 2009/152349 A1 | 12/2009 |
| WO | WO 2010/114820 A2 | 10/2010 |
| WO | WO 2010/117612 A2 | 10/2010 |
| WO | WO 2010/125239 A2 | 11/2010 |
| WO | WO 2010/140853 A2 | 12/2010 |
| WO | WO 2010/146240 A2 | 12/2010 |
| WO | WO 2011/015709 A1 | 2/2011 |
| WO | WO 2011/018459 A1 | 2/2011 |
| WO | WO 2011/008481 A3 | 3/2011 |
| WO | WO 2011/027732 A1 | 3/2011 |
| WO | WO 2011/028661 A2 | 3/2011 |
| WO | WO 2011/034523 A1 | 3/2011 |
| WO | WO 2011/047966 A1 | 4/2011 |
| WO | WO 2011/049831 A2 | 4/2011 |
| WO | WO 2011/049927 A2 | 4/2011 |
| WO | WO 2011/052173 A1 | 5/2011 |
| WO | WO 2011/054932 A1 | 5/2011 |
| WO | WO 2011/062761 A1 | 5/2011 |
| WO | WO 2011/063372 A2 | 5/2011 |
| WO | WO 2011/066224 A2 | 6/2011 |
| WO | WO 2011/070233 A1 | 6/2011 |
| WO | WO 2011/104427 A1 | 9/2011 |
| WO | WO 2007/025661 A1 | 12/2011 |
| WO | WO 2012/054669 A1 | 4/2012 |
| WO | WO 2012/138552 A2 | 10/2012 |
| WO | WO 2013/116067 A2 | 8/2013 |
| WO | WO 2014/172192 | 10/2014 |

OTHER PUBLICATIONS

Manas-Zloczower and Tadmor, "Mixing and Compounding of Polymers," 1994, Carl Hanser Verlag Publisher, N.Y. (Do Not Cite).
PCT International Search Report dated Feb. 4, 2008 for International Application No. PCT/US2007/001082.
U.S. Appl. No. 11/204,868, filed Aug. 16, 2005, William Alston Haile, et al.; published Dec. 22, 2005 as U.S. 2005-0282008 referenced above.
U.S. Appl. No. 11/344,320, filed Jan. 31, 2006, Rakesh Kumar Gupta, et al.; published Aug. 31, 2006 as U.S. 2006-0194047 referenced above.
U.S. Appl. No. 11/648,953, filed Jan. 3, 2007, Rakesh Kumar Gupta, et al.; published Jul. 3, 2008 as U.S. 2008-0160859 referenced above.
U.S. Appl. No. 08/550,042, filed Oct. 30, 1995, Michael C. Cook.
PCT International Search Report dated Nov. 6, 2008 for International Application No. PCT/US2007/025661.
PCT International Search Report dated Jul. 26, 2007 for International Application No. PCT/US2007/001083.
Office Action with Mail Date of Mar. 30, 2009 for related U.S. Appl. No. 11/204,868.
Office Action with Mail Date of Mar. 26, 2009 for related U.S. Appl. No. 11/344,320.
U.S. Appl. No. 61/172,257, filed Apr. 24, 2009, Rakesh Kumar Gupta, et al.
Lydall Filtration and Separation; "Nonwoven Liquid Filtration Media Construction and Performance"; Accessed from the web: http://wwvv.lydallfiltration.com/tech/documents/Nonwovenliquidfiltration.pdf.
PCT International Search Report dated Jul. 3, 2009 for International Application No. PCT/US2009/001717.
PCT International Search Report dated Feb. 28, 2012 for International Application No. PCT/US2011/056990.
PCT International Search Report dated Feb. 28, 2012 for International Application No. PCT/US2011/056994.
PCT International Search Report dated Feb. 14, 2012 for International Application No. PCT/US2011/056989.
PCT International Search Report dated Feb. 28, 2012 for International Application No. PCT/US2011/056995.
PCT International Search Report dated Feb. 28, 2012 for International Application No. PCT/US2011/056991.
PCT International Search Report dated Feb. 28, 2012 for International Application No. PCT/US2011/057002.
USPTO Notice of Allowance dated Nov. 9, 2009 for copending U.S. Appl. No. 11/648,955.
USPTO Office Action dated Dec. 24, 2009 for copending U.S. Appl. No. 11/344,320.
USPTO Office ACtion dated Dec. 22, 2009 for copending U.S. Appl. No. 11/204,868.
USPTO Notice of Allowance dated Jun. 9, 2010 for copending U.S. Appl. No. 11/344,320.
USPTO Notice of Allowance dated Jun. 9, 2010 for copending U.S. Appl. No. 11/204,868.
USPTO Office Action dated Aug. 6, 2010 for copending U.S. Appl. No. 11/648,953.
USPTO Office Action dated Dec. 21, 2004 for U.S. Appl. No. 10/850,548.
USPTO Notice of Allowance dated Jun. 8, 2005 for U.S. Appl. No. 10/850,548.
DIN STD 54900 (in German, no English translation available).
ASTM D6340-98 (Reapproved 2007) ASTM International, copyright Sep. 15, 2010.

(56) References Cited

OTHER PUBLICATIONS

PCT International Search Report dated Feb. 7, 2005 for International Application No. PCT/US2004/018682.
Copending U.S. Appl. No. 12/765,461, filed Apr. 22, 2010, Rakesh Kumar Gupta, et al.
Smook, G.A., "Handbook for Pulp and Paper Technologist", Angus Wilde Publications, $2^{nd}$ Ed., 1992, pp. 194-195, 211-212.
PCT International Search Report dated Dec. 30, 2008 for International Application No. PCT/US2007/025770.
Ke Qinfei, et al., "Non-woven Science", Donghau University Press, 2004.9, Catalog, P. 115-132 (unavailable).
USPTO Notice of Allowance dated Nov. 9, 2009 for U.S. Appl. No. 11/648,955.
USPTO Office Action dated Sep. 27, 2010 for U.S. Appl. No. 12/199,304.
USPTO Notice of Allowance dated Sep. 30, 2010 for U.S. Appl. No. 11/344,320.
USPTO Notice of Allowance dated Oct. 14, 2010 for U.S. Appl. No. 11/204,868.
Copending U.S. Appl. No. 12/909,574, filed Oct. 21, 2010, Rakesh Kumar Gupta, et al.
Copending U.S. Appl. No. 12/966,483, filed Dec. 13, 2010, William Alston Haile, et al.
Copending U.S. Appl. No. 2/966,487, filed Dec. 13, 2010, William Alston Haile, et al.
Copending U.S. Appl. No. 12/966,494, filed Dec. 13, 2010, William Alston Haile, et al.
Copending U.S. Appl. No. 12/966,502, filed Dec. 13, 2010, William Alston Haile, et al.
Copending U.S. Appl. No. 12/966,507, filed Dec. 13, 2010, William Alston Haile, et al.
Copending U.S. Appl. No. 12/966,512, filed Dec. 13, 2010, William Alston Haile, et al.
Copending U.S. Appl. No. 12/966,518, filed Dec. 13, 2010, William Alston Haile, et al.
Copending U.S. Appl. No. 12/966,521, filed Dec. 13, 2010, William Alston Haile, et al.
Copending U.S. Appl. No. 12/975,443, filed Dec. 22, 2010, Rakesh Kumar Gupta, et al.
Copending U.S. Appl. No. 12/975,447, filed Dec. 22, 2010, Rakesh Kumar Gupta, et al.
Copending U.S. Appl. No. 12/975,450, filed Dec. 22, 2010, Rakesh Kumar Gupta, et al.
Copending U.S. Appl. No. 12/975,452, filed Dec. 22, 2010, Rakesh Kumar Gupta, et al.
Copending U.S. Appl. No. 12/975,456, filed Dec. 22, 2010, Rakesh Kumar Gupta, et al.
Copending U.S. Appl. No. 12/975,459, filed Dec. 22, 2010, Rakesh Kumar Gupta, et al.
Copending U.S. Appl. No. 12/975,463, filed Dec. 22, 2010, Rakesh Kumar Gupta, et al.
Copending U.S. Appl. No. 12/975,482, filed Dec. 22, 2010, Rakesh Kumar Gupta, et al.
Copending U.S. Appl. No. 12/975,484 filed Dec. 22, 2010, Rakesh Kumar Gupta, et al.
Copending U.S. Appl. No. 12/975,487, filed Dec. 22, 2010, Rakesh Kumar Gupta, et al.
Copending U.S. Appl. No. 12/981,950, filed Dec. 30, 2010, William Alston Haile, et al.
Copending U.S. Appl. No. 12/981,960, filed Dec. 30, 2010, William Alston Haile, et al.
Copending U.S. Appl. No. 12/981,982, filed Dec. 30, 2010, William Alston Haile, et al.
Copending U.S. Appl. No. 12/982,001, filed Dec. 30, 2010, William Alston Haile, et al.
New copending U.S. Appl. No. 13/053,615, filed Mar. 22, 2011, Rakesh Kumar Gupta et al.
New copending U.S. Appl. No. 13/352,362, filed Jan. 18, 2012, Rakesh Kumar Gupta et al.
USPTO Notice of Allowance dated Apr. 4, 2011 for copending U.S. Appl. No. 12/199,304.
USPTO Office Action dated Mar. 18, 2011 for copending U.S. Appl. No. 11/648,953.
USPTO Office Action dated Apr. 6, 2011 for copending U.S. Appl. No. 12/975,487.
USPTO Office Action dated Apr. 4, 2011 for copending U.S. Appl. No. 12/981,960.
USPTO Office Action dated Apr. 6, 2011 for copending U.S. Appl. No. 12/975,482.
USPTO Office Action dated Jun. 7, 2011 for copending U.S. Appl. No. 12/982,001.
USPTO Office Action dated Jun. 9, 2011 for copending U.S. Appl. No. 12/975,459.
USPTO Office Action dated May 27, 2011 for copending U.S. Appl. No. 12/975,452.
USPTO Office Action dated Jun. 23, 2011 for copending U.S. Appl. No. 12/966,487.
USPTO Office Action dated Jun. 23, 2011 for copending U.S. Appl. No. 12/966,502.
USPTO Office Action dated May 10, 2012 for copending U.S. Appl. No. 12/966,521.
USPTO Office Action dated Mar. 16, 2012 for copending U.S. Appl. No. 12/966,483.
USPTO Notice of Allowance dated Apr. 2, 2012 for copending U.S. Appl. No. 12/966,502.
USPTO Office Action dated Jun 23, 2011 for copending U.S. Appl. No. 12/975,443.
USPTO Notice of Allowance dated Jul. 18, 2011 for copending U.S. Appl. No. 12/199,304.
USPTO Office Action dated Aug. 10, 2011 for copending U.S. Appl. No. 12/966,512.
USPTO Office Action dated Sep. 15, 2011 for copending U.S. Appl. No. 11/648,953.
USPTO Office Action dated May 3, 2012 for copending U.S. Appl. No. 12/765,461.
USPTO Office Action dated Sep. 8, 2011 for copending U.S. Appl. No. 12/966,494.
USPTO Notice of Allowance dated Apr. 18, 2012 for copending U.S. Appl. No. 12/966,494.
USPTO Office Action dated Sep. 26, 2011 for copending U.S. Appl. No. 12/966,507.
USPTO Office Action dated Apr. 23, 2012 for copending U.S. Appl. No. 12/966,507.
USPTO Office Action dated Sep. 1, 2011 for copending U.S. Appl. No. 12/975,450.
USPTO Office Action dated Aug. 24, 2011 for copending U.S. Appl. No. 12/975,456.
USPTO Office Action dated Apr. 19, 2012 for copending U.S. Appl. No. 12/975,456.
USPTO Office Action dated Sep. 27, 2011 for copending U.S. Appl. No. 12/975,463.
USPTO Office Action dated Apr. 19, 2012 for copending U.S. Appl. No. 12/975,463.
USPTO Office Action dated Aug. 31, 2011 for copending U.S. Appl. No. 13/053,615.
Coons, R., "Eastman Chemical Core Focus Delivers Value," Chemical Week, Aug. 15-22, 2011, pp. 19-22.
USPTO Office Action dated Nov. 10, 2011 for copending U.S. Appl. No. 12/981,950.
USPTO Office Action dated Jan. 25, 2012 for copending U.S. Appl. No. 12/981,982.
USPTO Notice of Allowance dated Jan. 3, 2012 for copending U.S. Appl. No. 12/975,487.
USPTO Notice of Allowance dated Dec. 23, 2011 for copending U.S. Appl. No. 12/975,452.
USPTO Notice of Allowance dated Apr. 2, 2012 for copending U.S. Appl. No. 12/975,452.
USPTO Notice of Allowance dated Dec. 8, 2011 for copending U.S. Appl. No. 12/981,960.
USPTO Notice of Allowance dated Mar. 15, 2012 for copending U.S. Appl. No. 12/981,960.

(56) References Cited

OTHER PUBLICATIONS

USPTO Notice of Allowance dated Dec. 13, 2011 for copending U.S. Appl. No. 12/966,487.
USPTO Notice of Allowance dated Apr. 13, 2012 for copending U.S. Appl. No. 12/966,487.
USPTO Notice of Allowance dated Dec. 12, 2011 for copending U.S. Appl. No. 12/966,502.
USPTO Notice of Allowance dated Dec. 9, 2011 for copending U.S. Appl. No. 12/966,512.
USPTO Notice of Allowance dated Mar. 21, 2012 for copending U.S. Appl. No. 12/966,512.
USPTO Notice of Allowance dated Jan. 9, 2012 for copending U.S. Appl. No. 12/975,482.
USPTO Office Action dated Jan. 30, 2012 for copending U.S. Appl. No. 12/975,443.
USPTO Office Action dated Nov. 10, 2011 for copending U.S. Appl. No. 12/975,484.
USPTO Notice of.Allowance dated Apr. 18, 2012 for copending U.S. Appl. No. 12/975,484.
Provisional U.S. Appl. No. 61/405,306, filed Oct. 21, 2010, Rakesh Kumar Gupta, et al.
Provisional U.S. Appl. No. 61/405,312, filed Oct. 21, 2010, Rakesh Kumar Gupta, et al.
Provisional U.S. Appl. No. 61/588,744, filed Nov. 11, 2011, Clark et al.
Provisional U.S. Appl. No. 61/592,854, filed Jan. 31, 2012, Parker et al.
Provisional U.S. Appl. No. 61/592,867, filed Jan. 31, 2012, Parker et al.
Provisional U.S. Appl. No. 61/592,876, filed Jan. 31, 2012, Parker et al.
Provisional U.S. Appl. No. 61/592,917, filed Jan. 31, 2012, Parker et al.
Provisional U.S. Appl. No. 61/592,974, filed Jan. 31, 2012, Parker et al.
New copending U.S. Appl. No. 13/273,692, filed Oct. 14, 2011, Rakesh Kumar Gupta, et al.
New copending application U.S. Appl. No. 13/273,648, filed Oct. 14, 2011, Rakesh Kumar Gupta, et al.
New copending application U.S. Appl. No. 13/273,710, filed Oct. 14, 2011, Rakesh Kumar Gupta, et al.
New copending application U.S. Appl. No. 13/273,720, filed Oct. 14, 2011, Rakesh Kumar Gupta, et al.
New copending application U.S. Appl. No. 13/273,929, filed Oct. 14, 2011, Rakesh Kumar Gupta, et al.
New copending application U.S. Appl. No. 13/273,727, filed Oct. 14, 2011, Rakesh Kumar Gupta, et al.
New copending application U.S. Appl. No. 13/273,737, filed Oct. 14, 2011, Rakesh Kumar Gupta, et al.
New copending application U.S. Appl. No. 13/273,745, filed Oct. 14, 2011, Rakesh Kumar Gupta, et al.
New copending application U.S. Appl. No. 13/273,749, filed Oct. 14, 2011, Rakesh Kumar Gupta, et al.
New copending application U.S. Appl. No. 13/433,812, filed Mar. 29, 2012, Clark et al.
New copending application U.S. Appl. No. 13/433,854, filed Mar. 29, 2012, Clark et al.
Investigation of the utility of islands-in-the-stream bicomponent fiber technology in the spunbound process. Fedorova, Dec. 2006 (retrieved on Mar. 20, 2012 from internet) pp. 22-23, 74 <URL: http://repository.lib.ncsu.edu/ir/bitstream/1840.16/5145/1/etd.pdf>.
"Choosing the Proper Short Cut Fiber", technical data sheet, MiniFibers, Inc., [online] pp. 1-2, 2006, [retrieved on Feb. 15, 2006], Retrieved from the Inernet: <URL: https://www.minifibers.com/Literature/choosing_fiber.htm>.
USPTO Notice of Allowance dated Feb. 7, 2012 for copending U.S. Appl. No. 12/975,459.
USPTO Notice of Allowance dated Feb. 17, 2012 for copending U.S. Appl. No. 12/982,001.
USPTO Notice of Allowance dated Feb. 21, 2012 for copending U.S. Appl. No. 12/975,450.
USPTO Notice of Allowance dated Feb. 23, 2012 for copending U.S. Appl. No. 13/053,615.
USPTO Office Action dated Nov. 10, 2011 for copending U.S. Appl. No. 12/975,447.
USPTO Office Action dated Mar. 2, 2012 for copending U.S. Appl. No. 12/966,518.
Keith, James M., "Dispersions fo Synthetic Fibers in Wet-Lay Nonwovens". MiniFIBERS, Inc., originally published in the Tappi Journal, vol. 77, No. 6, Jun. 1994, entire document.
Copending U.S. Appl. No. 11/343,955, filed Jan. 31, 2006, Rakesh Kumar Gupta, et al.
USPTO Office Action dated Jan. 25, 2008 for copending U.S. Appl. No. 11/343,955.
USPTO Office Action dated Oct. 10, 2008 for copending U.S. Appl. No. 11/343,955.
USPTO Notice of Allowance dated Mar. 9, 2009 for copending U.S. Appl. No. 11/343,955.
USPTO Notice of Allowance dated Aug. 7, 2009 for copending U.S. Appl. No. 11/343,955.
Copending U.S. Appl. No. 11/648,955, filed Jan. 3, 2007, Rakesh Kumar Gupta, et al.
USPTO Office Action dated May 21, 2012 for copending U.S. Appl. No. 12/981,982.
USPTO Office Action dated Oct. 4, 2012 for copending U.S. Appl. No. 13/273,745.
USPTO Office Action dated Nov. 26, 2012 for copending U.S. Appl. No. 13/273,648.
USPTO Office Action dated Nov. 20, 2012 for copending U.S. Appl. No. 13/273,710.
USPTO Office Action dated Nov. 7, 2012 for copending U.S. Appl. No. 13/273,720.
Database WPI Thomson Scientific, London, GB AN2004/520211 XP002639794 & JP 2004/137418 Dated May 13, 2004—abstract.
USPTO Notice of Allowance dated Jun. 4, 2012 for copending U.S. Appl. No. 12/981,960.
USPTO Notice of Allowance dated Jun. 7, 2012 for copending U.S. Appl. No. 12/966,487.
USPTO Notice of Allowance dated Jun. 11, 2012 for copending U.S. Appl. No. 12/966,512.
USPTO Notice of Allowance dated Jun. 13, 2012 for copending U.S. Appl. No. 12/966,502.
USPTO Notice of Allowance dated Jun. 29, 2012 for copending U.S. Appl. No. 12/981,950.
USPTO Notice of Allowance dated Jul. 3, 2012 for copending U.S. Appl. No. 12/974,452.
USPTO Office Action dated Jul. 5, 2012 for copending U.S. Appl. No. 12/966,507.
USPTO Notice of Allowance dated Jul. 6, 2012 for copending U.S. Appl. No. 12/975,456.
USPTO Notice of Allowance dated Jul. 27, 2012 for copending U.S. Appl. No. 12/981,982.
USPTO Office Action dated Aug. 14, 2012 for copending U.S. Appl. No. 12/199,304.
USPTO Notice of Allowance dated Jul. 19, 2012 for copending U.S. Appl. No. 12/981,950.
USPTO Notice of Allowance dated Aug. 10, 2012 for copending U.S. Appl. No. 12/975,487.
USPTO Notice of Allowance dated Jul. 31, 2012 for copending U.S. Appl. No. 12/975,456.
USPTO Office Action dated Aug. 27, 2012 for copending U.S. Appl. No. 12/975,443.
USPTO Office Action dated Aug. 28, 2012 for copending U.S. Appl. No. 12/975,447.
USPTO Notice of Allowance dated Oct. 11, 2012 for copending U.S. Appl. No. 12/975,487.
USPTO Notice of Allowance dated Oct. 22, 2012 for copending U.S. Appl. No. 12/966,518.
USPTO Notice of Allowance dated Nov. 2, 2012 for copending U.S. Appl. No. 12/966,507.
USPTO Office Action dated Nov. 2, 2012 for copending U.S. Appl. No. 13/273,692.

(56) References Cited

OTHER PUBLICATIONS

USPTO Notice of Allowance dated Dec. 10, 2012 for copending U.S. Appl. No. 12/966,521.
New co-pending U.S. Appl. No. 13/687,466, filed Nov. 28, 2012.
New co-pending U.S. Appl. No. 13/687,472, filed Nov. 28, 2012.
New co-pending U.S. Appl. No. 13/687,478, filed Nov. 28, 2012.
New co-pending U.S. Appl. No. 13/687,493, filed Nov. 28, 2012.
New co-pending U.S. Appl. No. 13/687,505, filed Nov. 28, 2012.
USPTO Office Action dated Dec. 4, 2012 for copending U.S. Appl. No. 13/273,749.
USPTO Notice of Allowance dated Jan. 8, 2013 for copending U.S. Appl. No. 12/966,483.
USPTO Notice of Allowance dated Jan. 10, 2013 for copending U.S. Appl. No. 12/975,447.
USPTO Notice of Allowance dated Jan. 15, 2013 for copending U.S. Appl. No. 12/975,463.
PCT International Search Report dated Jan. 23, 2013 for International Application No. PCT/US2012/064272.
USPTO Notice of Allowance dated Jan. 25, 2013 for copending U.S. Appl. No. 12/966,521.
USPTO Notice of Allowance dated Jan. 28, 2013 for copending U.S. Appl. No. 12/765,461.
USPTO Notice of Allowance dated Apr. 8, 2013 for related U.S. Appl. No. 12/966,483.
USPTO Notice of Allowance dated Apr. 16, 2013 for related U.S. Appl. No. 12/765,461.
USPTO Notice of Allowance dated Mar. 21, 2013 for related U.S. Appl. No. 12/975,482.
USPTO Notice of Allowance dated Mar. 22, 2013 for related U.S. Appl. No. 12/966,518.
PCT International Search Report dated Mar. 27, 2013 for International Application No. PCT/US2013/022832.
PCT International Search Report dated Mar. 27, 2013 for International Application No. PCT/US2013/022834.
PCT International Search Report dated Mar. 27, 2013 for International Application No. PCT/US2013/022835.
PCT International Search Report dated Mar. 27, 2013 for International Application No. PCT/US2013/022838.
PCT International Search Report dated Mar. 29, 2013 for International Application No. PCT/US2013/021804.
CFF Acrylic Pulps/Fibrillated Fibers, Datasheet [Online], Sterling Fibers, Feb. 7, 2011 [retreived Mar. 4, 2013] <URL: http://www.sterlingfibers.com/wetlaid.htm>.
USPTO Notice of Allowance dated May 1, 2013 for related U.S. Appl. No. 12/975,482.
USPTO Notice of Allowance dated Apr. 24, 2013 for related U.S. Appl. No. 12/199,304.
USPTO Notice of Allowance dated Mar. 28, 2013 for related U.S. Appl. No. 12/966,521.
PCT International Search Report dated Mar. 29, 2013 for International Application No. PCT/US2013/022830.
USPTO Office Action dated Jun. 19, 2013 for related U.S. Appl. No. 12/909,574.
New co-pending U.S. Appl. No. 13/941,816, filed Jul. 15, 2013.
USPTO Office Action dated Jul. 19, 2013 for copending U.S. Appl. No. 13/433,854.
USPTO Office Action dated Jul. 22, 2013 for copending U.S. Appl. No. 13/433,812.
USPTO Office Action dated Jul. 30, 2013 for copending U.S. Appl. No. 13/273,749.
USPTO Office Action dated Aug. 19, 2013 for copending U.S. Appl. No. 13/273,745.
Pettersson, Patrick, "Fluid Flow in Wood Fiber Networks," Lulea University of Technology, 2006:34, ISSN: 1402-1757.
USPTO Notice of Allowance dated Sep. 5, 2013 for copending U.S. Appl. No. 12/966,507.
USPTO Office Action dated Sep. 6, 2013 for copending U.S. Appl. No. 12/966,494.
USPTO Office Action dated Sep. 20, 2013 for copending U.S. Appl. No. 13/687,472.
USPTO Office Action dated Sep. 20, 2013 for copending U.S. Appl. No. 13/687,478.
USPTO Office Action dated Sep. 20, 2013 for copending U.S. Appl. No. 13/687,505.
USPTO Office Action dated Sep. 24, 2013 for copending U.S. Appl. No. 13/687,466.
USPTO Office Action dated Sep. 25, 2013 for copending U.S. Appl. No. 13/273,692.
USPTO Office Action dated Sep. 25, 2013 for copending U.S. Appl. No. 13/273,648.
USPTO Office Action dated Sep. 25, 2013 for copending U.S. Appl. No. 13/687,493.
USPTO Office Action dated Oct. 9, 2013 for copending U.S. Appl. No. 13/944,458.
USPTO Notice of Allowance dated Dec. 4, 2013 foc copending U.S. Appl. No. 12/975,484.
New Co-pending U.S. Appl. No. 14/108,389, filed Dec. 17, 2013.
USPTO Office Action dated Dec. 31, 2013 for copending U.S. Appl. No. 13/352,362.
USPTO Notice of Allowance dated Feb. 4, 2014 for copending U.S. Appl. No. 12/975,484.
USPTO Office Action dated Feb. 10, 2014 for copending U.S. Appl. No. 13/433,854.
Extended European Search Report dated Feb. 25, 2014 for Application No./U.S. Pat. No. 11835114.7-1303 / 2630297 PCT/US2011056997.
USPTO Office Action dated Mar. 7, 2014 for copending U.S. Appl. No. 12/966,494.
USPTO Office Action dated Mar. 13, 2014 for copending U.S. Appl. No. 12/909,574.
USPTO Office Action dated Mar. 25, 2014 for copending U.S. Appl. No. 13/273,727.
New Co-pending U.S. Appl. No. 14/249,858, filed Apr. 10, 2014.
New Co-pending U.S. Appl. No. 14/249,868, filed Apr. 10, 2014.
USPTO Office Action dated May 8, 2014 for copending U.S. Appl. No. 13/273,692.
USPTO Office Action dated May 8, 2014 for copending U.S. Appl. No. 13/273,648.
USPTO Notice of Allowance dated May 8, 2014 for copending U.S. Appl. No. 13/687,478.
USPTO Notice of Allowance dated May 13, 2014 for copending U.S. Appl. No. 13/687,472.
USPTO Notice of Allowance dated May 14, 2014 for copending U.S. Appl. No. 13/687,466.
USPTO Notice of Allowance dated May 23, 2014 for copending U.S. Appl. No. 13/687,493.
USPTO Office Action dated Jun. 19, 2014 for copending U.S. Appl. No. 13/671,682.
USPTO Notice of Allowance dated Jun. 19, 2014 for copending U.S. Appl. No. 13/687,505.
USPTO Officce Action dated Jul. 15, 2014 for copending U.S. Appl. No. 13/273,737.
USPTO Office Action dated Jul. 18, 2014 for copending U.S. Appl. No. 13/944,458.
USPTO Office Action dated Aug. 04, 2014 for co-pending U.S. Appl. No. 13/352,362.
Extended European Search Report dated Aug. 6, 2014 for Application No./U.S. Pat. No. 11835104.8-1308 / 2630284 PCT/US2011056984.
Extended European Search Report dated Aug. 6, 2014 for Application No./Patent No. 11835106.3-1308 / 2629950 PCT/US2011056986.
Extended European Search Report dated Aug. 6, 2014 for Application No./Patent No. 11835107.1-1308 / 2630288 PCT/US2011056987.
PCT International Search Report dated Aug. 28, 2014 for International Application No. PCT/US2014/033771.
New Co-pending U.S. Appl. No. 14/490,084, filed Sep. 18, 2014.
USPTO Office Action dated Sep. 26, 2014 for co-pending U.S. Appl. No. 13/273,727.
USPTO Office Action dated Nov. 20, 2014 for co-pending U.S. Appl. No. 14/249,868.

(56) References Cited

OTHER PUBLICATIONS

USPTO Office Action dated Nov. 21, 2014 for co-pending U.S. Appl. No. 14/249,858.
USPTO Office Action dated Dec. 4, 2014 for co-pending U.S. Appl. No. 14/490,084.
USPTO Office Action dated Dec. 15, 2014 for co-pending U.S. Appl. No. 13/433,854.
USPTO Office Action dated Feb. 11, 2015 for co-pending U.S. Appl. No. 13/273,692.
USPTO Office Action dated Feb. 11, 2015 for co-pending U.S. Appl. No. 13/273,648.
Notification of Transmittal of the International Search Report and The Written Opinion of the International Search Report and The Written Opinion of the International Searching Authority, or the Declaration—International Application No. PCT/US2014/069888 with a Mailing Date of Mar. 2, 2015.
USPTO Office Action dated May 4, 2015 for co-pending U.S. Appl. No. 13/352,362.
USPTO Office Action dated Jul. 9, 2015 for co-pending U.S. Appl. No. 13/671,682.
USPTO Notice of Allowance dated Jul. 13, 2015 for co-pending U.S. Appl. No. 14/490,084.
USPTO Office Action dated Jul. 23, 2015 for co-pending U.S. Appl. No. 14/249,858.
USPTO Office Action dated Jul. 23, 2015 for co-pending U.S. Appl. No. 14/249,868.
Extended European Search Report dated Jul. 20, 2015 for Application No./U.S. Pat. No. 12847445.9-1306 / 2776615 PCT/US2012064272.
USPTO Office Action dated Aug. 28, 2015 for co-pending U.S. Appl. No. 13/273,692.
USPTO Office Action dated Aug. 28, 2015 for co-pending U.S. Appl. No. 13/276,648.
USPTO Office Action dated Sep. 11, 2015 for co-pending U.S. Appl. No. 13/273,737.
USPTO Office Action dated Sep. 16, 2015 for co-pending U.S. Appl. No. 13/273,929.
USPTO Office Action dated Sep. 17, 2015 for co-pending U.S. Appl. No. 13/433,854.
USPTO Office Action dated Sep. 29, 2015 for co-pending U.S. Appl. No. 13/941,816.
USPTO Office Action dated Sep. 30, 2015 for co-pending U.S. Appl. No. 13/273,727.

WET-LAID PROCESS TO PRODUCE A BOUND NONWOVEN ARTICLE

RELATED APPLICATIONS

This application claims priority from U.S. Provisional Application Ser. No. 61/405,312, filed on Oct. 21, 2010, the disclosure of which is incorporated herein by reference.

BACKGROUND

1. Field of the Invention

The present invention relates to sulfopolyester binders for use in nonwoven articles.

2. Description of the Related Art

Nonwoven articles are found throughout the consumer marketplace. Nonwoven articles, which are generally made up of microfibers and/or nanofibers, are generally produced using a wet-laid or dry-laid process. Various methods or compositions are generally utilized in order to hold the fibers within a nonwoven article together. For example, it is known that nonwoven articles can be held together by (1) mechanical fiber cohesion and interlocking in a web or mat; (2) various techniques of fusing of fibers, including the use of binder fibers; (3) use of a binding resin; (4) use of powder adhesive binders; and/or (5) combinations thereof. The fibers are often deposited in a random manner, although orientation in one direction is possible, followed by bonding using one of the methods described above.

Unfortunately, many of the methods or compositions mentioned above lack versatility in their methods or properties, thus limiting their application to specific end uses. In addition, many of the binder compositions utilized above lack the ability to be modified in order to fit a wide array of end use products. For example, many binders have a fixed water permeability which cannot be significantly modified without sacrificing the integrity of the binder composition. Thus, these binders are limited in scope to certain nonwoven articles that can utilize their narrow range of water permeability properties.

Accordingly, there is a need for a versatile binder that is capable of being optimized in accordance with the desired end uses of the nonwoven article.

SUMMARY

In one embodiment of the present invention, there is provided a nonwoven article comprising a plurality of thermoplastic polycondensate fibers and a sulfopolyester binder. The thermoplastic polycondensate fibers make up at least 10 weight percent of the total fiber content of the nonwoven article, whereas the sulfopolyester binder makes up at least 1 weight percent and not more than 40 weight percent of the nonwoven article. The nonwoven article further comprises a plurality of synthetic microfibers having a length of less than 25 millimeters and a minimum transverse dimension of less than 5 microns, wherein the synthetic microfibers make up at least 1 weight percent of the nonwoven article.

In another embodiment of the present invention, there is provided a wet-laid process to produce a bound nonwoven article. The first step of the process involves a) producing multicomponent fibers comprising at least one water dispersible sulfopolyester and one or more water non-dispersible polymers immiscible with the sulfopolyester. The multicomponent fibers can have an as-spun denier of less than 15 dpf. The next step b) involves cutting the multicomponent fibers into cut multicomponent fibers having a length of less than 25 millimeters. The next step c) involves contacting the cut multicomponent fibers with water to remove the sulfopolyester thereby forming a wet lap comprising cut water non-dispersible fibers, which are formed of a thermoplastic polycondensate. The next step d) involves transferring the wet lap to a wet-laid nonwoven zone to produce an unbound nonwoven article. The final step e) involves applying a binder dispersion comprising at least one sulfopolyester to the nonwoven article.

BRIEF DESCRIPTION OF THE FIGURES

Embodiments of the present invention are described herein with reference to the following drawing figures, wherein.

DETAILED DESCRIPTION

Figure 1A:
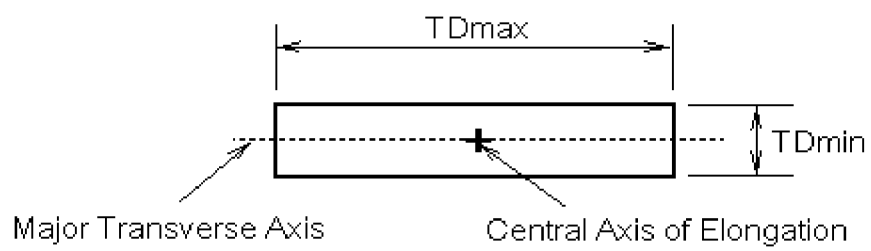
FIGS. 1a, 1b, and 1c are cross-sectional views of three differently-configured fibers, particularly illustrating how various measurements relating to the size and shape of the fibers are determined.

The present invention provides versatile binders comprising at least one sulfopolyester that can increase the strength and integrity of the nonwoven in which it is incorporated.

The binder of the present invention comprises at least one sulfopolyester. The sulfopolyesters utilized in the binders of the present invention can contain substantially equimolar proportions of acid moiety repeating units (100 mole percent) to hydroxy moiety repeating units (100 mole percent). In one embodiment, the sulfopolyesters useful for the binders of the present invention can comprise repeating units of components (a), (b), (c) and (d) as follows, wherein all stated mole percentages are based on the total of all acid and hydroxy moiety repeating units being equal to 200 mole percent:

(a) at least 50, 70, or 80 mole percent and/or not more than 99, 96, or 94 mole percent isophthalic acid, (b) at least 1, 4, or 6 mole percent and/or not more than 50, 30, or 20 mole percent 5-sulfoisophthalic acid, (c) at least 20, 35, or 45 mole percent and/or not more than 95, 85, or 80 mole percent 1,4-cyclohexanedimethanol; and (d) at least 5, 15, or 20 mole percent and/or not more than 80, 65, or 55 mole percent diethylene glycol and/or ethylene glycol.

In one embodiment of the present invention, the binders can comprise a blend of at least a first sulfopolyester and a second sulfopolyester. The first and second sulfopolyesters can comprise different amounts of sulfomonomer, such as 5-sulfoisophthalic acid, and/or different amounts of a hydrophobic glycol, such as 1,4-cyclohexanedimethanol. The amount of sulfomonomers in the sulfopolyesters is important because it greatly influences the water-permeability of the sulfopolyester. In one embodiment, the first sulfopolyester is hydrophilic and the second sulfopolyester is hydrophobic. An example of a hydrophilic sulfopolyester that can be useful as a binder is Eastek 1100® by EASTMAN. Likewise, an example of a hydrophobic sulfopolyester useful as a binder includes Eastek 1200® by EASTMAN. These two sulfopolyesters may be blended accordingly depending on the desired water-permeability of binder. Depending on the desired end use for the nonwoven article, the binder may be either hydrophilic or hydrophobic.

When the binder comprises a blend of at least a first sulfopolyester and a second sulfopolyester, the first sulfopolyester can comprise repeating units of components (a), (b), (c)

and (d) as follows, wherein all stated mole percentages are based on the total of all acid and hydroxy moiety repeating units being equal to 200 mole percent:

(a) at least 70, 75, or 80 mole percent and/or not more than 90, 88, or 86 mole percent isophthalic acid, (b) at least 10, 12, or 16 mole percent and/or not more than 30, 25, or 20 mole percent 5-sulfoisophthalic acid, (c) at least 25, 35, or 45 mole percent and/or not more than 70, 60, or 55 mole percent 1,4-cyclohexanedimethanol; and (d) at least 30, 40, or 45 mole percent and/or not more than 75, 65, or 55 mole percent diethylene glycol and/or ethylene glycol.

Likewise, the second sulfopolyester can comprise repeating units of components (a), (b), (c) and (d) as follows, wherein all stated mole percentages are based on the total of all acid and hydroxy moiety repeating units being equal to 200 mole percent:

(a) at least 80, 85, or 88 mole percent and/or not more than 98, 96, or 93 mole percent isophthalic acid, (b) at least 2, 4, or 7 mole percent and/or not more than 20, 15, or 12 mole percent 5-sulfoisophthalic acid, (c) at least 40, 50, 60 mole percent and/or not more than 95, 85, or 80 mole percent 1,4-cyclohexanedimethanol; and (d) at least 5, 15, or 20 mole percent and/or not more than 50, 40, or 30 mole percent diethylene glycol and/or ethylene glycol.

The use of the sulfopolyester binder of the instant invention may enhance multiple properties of the nonwoven article. For example, when a sulfopolyester binder is utilized, the nonwoven article can exhibit a dry tensile strength greater than 1.5, 2.0, 3.0, or 3.5 kg/15 mm; a wet tensile strength greater than 1.0, 1.5, 2.0, or 2.5 kg/15 mm; a tear force greater than 420, 460, or 500 grams; and/or a burst strength greater than 50, 60, or 70 psig. Furthermore, depending on the nature of the water permeability of the sulfopolyester binder used, the nonwoven article can exhibit a Hercules Size of less than 20, 15, or 10 seconds and/or greater than 5, 50, 100, 120, or 140 seconds.

The sulfopolyester binders of the instant invention exhibit excellent adhesiveness to thermoplastic polycondesate materials. Such thermoplastic polycondensate materials can include polyesters (e.g., polyethylene terephthalate homopolymer, polyethylene terephthalate copolymer, polybutylene terephthalate, and polypropylene terephthalate) and polyamides (e.g., nylon 6 and nylon 66).

The nonwoven articles of the instant invention can comprise a sulfopolyester binder as described above, a plurality of thermoplastic polycondensate fibers, and a plurality synthetic microfibers with a length of at least 0.25, 0.5, or 1.0 millimeters and/or less 25, 10, or 2 millimeters and a minimum transverse dimension of less than 5 microns. In another embodiment, the synthetic microfibers have a length of at least 0.2, 0.5, or 1.0 millimeters and/or less 10, 5, or 2 millimeters and a minimum transverse dimension of less than 5 microns. The thermoplastic polycondensate fibers can make up at least 10, 20, 30, 40, 50, or 60 weight percent of the total fiber content of the nonwoven article, while the sulfopolyester binders can make up at least 1 weight percent and not more than 40 weight percent of the nonwoven article. Typically, the sulfopolyester binder can make up at least 1, 2, 3, 4, 5, or 7 weight percent of the nonwoven article and/or not more than 40, 30, 20, 15, or 12 weight percent of the nonwoven article.

In one embodiment, the synthetic microfibers are formed from a thermoplastic polycondensate material so that the synthetic microfibers make up at least a portion of the thermoplastic polycondensate fibers in the nonwoven article. For instance, the synthetic microfibers can make up at least 5, 10, or 20 weight percent and/or not more than 90, 80, or 70 weight percent of the thermoplastic polycondensate fibers in the nonwoven article. In one embodiment, the synthetic microfibers make up at least 1, 3, 5, 10, or 20 weight percent of the nonwoven article. In another embodiment, the synthetic microfibers can comprise short-cut water non-dispersible microfibers.

Figure 1B:
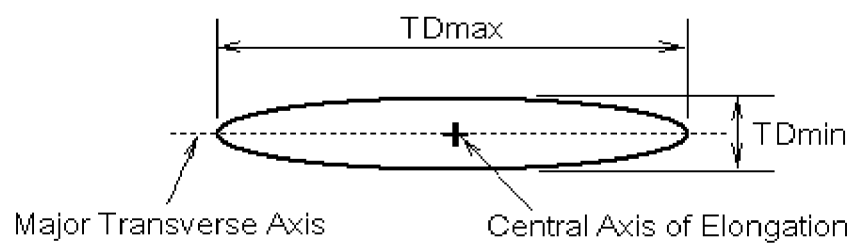
Figure 1C:
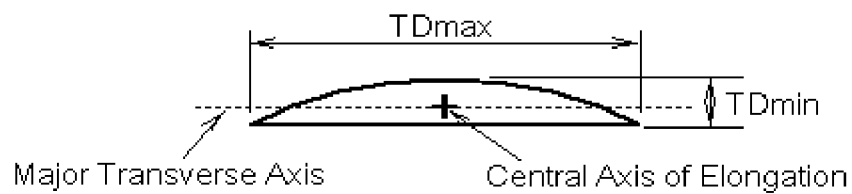

The term "microfiber," as used herein, is intended to denote a fiber having a minimum transverse dimension that is less than 5 microns. As used herein, a "nonwoven article" is defined as a web made directly from fibers without weaving or knitting operations. As used herein, "minimum transverse dimension" denotes the minimum dimension of a fiber measured perpendicular to the axis of elongation of the fiber by an external caliper method. As used herein, "external caliper method" denotes a method of measuring an outer dimension of a fiber where the measured dimension is the distance separating two coplanar parallel lines between which the fiber is located and where each of the parallel lines touches the external surface of the fiber on generally opposite sides of the fiber. FIGS. 1a, 1b, and 1c depict how these dimensions may be measured in various fiber cross-sections. In FIGS. 1a, 1a, and 1c, "TDmin" is the minimum transverse dimension and "TDmax" is the maximum transverse dimension.

The water non-dispersible microfibers also produced by this process comprise at least one water non-dispersible synthetic polymer. Depending on the cross section configuration of the multicomponent fiber from which the microfiber is derived from, the microfiber can have an equivalent diameter of less than 15, 10, 5, or 2 microns; a minimum transverse dimension of less than 5, 4, or 3 microns; an transverse ratio of at least 2:1, 6:1, or 10:1 and/or not more than 100:1, 50:1, or 20:1; and/or a length of at least 0.1, 0.25, 0.5, or 1.0 millimeters and/or not more than 25, 12, 10, 6.5, 5, 3.5, or 2.0 millimeters. All fiber dimensions provided herein (e.g., equivalent diameter, length, minimum transverse dimension, maximum transverse dimension, transverse aspect ratio, and thickness) are the average dimensions of the fibers in the specified group.

The microfibers of the present invention can be advantageous in that they are not formed by fibrillation. Fibrillated microfibers are directly joined to a base member (i.e., the root fiber and/or sheet) and have the same composition as the base member. In one embodiment, less than 50, 20, or 5 weight percent of the microfibers are directly joined to a base member having the same composition as the microfibers.

In particular, the sulfopolyester binders produced from this process may be used to produce a wide variety of nonwoven articles including filter media (e.g., HEPA filters, ULPA filters, coalescent filters, liquid filters, desalination filters, automotive filters, coffee filters, tea bags, and vacuum dust bags), battery separators, personal hygiene articles, sanitary napkins, tampons, diapers, disposable wipes (e.g., automotive wipes, baby wipes, hand and body wipes, floor cleaning wipes, facial wipes, toddler wipes, dusting and polishing wipes, and nail polish removal wipes), flexible packaging (e.g., envelopes, food packages, multiwall bags, and terminally sterilized medical packages), geotextiles (e.g., weed barriers, irrigation barriers, erosion barriers, and seed support media), building and construction materials (e.g., housing envelopes, moisture barrier film, gypsum board, wall paper, asphalt, papers, roofing underlayment, and decorative materials), surgical and medical materials (e.g., surgical drapes and gowns, bone support media, and tissue support media), security papers (e.g., currency paper, gaming and lottery paper, bank notes, and checks), cardboard, recycled cardboard, synthetic leather and suede, automotive headliners, personal protective garments, acoustical media, concrete reinforcement, flexible perform for compression molded composites, electrical materials (e.g., transformer boards, cable wrap and fillers, slot insulations, capacitor papers, and lampshade), catalytic support membranes, thermal insulation, labels, food packaging materials (e.g., aseptic, liquid packaging board, tobacco, release, pouch and packet, grease resistant, ovenable board, cup stock, food wrap, and coated one side), and printing and publishing papers (e.g., water and tear resistant printing paper, trade book, banners, map and chart, opaque, and carbonless). In one embodiment, the nonwoven article is selected from the group consisting of a battery separator, a high efficiency filter, and a high strength paper.

In one embodiment, the nonwoven article can comprise the synthetic microfibers in amount of at least 20, 40, or 50 weight percent and/or not more than 90, 85, or 80 weight percent and the sulfopolyester binder in an amount of at least 1, 2, or 4 weight percent and/or not more than 40, 30, or 20 weight percent. In this embodiment, the nonwoven article may be a battery separator, a high efficiency filter, or a high strength paper.

In one embodiment, the nonwoven article can comprise the synthetic microfibers in amount of at least 1, 3, or 5 weight percent and/or not more than 25, 20, 15, or 10 weight percent and the sulfopolyester binder in an amount of at least 1, 2, or 4 weight percent and/or not more than 40, 30, or 20 weight percent. In this embodiment, the nonwoven article may be a paperboard or cardboard.

In one embodiment of the invention, a process is provided for producing a nonwoven article with the sulfopolyester binder of the present invention. The process can comprise the following steps:

(a) spinning at least one water dispersible sulfopolyester and one or more water non-dispersible synthetic polymers immiscible with the sulfopolyester into multicomponent fibers, wherein the multicomponent fibers have a plurality of domains comprising the water non-dispersible synthetic polymers whereby the domains are substantially isolated from each other by the sulfopolyester intervening between the domains; wherein the multicomponent fiber has an as-spun denier of less than about 15 denier per filament; wherein the water dispersible sulfopolyester exhibits a melt viscosity of less than about 12,000 poise measured at 240° C. at a strain rate of 1 rad/sec; and wherein the sulfopolyester comprises less than about 25 mole percent of residues of at least one sulfomonomer, based on the total moles of diacid or diol residues;

(b) cutting the multicomponent fibers of step a) to a length of less than 25, 10, or 2 millimeters, but greater than 0.1, 0.25, or 0.5 millimeters to produce cut multicomponent fibers;

(c) contacting the cut multicomponent fibers with water to remove the sulfopolyester thereby forming a wet lap of water non-dispersible microfibers comprising the water non-dispersible synthetic polymer;

(d) subjecting the wet lap of water non-dispersible microfibers to a wet-laid process to produce the nonwoven article; and (e) applying a sulfopolyester binder dispersion to the nonwoven article and drying the nonwoven article and binder dispersion thereon.

In another embodiment, the multicomponent fibers in step b are cut to a length of less than 10, 5, or 2 millimeters, but greater than 0.2, 0.5, or 1 millimeter.

In one embodiment of the invention, at least 1, 3, 5, 20, 30, 40, or 50 weight percent and/or not more than 90, 75, 60, 25, 20, 15, or 10 weight percent of the nonwoven article comprises the water non-dispersible microfiber.

The sulfopolyester binder dispersion may be applied to the nonwoven article by any method known in the art. In one embodiment, the binder dispersion is applied as an aqueous dispersion to the nonwoven article by spraying or rolling the binder dispersion onto the nonwoven article. In another embodiment of the invention, the binder dispersion may be mixed with the synthetic microfibers prior to formation of the nonwoven web via a wet-laid nonwoven process. Subsequent to the applying the binder dispersion, the nonwoven article and the binder dispersion can be subjected to a drying step in order to allow the binder to set. Typically, the sulfopolyester binder can make up at least 1, 2, 3, 4, 5, or 7 weight percent of the nonwoven article and/or not more than 40, 30, 20, 15, or 12 weight percent of the nonwoven article.

Undissolved or dried sulfopolyesters are known to form strong adhesive bonds to a wide array of substrates, including, but not limited to fluff pulp, cotton, acrylics, rayon, lyocell, PLA (polylactides), cellulose acetate, cellulose acetate propionate, poly(ethylene) terephthalate, poly(butylene) terephthalate, poly(trimethylene) terephthalate, poly(cyclohexylene) terephthalate, copolyesters, polyamides (e.g., nylons), stainless steel, aluminum, treated polyolefins, PAN (polyacrylonitriles), and polycarbonates. Thus, sulfopolyesters function as excellent binders for the nonwoven article. Therefore, our novel nonwoven articles may have multiple functionalities when a sulfopolyester binder is utilized.

The nonwoven article may further comprise a coating. After the nonwoven article and the binder dispersion are subjected to drying, a coating may be applied to the nonwoven article. The coating can comprise a decorative coating, a printing ink, a barrier coating, an adhesive coating, and a heat seal coating. In another example, the coating can comprise a liquid barrier and/or a microbial barrier.

After producing the nonwoven article, adding the binder, and/or after adding the optional coating, the nonwoven article may undergo a heat setting step comprising heating the nonwoven article to a temperature of at least 100° C., and more preferably to at least about 120° C. The heat setting step relaxes out internal fiber stresses and aids in producing a dimensionally stable fabric product. It is preferred that when the heat set material is reheated to the temperature to which it was heated during the heat setting step that it exhibits surface area shrinkage of less than about 10, 5, or 1 percent of its original surface area. However, if the nonwoven article is subjected to heat setting, then the nonwoven article cannot be repulpable and/or recycled by repulping the nonwoven article after use.

The term "repulpable," as used herein, refers to any nonwoven article that has not been subjected to heat setting and is capable of disintegrating at 3,000 rpm at 1.2 percent consistency after 5,000, 10,000, or 15,000 revolutions according to TAPPI standards.

In another aspect of the invention, the nonwoven article can further comprise at least one or more additional fibers. The additional fibers can have a different composition and/or configuration (e.g., length, minimum transverse dimension, maximum transverse dimension, cross-sectional shape, or combinations thereof) than the synthetic microfibers. In one embodiment of the invention, the other fiber can be selected from the group comprising of thermoplastic polycondensate fibers, cellulosic fiber pulp, inorganic fibers (e.g., glass, carbon, boron, ceramic, and combinations thereof), polyester fibers, nylon fibers, polyolefin fibers, rayon fibers, lyocell fibers, cellulose ester fibers, post consumer recycled fibers, and combinations thereof. The nonwoven article can comprise additional fibers in an amount of at least 10, 15, 20, 25, 30, 40, or 60 weight percent of the nonwoven article and/or not more than 95, 90, 85, 80, 70, 60, or 50 weight percent of the nonwoven article. In one embodiment, the additional fiber is a cellulosic fiber that comprises at least 10, 25, or 40 weight percent and/or no more than 80, 70, 60, or 50 weight percent of the nonwoven article. The cellulosic fibers can comprise hardwood pulp fibers, softwood pulp fibers, and/or regenerated cellulose fibers. In another embodiment, at least one of the additional fibers is a glass fiber that has a minimum transverse dimension of less than 30, 25, 10, 8, 6, 4, 2, or 1 microns.

In one embodiment, a combination of the synthetic microfibers, at least one or more additional fibers, and the sulfopolyester binder make up at least 75, 85, 95, or 98 weight percent of the nonwoven article.

The nonwoven article can further comprise one or more additives. The additives may be added to the wet lap of water non-dispersible microfibers prior to subjecting the wet lap to a wet-laid or dry-laid process. The additives may also be added to the nonwoven article as a component of the binder or coating composition. Additives include, but are not limited to, starches, fillers, light and heat stabilizers, antistatic agents, extrusion aids, dyes, anticounterfeiting markers, slip agents, tougheners, adhesion promoters, oxidative stabilizers, UV absorbers, colorants, pigments, opacifiers (delustrants), optical brighteners, fillers, nucleating agents, plasticizers, viscosity modifiers, surface modifiers, antimicrobials, antifoams, lubricants, thermostabilizers, emulsifiers, disinfectants, cold flow inhibitors, branching agents, oils, waxes, and catalysts. In one embodiment, the non woven web comprises an optical brightener and/or antimicrobials. The nonwoven article can comprise at least 0.05, 0.1, or 0.5 weight percent and/or not more than 10, 5, or 2 weight percent of one or more additives.

In one embodiment of the invention, the short-cut microfibers used to make the nonwoven article are ribbon fibers derived from a multicomponent fiber having a striped configuration. Such ribbon fibers can exhibit a transverse aspect ratio of at least 2:1, 6:1, or 10:1 and/or not more than 100:1, 50:1, or 20:1. As used herein, "transverse aspect ratio" denotes the ratio of a fiber's maximum transverse dimension to the fiber's minimum transverse dimension. As used herein, "maximum transverse dimension" is the maximum dimension of a fiber measured perpendicular to the axis of elongation of the fiber by the external caliper method described above.

Although it its known in the art that fibers having a transverse aspect ratio of 1.5:1 or greater can be produced by fibrillation of a base member (e.g., a sheet or a root fiber), the ribbon fibers provided in accordance with one embodiment of the present invention are not made by fibrillating a sheet or root fiber to produce a "fuzzy" sheet or root fiber having microfibers appended thereto. Rather, in one embodiment of the present invention, less than 50, 20, or 5 weight percent of ribbon fibers employed in the nonwoven article are joined to a base member having the same composition as said ribbon fibers. In one embodiment, the ribbon fibers are derived from striped multi-component fibers having said ribbon fibers as a component thereof.

Figure 2:
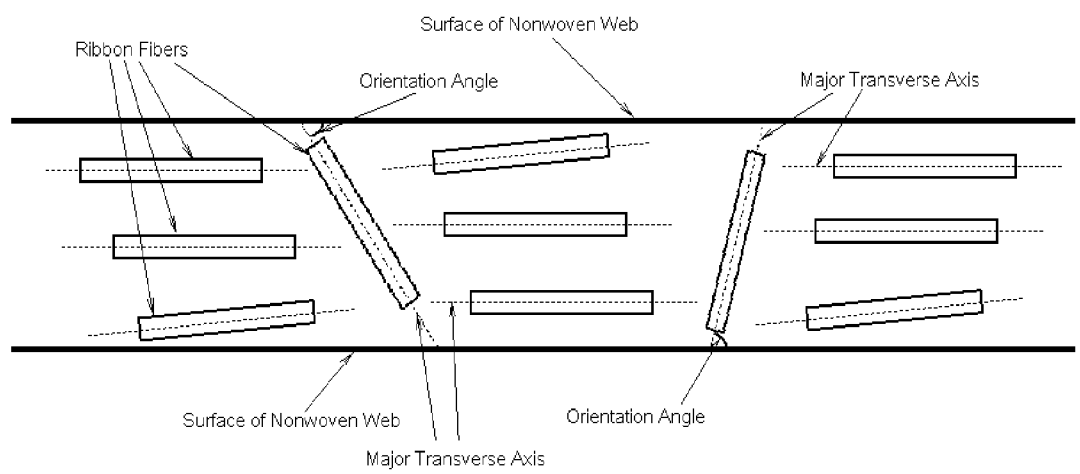
FIG. 2 is a cross-sectional view of nonwoven article containing ribbon fibers, particularly illustrating the orientation of the ribbon fibers contained therein.

When the nonwoven article of the present invention comprises short-cut ribbon fibers, the major transverse axis of at least 50, 75, or 90 weight percent of the ribbon microfibers in the nonwoven article can be oriented at an angle of less than 30, 20, 15, or 10 degrees from the nearest surface of the nonwoven article. As used herein, "major transverse axis" denotes an axis perpendicular to the direction of elongation of a fiber and extending through the centermost two points on the outer surface of the fiber between which the maximum transverse dimension of the fiber is measured by the external caliper method described above. Such orientation of the ribbon fibers in the nonwoven article can be facilitated by enhanced dilution of the fibers in a wet-laid process and/or by mechanically pressing the nonwoven article after its formation. FIG. 2 illustrates how the angle of orientation of the ribbon fibers relative to the major transverse axis is determined.

Generally, manufacturing processes to produce nonwoven articles from water non-dispersible microfibers derived from multicomponent fibers can be split into the following groups: dry-laid webs, wet-laid webs, and combinations of these processes with each other or other nonwoven processes.

Generally, dry-laid nonwoven articles are made with staple fiber processing machinery that is designed to manipulate fibers in a dry state. These include mechanical processes, such as carding, aerodynamic, and other air-laid routes. Also included in this category are nonwoven articles made from filaments in the form of tow, fabrics composed of staple fibers, and stitching filaments or yards (i.e., stitchbonded nonwovens). Carding is the process of disentangling, cleaning, and intermixing fibers to make a web for further processing into a nonwoven article. The process predominantly aligns the fibers which are held together as a web by mechanical entanglement and fiber-fiber friction. Cards (e.g., a roller card) are generally configured with one or more main cylinders, roller or stationary tops, one or more doffers, or various combinations of these principal components. The carding action is the combing or working of the water non-dispersible microfibers between the points of the card on a series of interworking card rollers. Types of cards include roller, woolen, cotton, and random cards. Garnetts can also be used to align these fibers.

The water non-dispersible microfibers in the dry-laid process can also be aligned by air-laying. These fibers are directed by air current onto a collector which can be a flat conveyor or a drum.

Wet laid processes involve the use of papermaking technology to produce nonwoven articles. These nonwoven articles are made with machinery associated with pulp fiberizing (e.g., hammer mills) and paperforming (e.g., slurry pumping onto continuous screens which are designed to manipulate short fibers in a fluid).

In one embodiment of the wet laid process, water non-dispersible microfibers are suspended in water, brought to a forming unit wherein the water is drained off through a forming screen, and the fibers are deposited on the screen wire.

In another embodiment of the wet laid process, water non-dispersible microfibers are dewatered on a sieve or a wire mesh which revolves at high speeds of up to 1,500 meters per minute at the beginning of hydraulic formers over dewatering modules (e.g., suction boxes, foils, and curatures). The sheet is dewatered to a solid content of approximately 20 to 30 percent. The sheet can then be pressed and dried.

In another embodiment of the wet-laid process, a process is provided comprising:

(a) optionally, rinsing the water non-dispersible microfibers with water;

(b) adding water to the water non-dispersible microfibers to produce a water non-dispersible microfiber slurry;

(c) optionally, adding other fibers and/or additives to the water non-dispersible microfiber slurry; and (d) transferring the water non-dispersible microfiber slurry to a wet-laid nonwoven zone to produce the nonwoven article.

In step (a), the number of rinses depends on the particular use chosen for the water non-dispersible microfibers. In step (b), sufficient water is added to the microfibers to allow them to be routed to the wet-laid nonwoven zone.

The wet-laid nonwoven zone in step (d) comprises any equipment known in the art that can produce wet-laid nonwoven articles. In one embodiment of the invention, the wet-laid nonwoven zone comprises at least one screen, mesh, or sieve in order to remove the water from the water non-dispersible microfiber slurry.

In another embodiment of the invention, the water non-dispersible microfiber slurry is mixed prior to transferring to the wet-laid nonwoven zone.

The nonwoven articles also may comprise one or more layers of water-dispersible fibers, multicomponent fibers, or microdenier fibers.

The nonwoven articles may also include various powders and particulates to improve the absorbency nonwoven article and its ability to function as a delivery vehicle for other additives. Examples of powders and particulates include, but are not limited to, talc, starches, various water absorbent, water-dispersible, or water swellable polymers (e.g., super absorbent polymers, sulfopolyesters, and poly(vinylalcohols)), silica, activated carbon, pigments, and microcapsules. As previously mentioned, additives may also be present, but are not required, as needed for specific applications. Examples of additives include, but are not limited to, fillers, light and heat stabilizers, antistatic agents, extrusion aids, dyes, anticounterfeiting markers, slip agents, tougheners, adhesion promoters, oxidative stabilizers, UV absorbers, colorants, pigments, opacifiers (delustrants), optical brighteners, fillers, nucleating agents, plasticizers, viscosity modifiers, surface modifiers, antimicrobials, antifoams, lubricants, thermostabilizers, emulsifiers, disinfectants, cold flow inhibitors, branching agents, oils, waxes, and catalysts.

The nonwoven article may further comprise a water-dispersible film comprising at least one second water-dispersible polymer. The second water-dispersible polymer may be the same as or different from the previously described water-dispersible polymers used in the fibers and nonwoven articles of the present invention. In one embodiment, for example, the second water-dispersible polymer may be an additional sulfopolyester which, in turn, can comprise:

(a) at least 50, 60, 70, 75, 85, or 90 mole percent and no more than 95 mole percent of one or more residues of isophthalic acid or terephthalic acid, based on the total acid residues;

(b) at least 4 to about 30 mole percent, based on the total acid residues, of a residue of sodiosulfoisophthalic acid;

(c) one or more diol residues, wherein at least 15, 25, 50, 70, or 75 mole percent and no more than 95 mole percent, based on the total diol residues, is a poly(ethylene glycol) having a structure $H—(OCH_2—CH_2)_n—OH$ wherein n is an integer in the range of 2 to about 500;

(d) 0 to about 20 mole percent, based on the total repeating units, of residues of a branching monomer having three or more functional groups wherein the functional groups are hydroxyl, carboxyl, or a combination thereof.

The additional sulfopolyester may be blended with one or more supplemental polymers, as described hereinabove, to modify the properties of the resulting nonwoven article. The supplemental polymer may or may not be water-dispersible depending on the application. The supplemental polymer may be miscible or immiscible with the additional sulfopolyester.

The additional sulfopolyester also may include the residues of ethylene glycol and/or 1,4-cyclohexanedimethanol. The additional sulfopolyester may further comprise at least 10, 20, 30, or 40 mole percent and/or no more than 75, 65, or 60 mole percent CHDM. The additional sulfopolyester may further comprise ethylene glycol residues in the amount of at least 10, 20, 25, or 40 mole percent and no more than 75, 65, or 60 mole percent ethylene glycol residues. In one embodiment, the additional sulfopolyester comprises is at about 75 to about 96 mole percent of the residues of isophthalic acid and about 25 to about 95 mole percent of the residues of diethylene glycol.

According to the invention, the sulfopolyester film component of the nonwoven article may be produced as a monolayer or multilayer film. The monolayer film may be produced by conventional casting techniques. The multilayered films may be produced by conventional lamination methods or the like. The film may be of any convenient thickness, but total thickness will normally be between about 2 and about millimeters.

A major advantage inherent to the water dispersible sulfopolyesters of the present invention relative to the caustic-dissipatable polymers (including sulfopolyesters) known in the art is the facile ability to remove or recover the polymer from aqueous dispersions via flocculation and precipitation by adding ionic moieties (i.e., salts). pH adjustment, adding nonsolvents, freezing, membrane filtration and so forth may also be employed. The recovered water dispersible sulfopolyester may find use in applications, including, but not limited to, the aforementioned sulfopolyester binder for wet-laid nonwovens comprising the synthetic microfibers of the invention.

The present invention provides a microfiber-generating multicomponent fiber that includes at least two components, at least one of which is a water-dispersible sulfopolyester and at least one of which is a water non-dispersible synthetic polymer. As is discussed below in further detail, the water-dispersible component can comprise a sulfopolyester fiber and the water non-dispersible component can comprise a water non-dispersible synthetic polymer.

The term "multicomponent fiber" as used herein, is intended to mean a fiber prepared by melting at least two or more fiber-forming polymers in separate extruders, directing the resulting multiple polymer flows into one spinneret with a plurality of distribution flow paths, and spinning the flow paths together to form one fiber. Multicomponent fibers are also sometimes referred to as conjugate or bicomponent fibers. The polymers are arranged in distinct segments or configurations across the cross-section of the multicomponent fibers and extend continuously along the length of the multicomponent fibers. The configurations of such multicomponent fibers may include, for example, sheath core, side by side, segmented pie, striped, or islands-in-the-sea. For example, a multicomponent fiber may be prepared by extruding the sulfopolyester and one or more water non-dispersible synthetic polymers separately through a spinneret having a shaped or engineered transverse geometry such as, for example, an "islands-in-the-sea," striped, or segmented pie configuration.

Additional disclosures regarding multicomponent fibers, how to produce them, and their use to generate microfibers are disclosed in U.S. Pat. No. 6,989,193, US Patent Application Publication No. 2005/0282008, US Patent Application Publication No. 2006/0194047, U.S. Pat. No. 7,687,143, US Patent Application No. 2008/0311815, and US Patent Application Publication No. 2008/0160859, the disclosures of which are incorporated herein by reference.

The terms "segment," and/or "domain," when used to describe the shaped cross section of a multicomponent fiber refer to the area within the cross section comprising the water non-dispersible synthetic polymers. These domains or segments are substantially isolated from each other by the water-dispersible sulfopolyester, which intervenes between the segments or domains. The term "substantially isolated," as used herein, is intended to mean that the segments or domains are set apart from each other to permit the segments or domains to form individual fibers upon removal of the sulfopolyester. Segments or domains can be of similar shape and size or can vary in shape and/or size. Furthermore, the segments or domains can be "substantially continuous" along the length of the multicomponent fiber. The term "substantially continuous" means that the segments or domains are continuous along at least 10 cm length of the multicomponent fiber. These segments or domains of the multicomponent fiber produce the water non-dispersible microfibers when the water dispersible sulfopolyester is removed.

The term "water-dispersible," as used in reference to the water-dispersible component and the sulfopolyesters is intended to be synonymous with the terms "water-dissipatable," "water-disintegratable," "water-dissolvable," "water-dispellable," "water soluble," "water-removable," "hydro-soluble," and "hydrodispersible" and is intended to mean that the sulfopolyester component is sufficiently removed from the multicomponent fiber and is dispersed and/or dissolved by the action of water to enable the release and separation of the water non-dispersible fibers contained therein. The terms "dispersed," "dispersible," "dissipate," or "dissipatable" mean that, when using a sufficient amount of deionized water (e.g., 100:1 water:fiber by weight) to form a loose suspension or slurry of the sulfopolyester fibers at a temperature of about 60° C., and within a time period of up to 5 days, the sulfopolyester component dissolves, disintegrates, or separates from the multicomponent fiber, thus leaving behind a plurality of microfibers from the water non-dispersible segments.

In the context of this invention, all of these terms refer to the activity of water or a mixture of water and a water-miscible cosolvent on the sulfopolyesters described herein. Examples of such water-miscible cosolvents includes alcohols, ketones, glycol ethers, esters and the like. It is intended for this terminology to include conditions where the sulfopolyester is dissolved to form a true solution as well as those where the sulfopolyester is dispersed within the aqueous medium. Often, due to the statistical nature of sulfopolyester compositions, it is possible to have a soluble fraction and a dispersed fraction when a single sulfopolyester sample is placed in an aqueous medium.

The term "polyester", as used herein, encompasses both "homopolyesters" and "copolyesters" and means a synthetic polymer prepared by the polycondensation of difunctional carboxylic acids with a difunctional hydroxyl compound. Typically, the difunctional carboxylic acid is a dicarboxylic acid and the difunctional hydroxyl compound is a dihydric alcohol such as, for example, glycols and diols. Alternatively, the difunctional carboxylic acid may be a hydroxy carboxylic acid such as, for example, p-hydroxybenzoic acid, and the difunctional hydroxyl compound may be an aromatic nucleus bearing two hydroxy substituents such as, for example, hydroquinone. As used herein, the term "sulfopolyester" means any polyester comprising a sulfomonomer. The term "residue," as used herein, means any organic structure incorporated into a polymer through a polycondensation reaction involving the corresponding monomer. Thus, the dicarboxylic acid residue may be derived from a dicarboxylic acid monomer or its associated acid halides, esters, salts, anhydrides, or mixtures thereof. Therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make high molecular weight polyesters.

The water-dispersible sulfopolyesters generally comprise dicarboxylic acid monomer residues, sulfomonomer residues, diol monomer residues, and repeating units. The sulfomonomer may be a dicarboxylic acid, a diol, or hydroxycarboxylic acid. The term "monomer residue," as used herein, means a residue of a dicarboxylic acid, a diol, or a hydroxycarboxylic acid. A "repeating unit," as used herein, means an organic structure having 2 monomer residues bonded through a carbonyloxy group. The sulfopolyesters of the present invention contain substantially equal molar proportions of acid residues (100 mole percent) and diol residues (100 mole percent), which react in substantially equal proportions such that the total moles of repeating units is equal to 100 mole percent. The mole percentages provided in the present disclosure, therefore, may be based on the total moles of acid residues, the total moles of diol residues, or the total moles of repeating units. For example, a sulfopolyester containing 30 mole percent of a sulfomonomer, which may be a dicarboxylic acid, a diol, or hydroxycarboxylic acid, based on the total repeating units, means that the sulfopolyester contains 30 mole percent sulfomonomer out of a total of 100 mole percent repeating units. Thus, there are 30 moles of sulfomonomer residues among every 100 moles of repeating units. Similarly, a sulfopolyester containing 30 mole percent of a sulfonated dicarboxylic acid, based on the total acid residues, means the sulfopolyester contains 30 mole percent sulfonated dicarboxylic acid out of a total of 100 mole percent acid residues. Thus, in this latter case, there are 30 moles of sulfonated dicarboxylic acid residues among every 100 moles of acid residues.

In addition, our invention also provides a process for producing the multicomponent fibers and the microfibers derived therefrom, the process comprising (a) producing the multicomponent fiber and (b) generating the microfibers from the multicomponent fibers.

The process begins by (a) spinning a water dispersible sulfopolyester having a glass transition temperature (Tg) of at least 36° C., 40° C., or 57° C. and one or more water non-dispersible synthetic polymers immiscible with the sulfopolyester into multicomponent fibers. The multicomponent fibers can have a plurality of segments comprising the water non-dispersible synthetic polymers that are substantially isolated from each other by the sulfopolyester, which intervenes between the segments. The sulfopolyester comprises:

(i) about 50 to about 96 mole percent of one or more residues of isophthalic acid and/or terephthalic acid, based on the total acid residues;

(ii) about 4 to about 30 mole percent, based on the total acid residues, of a residue of sodiosulfoisophthalic acid;

(iii) one or more diol residues, wherein at least 25 mole percent, based on the total diol residues, is a poly(ethylene glycol) having a structure H—$(OCH_2—CH_2)_n$—OH wherein n is an integer in the range of 2 to about 500; and (iv) 0 to about 20 mole percent, based on the total repeating units, of residues of a branching monomer having 3 or more functional groups wherein the functional groups are hydroxyl, carboxyl, or a combination thereof. Ideally, the sulfopolyester has a melt viscosity of less than 12,000, 8,000, or 6,000 poise measured at 240° C. at a strain rate of 1 rad/sec.

The microfibers are generated by (b) contacting the multicomponent fibers with water to remove the sulfopolyester thereby forming the microfibers comprising the water non-dispersible synthetic polymer. The water non-dispersible microfibers of the instant invention can have an average fineness of at least 0.001, 0.005, or 0.01 dpf and/or no more than 0.1 or 0.5 dpf. Typically, the multicomponent fiber is contacted with water at a temperature of about 25° C. to about 100° C., preferably about 50° C. to about 80° C., for a time period of from about 10 to about 600 seconds whereby the sulfopolyester is dissipated or dissolved.

The ratio by weight of the sulfopolyester to water non-dispersible synthetic polymer component in the multicomponent fiber of the invention is generally in the range of about 98:2 to about 2:98 or, in another example, in the range of about 25:75 to about 75:25. Typically, the sulfopolyester comprises 50 percent by weight or less of the total weight of the multicomponent fiber.

The shaped cross section of the multicomponent fibers can be, for example, in the form of a sheath core, islands-in-the-sea, segmented pie, hollow segmented pie, off-centered segmented pie, or striped.

For example, the striped configuration can have alternating water dispersible segments and water non-dispersible segments and have at least 4, 8, or 12 stripes and/or less than 50, 35, or 20 stripes.

The multicomponent fibers of the present invention can be prepared in a number of ways. For example, in U.S. Pat. No. 5,916,678, multicomponent fibers may be prepared by extruding the sulfopolyester and one or more water non-dispersible synthetic polymers, which are immiscible with the sulfopolyester, separately through a spinneret having a shaped or engineered transverse geometry such as, for example, islands-in-the-sea, sheath core, side-by-side, striped, or segmented pie. The sulfopolyester may be later removed by dissolving the interfacial layers or pie segments and leaving the microdenier fibers of the water non-dispersible synthetic polymer(s). These microdenier fibers of the water non-dispersible synthetic polymer(s) have fiber sizes much smaller than the multicomponent fiber. Another example includes feeding the sulfopolyester and water non-dispersible synthetic polymers to a polymer distribution system where the polymers are introduced into a segmented spinneret plate. The polymers follow separate paths to the fiber spinneret and are combined at the spinneret hole. The spinneret hole comprises either two concentric circular holes, thus providing a sheath core type fiber, or a circular spinneret hole divided along a diameter into multiple parts to provide a fiber having a side-by-side type. Alternatively, the sulfopolyester and water non-dispersible synthetic polymers may be introduced separately into a spinneret having a plurality of radial channels to produce a multicomponent fiber having a segmented pie cross section. Typically, the sulfopolyester will form the "sheath" component of a sheath core configuration. Another alternative process involves forming the multicomponent fibers by melting the sulfopolyester and water non-dispersible synthetic polymers in separate extruders and directing the polymer flows into one spinneret with a plurality of distribution flow paths in form of small thin tubes or segments to provide a fiber having an islands-in-the-sea shaped cross section. An example of such a spinneret is described in U.S. Pat. No. 5,366,804. In the present invention, typically, the sulfopolyester will form the "sea" component and the water non-dispersible synthetic polymer will form the "islands" component.

As some water-dispersible sulfopolyesters are generally resistant to removal during subsequent hydroentangling processes, it is preferable that the water used to remove the sulfopolyester from the multicomponent fibers be above room temperature, more preferably the water is at least about 45° C., 60° C., or 85° C.

In another embodiment of this invention, another process is provided to produce water non-dispersible microfibers. The process comprises:

(a) cutting a multicomponent fiber into cut multicomponent fibers having a length of less than 25 millimeters;

(b) contacting a fiber-containing feedstock comprising the cut multicomponent fibers with a wash water for at least 0.1, 0.5, or 1 minutes and/or not more than 30, 20, or 10 minutes to produce a fiber mix slurry, wherein the wash water can have a pH of less than 10, 8, 7.5, or 7 and can be substantially free of added caustic;

(c) heating said fiber mix slurry to produce a heated fiber mix slurry;

(d) optionally, mixing said fiber mix slurry in a shearing zone;

(e) removing at least a portion of the sulfopolyester from the multicomponent fiber to produce a slurry mixture comprising a sulfopolyester dispersion and the water non-dispersible microfibers;

(f) removing at least a portion of the sulfopolyester dispersion from the slurry mixture to thereby provide a wet lap comprising the water non-dispersible microfibers, wherein the wet lap is comprised of at least 5, 10, 15, or 20 weight percent and/or not more than 70, 55, or 40 weight percent of the water non-dispersible microfiber and at least 30, 45, or 60 weight percent and/or not more than 90, 85, or 80 weight percent of the sulfopolyester dispersion; and (g) optionally, combining the wet lap with a dilution liquid to produce a dilute wet-lay slurry comprising the water non-dispersible microfibers in an amount of at least 0.0001, 0.001, or 0.005 weight percent and/or not more than 1, 0.5, or 0.1 weight percent.

In another embodiment, the wet lap is comprised of at least 5, 10, 15, or 20 weight percent and/or not more than 50, 45, or 40 weight percent of the water non-dispersible microfiber and at least 50, 55, or 60 weight percent and/or not more than 90, 85, or 80 weight percent of the sulfopolyester dispersion.

The multicomponent fiber can be cut into any length that can be utilized to produce nonwoven articles. In one embodiment of the invention, the multicomponent fiber is cut into lengths ranging of at least 0.1, 0.25, or 0.5 millimeter and/or not more than 25, 10, 5, or 2 millimeter. In one embodiment, the cutting ensures a consistent fiber length so that at least 75, 85, 90, 95, or 98 percent of the individual fibers have an individual length that is within 90, 95, or 98 percent of the average length of all fibers.

The fiber-containing feedstock can comprise any other type of fiber that is useful in the production of nonwoven articles. In one embodiment, the fiber-containing feedstock further comprises at least one fiber selected from the group consisting of cellulosic fiber pulp, inorganic fibers including glass, carbon, boron and ceramic fibers, polyester fibers, lyocell fibers, nylon fibers, polyolefin fibers, rayon fibers, and cellulose ester fibers.

The fiber-containing feedstock is mixed with a wash water to produce a fiber mix slurry. Preferably, to facilitate the removal of the water-dispersible sulfopolyester, the water utilized can be soft water or deionized water. The wash water can have a pH of less than 10, 8, 7.5, or 7 and can be substantially free of added caustic. The wash water can be maintained at a temperature of at least 140° F., 150° F., or 160° F. and/or not more than 210° F., 200° F., or 190° F. during contacting of step (b). In one embodiment, the wash water contacting of step (b) can disperse substantially all of the water-dispersible sulfopolyester segments of the multicomponent fiber, so that the dissociated water non-dispersible microfibers have less than 5, 2, or 1 weight percent of residual water dispersible sulfopolyester disposed thereon.

The fiber mix slurry can be heated to facilitate removal of the water dispersible sulfopolyester. In one embodiment of the invention, the fiber mix slurry is heated to at least 50° C., 60° C., 70° C., 80° C. or 90° C. and no more than 100° C.

Optionally, the fiber mix slurry can be mixed in a shearing zone. The amount of mixing is that which is sufficient to disperse and remove a portion of the water dispersible sulfopolyester from the multicomponent fiber. During mixing, at least 90, 95, or 98 weight percent of the sulfopolyester can be removed from the water non-dispersible microfiber. The shearing zone can comprise any type of equipment that can provide a turbulent fluid flow necessary to disperse and remove a portion of the water dispersible sulfopolyester from the multicomponent fiber and separate the water non-dispersible microfibers. Examples of such equipment include, but is not limited to, pulpers and refiners.

After contacting the multicomponent fiber with water, the water dispersible sulfopolyester dissociates with the water non-dispersible synthetic polymer fiber to produce a slurry mixture comprising a sulfopolyester dispersion and the water non-dispersible microfibers. The sulfopolyester dispersion can be separated from the water non-dispersible microfibers by any means known in the art in order to produce a wet lap, wherein the sulfopolyester dispersion and the water non-dispersible microfibers in combination can make up at least 95, 98, or 99 weight percent of the wet lap. For example, the slurry mixture can be routed through separating equipment such as, for example, screens and filters. Optionally, the water non-dispersible microfibers may be washed once or numerous times to remove more of the water dispersible sulfopolyester.

The wet lap can comprise up to at least 30, 45, 50, 55, or 60 weight percent and/or not more than 90, 86, 85, or 80 weight percent water. Even after removing some of the sulfopolyester dispersion, the wet lap can comprise at least 0.001, 0.01, or 0.1 and/or not more than 10, 5, 2, or 1 weight percent of water dispersible sulfopolyesters. In addition, the wet lap can further comprise a fiber finishing composition comprising an oil, a wax, and/or a fatty acid. The fatty acid and/or oil used for the fiber finishing composition can be naturally-derived. In another embodiment, the fiber finishing composition comprises mineral oil, stearate esters, sorbitan esters, and/or neatsfoot oil. The fiber finishing composition can make up at least 10, 50, or 100 ppmw and/or not more than 5,000, 1000, or 500 ppmw of the wet lap.

The removal of the water-dispersible sulfopolyester can be determined by physical observation of the slurry mixture. The water utilized to rinse the water non-dispersible microfibers is clear if the water-dispersible sulfopolyester has been mostly removed. If the water dispersible sulfopolyester is still present in noticeable amounts, then the water utilized to rinse the water non-dispersible microfibers can be milky in color. Further, if water-dispersible sulfopolyester remains on the water non-dispersible microfibers, the microfibers can be somewhat sticky to the touch.

The dilute wet-lay slurry of step (g) can comprise the dilution liquid in an amount of at least 90, 95, 98, 99, or 99.9 weight percent. In one embodiment, an additional fiber can be combined with the wet lap and dilution liquid to produce the dilute wet-lay slurry. The additional fibers can have a different composition and/or configuration than the water non-dispersible microfiber and can be any that is known in the art depending on the type of nonwoven article to be produced. In one embodiment of the invention, the other fiber can be selected from the group consisting cellulosic fiber pulp, inorganic fibers (e.g., glass, carbon, boron, ceramic, and combinations thereof), polyester fibers, nylon fibers, polyolefin fibers, rayon fibers, lyocell fibers, cellulose ester fibers, and combinations thereof. The dilute wet-lay slurry can comprise additional fibers in an amount of at least 0.001, 0.005, or 0.01 weight percent and/or not more than 1, 0.5, or 0.1 weight percent.

In one embodiment of this invention, at least one water softening agent may be used to facilitate the removal of the water-dispersible sulfopolyester from the multicomponent fiber. Any water softening agent known in the art can be utilized. In one embodiment, the water softening agent is a chelating agent or calcium ion sequestrant. Applicable chelating agents or calcium ion sequestrants are compounds containing a plurality of carboxylic acid groups per molecule where the carboxylic groups in the molecular structure of the chelating agent are separated by 2 to 6 atoms. Tetrasodium ethylene diamine tetraacetic acid (EDTA) is an example of the most common chelating agent, containing four carboxylic acid moieties per molecular structure with a separation of 3 atoms between adjacent carboxylic acid groups. Sodium salts of maleic acid or succinic acid are examples of the most basic chelating agent compounds. Further examples of applicable chelating agents include compounds which have multiple carboxylic acid groups in the molecular structure wherein the carboxylic acid groups are separated by the required distance (2 to 6 atom units) which yield a favorable steric interaction with di- or multi-valent cations such as calcium which cause the chelating agent to preferentially bind to di- or multi valent cations. Such compounds include, for example, diethylenetriaminepentaacetic acid; diethylenetriamine-N,N,N',N',N"-pentaacetic acid; pentetic acid; N,N-bis(2-(bis-(carboxymethyl)amino)ethyl)-glycine; diethylenetriamine pentaacetic acid; [[(carboxymethyl)imino]bis(ethylenenitrilo)]-tetraacetic acid; edetic acid; ethylenedinitrilotetraacetic acid; EDTA, free base; EDTA, free acid; ethylenediamine-N,N,N', N'-tetraacetic acid; hampene; versene; N,N'-1,2-ethane diyl-bis-(N-(carboxymethyl)glycine); ethylenediamine tetra-acetic acid; N,N-bis(carboxymethyl)glycine; triglycollamic acid; trilone A; α,α',α"-5 trimethylaminetricarboxylic acid; tri(carboxymethyl)amine; aminotriacetic acid; hampshire NTA acid; nitrilo-2,2',2"-triacetic acid; titriplex i; nitrilotriacetic acid; and mixtures thereof.

The water dispersible sulfopolyester can be recovered from the sulfopolyester dispersion by any method known in the art.

The sulfopolyesters described herein can have an inherent viscosity, abbreviated hereinafter as "I.V.", of at least about 0.1, 0.2, or 0.3 dL/g, preferably about 0.2 to 0.3 dL/g, and most preferably greater than about 0.3 dL/g, as measured in 60/40 parts by weight solution of phenol/tetrachloroethane solvent at 25° C. and at a concentration of about 0.5 g of sulfopolyester in 100 mL of solvent.

The sulfopolyesters of the present invention can include one or more dicarboxylic acid residues. Depending on the type and concentration of the sulfomonomer, the dicarboxylic acid residue may comprise at least 60, 65, or 70 mole percent and no more than 95 or 100 mole percent of the acid residues. Examples of dicarboxylic acids that may be used include aliphatic dicarboxylic acids, alicyclic dicarboxylic acids, aromatic dicarboxylic acids, or mixtures of two or more of these acids. Thus, suitable dicarboxylic acids include, but are not limited to, succinic, glutaric, adipic, azelaic, sebacic, fumaric, maleic, itaconic, 1,3-cyclohexanedicarboxylic, 1,4cyclohexanedicarboxylic, diglycolic, 2,5-norbornanedicarboxylic, phthalic, terephthalic, 1,4-naphthalenedicarboxylic, 2,5-naphthalenedicarboxylic, diphenic, 4,4'-oxydibenzoic, 4,4'-sulfonyldibenzoic, and isophthalic. The preferred dicarboxylic acid residues are isophthalic, terephthalic, and 1,4-cyclohexanedicarboxylic acids, or if diesters are used, dimethyl terephthalate, dimethyl isophthalate, and dimethyl-1,4-cyclohexanedicarboxylate with the residues of isophthalic and terephthalic acid being especially preferred. Although the dicarboxylic acid methyl ester is the most preferred embodiment, it is also acceptable to include higher order alkyl esters, such as ethyl, propyl, isopropyl, butyl, and so forth. In addition, aromatic esters, particularly phenyl, also may be employed.

The sulfopolyesters can include at least 4, 6, or 8 mole percent and no more than about 40, 35, 30, or 25 mole percent, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof. The sulfomonomer may be a dicarboxylic acid or ester thereof containing a sulfonate group, a diol containing a sulfonate group, or a hydroxy acid containing a sulfonate group. The term "sulfonate" refers to a salt of a sulfonic acid having the structure "—$SO_3M$," wherein M is the cation of the sulfonate salt. The cation of the sulfonate salt may be a metal ion such as $Li^+$, $Na^+$, $K^+$, and the like.

When a monovalent alkali metal ion is used as the cation of the sulfonate salt, the resulting sulfopolyester is completely dispersible in water with the rate of dispersion dependent on the content of sulfomonomer in the polymer, temperature of the water, surface area/thickness of the sulfopolyester, and so forth. When a divalent metal ion is used, the resulting sulfopolyesters are not readily dispersed by cold water but are more easily dispersed by hot water. Utilization of more than one counterion within a single polymer composition is possible and may offer a means to tailor or fine-tune the water-responsivity of the resulting article of manufacture. Examples of sulfomonomers residues include monomer residues where the sulfonate salt group is attached to an aromatic acid nucleus, such as, for example, benzene, naphthalene, diphenyl, oxydiphenyl, sulfonyldiphenyl, methylenediphenyl, or cycloaliphatic rings (e.g., cyclopentyl, cyclobutyl, cycloheptyl, and cyclooctyl). Other examples of sulfomonomer residues which may be used in the present invention are the metal sulfonate salts of sulfophthalic acid, sulfoterephthalic acid, sulfoisophthalic acid, or combinations thereof. Other examples of sulfomonomers which may be used include 5-sodiosulfoisophthalic acid and esters thereof.

The sulfomonomers used in the preparation of the sulfopolyesters are known compounds and may be prepared using methods well known in the art. For example, sulfomonomers in which the sulfonate group is attached to an aromatic ring may be prepared by sulfonating the aromatic compound with oleum to obtain the corresponding sulfonic acid and followed by reaction with a metal oxide or base, for example, sodium acetate, to prepare the sulfonate salt. Procedures for preparation of various sulfomonomers are described, for example, in U.S. Pat. Nos. 3,779,993; 3,018,272; and 3,528,947, the disclosures of which are incorporated herein by reference.

The sulfopolyesters can include one or more diol residues which may include aliphatic, cycloaliphatic, and aralkyl glycols. The cycloaliphatic diols, for example, 1,3- and 1,4-cyclohexanedimethanol, may be present as their pure cis or trans isomers or as a mixture of cis and trans isomers. As used herein, the term "diol" is synonymous with the term "glycol" and can encompass any dihydric alcohol. Examples of diols include, but are not limited to, ethylene glycol, diethylene glycol, triethylene glycol, polyethylene glycols, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, p-xylylenediol, or combinations of one or more of these glycols.

The diol residues may include from about 25 mole percent to about 100 mole percent, based on the total diol residues, of residues of a poly(ethylene glycol) having a structure H—$(OCH_2—CH_2)_n$—OH, wherein n is an integer in the range of 2 to about 500. Non-limiting examples of lower molecular weight polyethylene glycols (e.g., wherein n is from 2 to 6) are diethylene glycol, triethylene glycol, and tetraethylene glycol. Of these lower molecular weight glycols, diethylene and triethylene glycol are most preferred. Higher molecular weight polyethylene glycols (abbreviated herein as "PEG"), wherein n is from 7 to about 500, include the commercially available products known under the designation CARBOWAX®, a product of Dow Chemical Company (formerly Union Carbide). Typically, PEGs are used in combination with other diols such as, for example, diethylene glycol or ethylene glycol. Based on the values of n, which range from greater than 6 to 500, the molecular weight may range from greater than 300 to about 22,000 g/mol. The molecular weight and the mole percent are inversely proportional to each other; specifically, as the molecular weight is increased, the mole percent will be decreased in order to achieve a designated degree of hydrophilicity. For example, it is illustrative of this concept to consider that a PEG having a molecular weight of 1,000 g/mol may constitute up to 10 mole percent of the total diol, while a PEG having a molecular weight of 10,000 g/mol would typically be incorporated at a level of less than 1 mole percent of the total diol.

Certain dimer, trimer, and tetramer diols may be formed in situ due to side reactions that may be controlled by varying the process conditions. For example, varying amounts of diethylene, triethylene, and tetraethylene glycols may be derived from ethylene glycol using an acid-catalyzed dehydration reaction which occurs readily when the polycondensation reaction is carried out under acidic conditions. The presence of buffer solutions, well known to those skilled in the art, may be added to the reaction mixture to retard these side reactions. Additional compositional latitude is possible, however, if the buffer is omitted and the dimerization, trimerization, and tetramerization reactions are allowed to proceed.

The sulfopolyesters of the present invention may include from 0 to less than 25, 20, 15, or 10 mole percent, based on the total repeating units, of residues of a branching monomer having 3 or more functional groups wherein the functional groups are hydroxyl, carboxyl, or a combination thereof. Non-limiting examples of branching monomers are 1,1,1-trimethylol propane, 1,1,1-trimethylolethane, glycerin, pentaerythritol, erythritol, threitol, dipentaerythritol, sorbitol, trimellitic anhydride, pyromellitic dianhydride, dimethylol propionic acid, or combinations thereof. The presence of a branching monomer may result in a number of possible benefits to the sulfopolyesters, including but not limited to, the ability to tailor rheological, solubility, and tensile properties. For example, at a constant molecular weight, a branched sulfopolyester, compared to a linear analog, will also have a greater concentration of end groups that may facilitate post-polymerization crosslinking reactions. At high concentrations of branching agent, however, the sulfopolyester may be prone to gelation.

The sulfopolyester used for the multicomponent fiber can have a glass transition temperature, abbreviated herein as "Tg," of at least 25° C., 30° C., 36° C., 40° C., 45° C., 50° C., 55° C., 57° C., 60° C., or 65° C. as measured on the dry polymer using standard techniques well known to persons skilled in the art, such as differential scanning calorimetry ("DSC"). The Tg measurements of the sulfopolyesters are conducted using a "dry polymer," that is, a polymer sample in which adventitious or absorbed water is driven off by heating the polymer to a temperature of about 200° C. and allowing the sample to return to room temperature. Typically, the sulfopolyester is dried in the DSC apparatus by conducting a first thermal scan in which the sample is heated to a temperature above the water vaporization temperature, holding the sample at that temperature until the vaporization of the water absorbed in the polymer is complete (as indicated by a large, broad endotherm), cooling the sample to room temperature, and then conducting a second thermal scan to obtain the Tg measurement.

In one embodiment, our invention provides a sulfopolyester having a glass transition temperature (Tg) of at least 25° C., wherein the sulfopolyester comprises:

(a) at least 50, 60, 75, or 85 mole percent and no more than 96, 95, 90, or 85 mole percent of one or more residues of isophthalic acid and/or terephthalic acid, based on the total acid residues;

(b) about 4 to about 30 mole percent, based on the total acid residues, of a residue of sodiosulfoisophthalic acid;

(c) one or more diol residues wherein at least 25, 50, 70, or 75 mole percent, based on the total diol residues, is a poly(ethylene glycol) having a structure $H-(OCH_2-CH_2)_n-OH$ wherein n is an integer in the range of 2 to about 500;

(d) 0 to about 20 mole percent, based on the total repeating units, of residues of a branching monomer having 3 or more functional groups wherein the functional groups are hydroxyl, carboxyl, or a combination thereof.

The sulfopolyesters of the instant invention are readily prepared from the appropriate dicarboxylic acids, esters, anhydrides, salts, sulfomonomer, and the appropriate diol or diol mixtures using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation and is to be contrasted with a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed from the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the sulfopolyester may deteriorate in appearance if allowed to reside in a reactor at an elevated temperature for too long a duration.

The sulfopolyesters can be prepared by procedures known to persons skilled in the art. The sulfomonomer is most often added directly to the reaction mixture from which the polymer is made, although other processes are known and may also be employed, for example, as described in U.S. Pat. Nos. 3,018,272, 3,075,952, and 3,033,822. The reaction of the sulfomonomer, diol component, and the dicarboxylic acid component may be carried out using conventional polyester polymerization conditions. For example, when preparing the sulfopolyesters by means of an ester interchange reaction, i.e., from the ester form of the dicarboxylic acid components, the reaction process may comprise two steps. In the first step, the diol component and the dicarboxylic acid component, such as, for example, dimethyl isophthalate, are reacted at elevated temperatures of about 150° C. to about 250° C. for about 0.5 to 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to 4 hours while the preferred pressure ranges from about 103 kPa gauge (15 psig) to about 276 kPa gauge (40 psig). Thereafter, the reaction product is heated under higher temperatures and under reduced pressure to form a sulfopolyester with the elimination of a diol, which is readily volatilized under these conditions and removed from the system. This second step, or polycondensation step, is continued under higher vacuum conditions and a temperature which generally ranges from about 230° C. to about 350° C., preferably about 250° C. to about 310° C., and most preferably about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reactions of both stages are facilitated by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631 may also be used, particularly when a mixed monomer feed of acids and esters is employed.

To ensure that the reaction of the diol component and dicarboxylic acid component by an ester interchange reaction mechanism is driven to completion, it is preferred to employ about 1.05 to about 2.5 moles of diol component to one mole of dicarboxylic acid component. Persons of skill in the art will understand, however, that the ratio of diol component to dicarboxylic acid component is generally determined by the design of the reactor in which the reaction process occurs.

In the preparation of sulfopolyester by direct esterification, i.e., from the acid form of the dicarboxylic acid component, sulfopolyesters are produced by reacting the dicarboxylic acid or a mixture of dicarboxylic acids with the diol component or a mixture of diol components. The reaction is conducted at a pressure of from about 7 kPa gauge (1 psig) to about 1,379 kPa gauge (200 psig), preferably less than 689 kPa (100 psig) to produce a low molecular weight, linear or branched sulfopolyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

As noted hereinabove, the sulfopolyesters are advantageous for the preparation of bicomponent and multicomponent fibers having a shaped cross section. We have discovered that sulfopolyesters or blends of sulfopolyesters having a glass transition temperature (Tg) of at least 35° C. are particularly useful for multicomponent fibers for preventing blocking and fusing of the fiber during spinning and take up. Further, to obtain a sulfopolyester with a Tg of at least 35° C., blends of one or more sulfopolyesters may be used in varying proportions to obtain a sulfopolyester blend having the desired Tg. The Tg of a sulfopolyester blend may be calculated by using a weighted average of the Tg's of the sulfopolyester components. For example, sulfopolyesters having a Tg of 48° C. may be blended in a 25:75 weight:weight ratio with another sulfopolyester having Tg of 65° C. to give a sulfopolyester blend having a Tg of approximately 61° C.

In another embodiment of the invention, the water dispersible sulfopolyester component of the multicomponent fiber presents properties which allow at least one of the following:

(a) the multicomponent fibers to be spun to a desired low denier, (b) the sulfopolyester in these multicomponent fibers to be resistant to removal during hydroentangling of a web formed from the multicomponent fibers but is efficiently removed at elevated temperatures after hydroentanglement, and (c) the multicomponent fibers to be heat settable so as to yield a stable, strong fabric. Surprising and unexpected results were achieved in furtherance of these objectives using a sulfopolyester having a certain melt viscosity and level of sulfomonomer residues.

As previously discussed, the sulfopolyester or sulfopolyester blend utilized in the multicomponent fibers or binders can have a melt viscosity of generally less than about 12,000, 10,000, 6,000, or 4,000 poise as measured at 240° C. and at a 1 rad/sec shear rate. In another aspect, the sulfopolyester or sulfopolyester blend exhibits a melt viscosity of between about 1,000 to 12,000 poise, more preferably between 2,000 to 6,000 poise, and most preferably between 2,500 to 4,000 poise measured at 240° C. and at a 1 rad/sec shear rate. Prior to determining the viscosity, the samples are dried at 60° C. in a vacuum oven for 2 days. The melt viscosity is measured on a rheometer using 25 mm diameter parallel-plate geometry at a 1 mm gap setting. A dynamic frequency sweep is run at a strain rate range of 1 to 400 rad/sec and 10 percent strain amplitude. The viscosity is then measured at 240° C. and at a strain rate of 1 rad/sec.

The level of sulfomonomer residues in the sulfopolyester polymers is at least 4 or 5 mole percent and less than about 25, 20, 12, or 10 mole percent, reported as a percentage of the total diacid or diol residues in the sulfopolyester. Sulfomonomers for use with the invention preferably have 2 functional groups and one or more sulfonate groups attached to an aromatic or cycloaliphatic ring wherein the functional groups are hydroxyl, carboxyl, or a combination thereof. A sodiosulfoisophthalic acid monomer is particularly preferred.

In addition to the sulfomonomer described previously, the sulfopolyester preferably comprises residues of one or more dicarboxylic acids, one or more diol residues wherein at least 25 mole percent, based on the total diol residues, is a poly (ethylene glycol) having a structure H—(OCH$_2$—CH$_2$)$_n$—OH wherein n is an integer in the range of 2 to about 500, and 0 to about 20 mole percent, based on the total repeating units, of residues of a branching monomer having 3 or more functional groups wherein the functional groups are hydroxyl, carboxyl, or a combination thereof.

In a particularly preferred embodiment, the sulfopolyester comprises from about 60 to 99, 80 to 96, or 88 to 94 mole percent of dicarboxylic acid residues, from about 1 to 40, 4 to 20, or 6 to 12 mole percent of sulfomonomer residues, and 100 mole percent of diol residues (there being a total mole percent of 200 percent, i.e., 100 mole percent diacid and 100 mole percent diol). More specifically, the dicarboxylic portion of the sulfopolyester comprises between about 50 to 95, 60 to 80, or 65 to 75 mole percent of terephthalic acid, about 0.5 to 49, 1 to 30, or 15 to 25 mole percent of isophthalic acid, and about 1 to 40, 4 to 20, or 6 to 12 mole percent of 5-sodiosulfoisophthalic acid (5-SSIPA). The diol portion comprises from about 0 to 50 mole percent of diethylene glycol and from about 50 to 100 mole percent of ethylene glycol. An exemplary formulation according to this embodiment of the invention is set forth subsequently.

TABLE 1

| | Approximate Mole percent (based on total moles of diol or diacid residues) |
|---|---|
| Terephthalic acid | 71 |
| Isophthalic acid | 20 |
| 5-SSIPA | 9 |
| Diethylene glycol | 35 |
| Ethylene glycol | 65 |

The water dispersible component of the multicomponent fibers or the binders of the nonwoven article may consist essentially of or, consist of, the sulfopolyesters described hereinabove. In another embodiment, however, the sulfopolyesters of this invention may be blended with one or more supplemental polymers to modify the properties of the resulting multicomponent fiber or nonwoven article. The supplemental polymer may or may not be water-dispersible depending on the application and may be miscible or immiscible with the sulfopolyester. If the supplemental polymer is water non-dispersible, it is preferred that the blend with the sulfopolyester is immiscible.

The term "miscible," as used herein, is intended to mean that the blend has a single, homogeneous amorphous phase as indicated by a single composition-dependent Tg. For example, a first polymer that is miscible with second polymer may be used to "plasticize" the second polymer as illustrated, for example, in U.S. Pat. No. 6,211,309. By contrast, the term "immiscible," as used herein, denotes a blend that shows at least two randomly mixed phases and exhibits more than one Tg. Some polymers may be immiscible and yet compatible with the sulfopolyester. A further general description of miscible and immiscible polymer blends and the various analytical techniques for their characterization may be found in Polymer Blends Volumes 1 and 2, Edited by D. R. Paul and C. B. Bucknall, 2000, John Wiley & Sons, Inc, the disclosure of which is incorporated herein by reference.

Non-limiting examples of water-dispersible polymers that may be blended with the sulfopolyester are polymethacrylic acid, polyvinyl pyrrolidone, polyethylene-acrylic acid copolymers, polyvinyl methyl ether, polyvinyl alcohol, polyethylene oxide, hydroxy propyl cellulose, hydroxypropyl methyl cellulose, methyl cellulose, ethyl hydroxyethyl cellulose, isopropyl cellulose, methyl ether starch, polyacrylamides, poly(N-vinyl caprolactam), polyethyl oxazoline, poly (2-isopropyl-2-oxazoline), polyvinyl methyl oxazolidone, water-dispersible sulfopolyesters, polyvinyl methyl oxazolidimone, poly(2,4-dimethyl-6-triazinylethylene), and ethylene oxide-propylene oxide copolymers. Examples of polymers which are water non-dispersible that may be blended with the sulfopolyester include, but are not limited to, polyolefins, such as homo- and copolymers of polyethylene and polypropylene; poly(ethylene terephthalate); poly(butylene terephthalate); and polyamides, such as nylon-6; polylactides; caprolactone; Eastar Bio® (poly(tetramethylene adipate-co-terephthalate), a product of Eastman Chemical Company); polycarbonate; polyurethane; and polyvinyl chloride.

According to our invention, blends of more than one sulfopolyester may be used to tailor the end-use properties of the resulting multicomponent fiber or nonwoven article. The blends of one or more sulfopolyesters will have Tg's of at least 25° C. for the binder compositions and at least 35° C. for the multicomponent fibers.

The sulfopolyester and supplemental polymer may be blended in batch, semicontinuous, or continuous processes. Small scale batches may be readily prepared in any high-intensity mixing devices well known to those skilled in the art, such as Banbury mixers, prior to melt-spinning fibers. The components may also be blended in solution in an appropriate solvent. The melt blending method includes blending the sulfopolyester and supplemental polymer at a temperature sufficient to melt the polymers. The blend may be cooled and pelletized for further use or the melt blend can be melt spun directly from this molten blend into fiber form. The term "melt" as used herein includes, but is not limited to, merely softening the polyester. For melt mixing methods generally known in the polymers art, see Mixing and Compounding of Polymers (I. Manas-Zloczower & Z. Tadmor editors, Carl Hanser Verlag Publisher, 1994, New York, N.Y.).

The water non-dispersible components of the multicomponent fibers and the nonwoven articles of this invention also may contain other conventional additives and ingredients which do not deleteriously affect their end use. For example, additives include, but are not limited to, starches, fillers, light and heat stabilizers, antistatic agents, extrusion aids, dyes, anticounterfeiting markers, slip agents, tougheners, adhesion promoters, oxidative stabilizers, UV absorbers, colorants, pigments, opacifiers (delustrants), optical brighteners, fillers, nucleating agents, plasticizers, viscosity modifiers, surface modifiers, antimicrobials, antifoams, lubricants, thermostabilizers, emulsifiers, disinfectants, cold flow inhibitors, branching agents, oils, waxes, and catalysts.

In one embodiment of the invention, the multicomponent fibers and nonwoven articles will contain less than 10 weight percent of anti-blocking additives, based on the total weight of the multicomponent fiber or nonwoven article. For example, the multicomponent fiber or nonwoven article may contain less than 10, 9, 5, 3, or 1 weight percent of a pigment or filler based on the total weight of the multicomponent fiber or nonwoven article. Colorants, sometimes referred to as toners, may be added to impart a desired neutral hue and/or brightness to the water non-dispersible polymer. When colored fibers are desired, pigments or colorants may be included in the water non-dispersible polymer when producing the polymer or they may be melt blended with the preformed sulfopolyester. A preferred method of including colorants is to use a colorant having thermally stable organic colored compounds having reactive groups such that the colorant is copolymerized and incorporated into the water non-dispersible polymer to improve its hue. For example, colorants such as dyes possessing reactive hydroxyl and/or carboxyl groups, including, but not limited to, blue and red substituted anthraquinones, may be copolymerized into the polymer chain As previously discussed, the segments or domains of the multicomponent fibers may comprise one or more water non-dispersible synthetic polymers. Examples of water non-dispersible synthetic polymers which may be used in segments of the multicomponent fiber include, but are not limited to, polyolefins, polyesters, copolyesters, polyamides, polylactides, polycaprolactone, polycarbonate, polyurethane, acrylics, cellulose ester, and/or polyvinyl chloride. For example, the water non-dispersible synthetic polymer may be polyester such as polyethylene terephthalate, polyethylene terephthalate homopolymer, polyethylene terephthalate copolymer, polybutylene terephthalate, polycyclohexylene cyclohexanedicarboxylate, polycyclohexylene terephthalate, polytrimethylene terephthalate, and the like. As In another example, the water non-dispersible synthetic polymer can be biodistintegratable as determined by DIN Standard 54900 and/or biodegradable as determined by ASTM Standard Method, D6340-98. Examples of biodegradable polyesters and polyester blends are disclosed in U.S. Pat. Nos. 5,599,858; 5,580, 911; 5,446,079; and 5,559,171.

The term "biodegradable," as used herein in reference to the water non-dispersible synthetic polymers, is understood to mean that the polymers are degraded under environmental influences such as, for example, in a composting environment, in an appropriate and demonstable time span as defined, for example, by ASTM Standard Method, D6340-98, entitled "Standard Test Methods for Determining Aerobic Biodegradation of Radiolabeled Plastic Materials in an Aqueous or Compost Environment." The water non-dispersible synthetic polymers of the present invention also may be "biodisintegratable," meaning that the polymers are easily fragmented in a composting environment as defined, for example, by DIN Standard 54900. For example, the biodegradable polymer is initially reduced in molecular weight in the environment by the action of heat, water, air, microbes, and other factors. This reduction in molecular weight results in a loss of physical properties (tenacity) and often in fiber breakage. Once the molecular weight of the polymer is sufficiently low, the monomers and oligomers are then assimilated by the microbes. In an aerobic environment, these monomers or oligomers are ultimately oxidized to $CO_2$, $H_2O$, and new cell biomass. In an anaerobic environment, the monomers or oligomers are ultimately converted to $CO_2$, $H_2$, acetate, methane, and cell biomass.

Additionally, the water non-dispersible synthetic polymers may comprise aliphatic-aromatic polyesters, abbreviated herein as "AAPE." The term "aliphatic-aromatic polyester," as used herein, means a polyester comprising a mixture of residues from aliphatic dicarboxylic acids, cycloaliphatic dicarboxylic acids, aliphatic diols, cycloaliphatic diols, aromatic diols, and aromatic dicarboxylic acids. The term "non-aromatic," as used herein with respect to the dicarboxylic acid and diol monomers of the present invention, means that carboxyl or hydroxyl groups of the monomer are not connected through an aromatic nucleus. For example, adipic acid contains no aromatic nucleus in its backbone (i.e., the chain of carbon atoms connecting the carboxylic acid groups), thus adipic acid is "non-aromatic." By contrast, the term "aromatic" means the dicarboxylic acid or diol contains an aromatic nucleus in its backbone such as, for example, terephthalic acid or 2,6-naphthalene dicarboxylic acid. "Non-aromatic," therefore, is intended to include both aliphatic and cycloaliphatic structures such as, for example, diols and dicarboxylic acids, which contain as a backbone a straight or branched chain or cyclic arrangement of the constituent carbon atoms which may be saturated or paraffinic in nature, unsaturated (i.e., containing non-aromatic carbon-carbon double bonds), or acetylenic (i.e., containing carbon-carbon triple bonds). Thus, non-aromatic is intended to include linear and branched, chain structures (referred to herein as "aliphatic") and cyclic structures (referred to herein as "alicyclic"

or "cycloaliphatic"). The term "non-aromatic," however, is not intended to exclude any aromatic substituents which may be attached to the backbone of an aliphatic or cycloaliphatic diol or dicarboxylic acid. In the present invention, the difunctional carboxylic acid typically is a aliphatic dicarboxylic acid such as, for example, adipic acid, or an aromatic dicarboxylic acid such as, for example, terephthalic acid. The difunctional hydroxyl compound may be cycloaliphatic diol such as, for example, 1,4-cyclohexanedimethanol, a linear or branched aliphatic diol such as, for example, 1,4-butanediol, or an aromatic diol such as, for example, hydroquinone.

The AAPE may be a linear or branched random copolyester and/or chain extended copolyester comprising diol residues which comprise the residues of one or more substituted or unsubstituted, linear or branched, diols selected from aliphatic diols containing 2 to 8 carbon atoms, polyalkylene ether glycols containing 2 to 8 carbon atoms, and cycloaliphatic diols containing about 4 to about 12 carbon atoms. The substituted diols, typically, will comprise 1 to 4 substituents independently selected from halo, $C_6$-$C_{10}$ aryl, and $C_1$-$C_4$ alkoxy. Examples of diols which may be used include, but are not limited to, ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclo-hexanedimethanol, 2,2,4,4-tetramethyl-1,3-cyclobutanediol, triethylene glycol, and tetraethylene glycol. The AAPE also comprises diacid residues which contain about 35 to about 99 mole percent, based on the total moles of diacid residues, of the residues of one or more substituted or unsubstituted, linear or branched, non-aromatic dicarboxylic acids selected from aliphatic dicarboxylic acids containing 2 to 12 carbon atoms and cycloaliphatic acids containing about 5 to 10 carbon atoms. The substituted non-aromatic dicarboxylic acids will typically contain 1 to about 4 substituents selected from halo, $C_6$-$C_{10}$ aryl, and $C_1$-$C_4$ alkoxy. Non-limiting examples of non-aromatic diacids include malonic, succinic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornane-dicarboxylic. In addition to the non-aromatic dicarboxylic acids, the AAPE comprises about 1 to about 65 mole percent, based on the total moles of diacid residues, of the residues of one or more substituted or unsubstituted aromatic dicarboxylic acids containing 6 to about 10 carbon atoms. In the case where substituted aromatic dicarboxylic acids are used, they will typically contain 1 to about 4 substituents selected from halo, $C_6$-$C_{10}$ aryl, and $C_1$-$C_4$ alkoxy. Non-limiting examples of aromatic dicarboxylic acids which may be used in the AAPE of our invention are terephthalic acid, isophthalic acid, salts of 5-sulfoisophthalic acid, and 2,6-naphthalenedicarboxylic acid. More preferably, the non-aromatic dicarboxylic acid will comprise adipic acid, the aromatic dicarboxylic acid will comprise terephthalic acid, and the diol will comprise 1,4-butanediol.

Other possible compositions for the AAPE are those prepared from the following diols and dicarboxylic acids (or polyester-forming equivalents thereof such as diesters) in the following mole percentages, based on 100 mole percent of a diacid component and 100 mole percent of a diol component:

(1) glutaric acid (about 30 to about 75 mole percent), terephthalic acid (about 25 to about 70 mole percent), 1,4-butanediol (about 90 to 100 mole percent), and modifying diol (0 about 10 mole percent);

(2) succinic acid (about 30 to about 95 mole percent), terephthalic acid (about 5 to about 70 mole percent), 1,4-butanediol (about 90 to 100 mole percent), and modifying diol (0 to about 10 mole percent); and (3) adipic acid (about 30 to about 75 mole percent), terephthalic acid (about 25 to about 70 mole percent), 1,4-butanediol (about 90 to 100 mole percent), and modifying diol (0 to about 10 mole percent).

The modifying diol preferably is selected from 1,4-cyclohexanedimethanol, triethylene glycol, polyethylene glycol, and neopentyl glycol. The most preferred AAPEs are linear, branched, or chain extended copolyesters comprising about 50 to about 60 mole percent adipic acid residues, about 40 to about 50 mole percent terephthalic acid residues, and at least 95 mole percent 1,4-butanediol residues. Even more preferably, the adipic acid residues comprise about 55 to about 60 mole percent, the terephthalic acid residues comprise about 40 to about 45 mole percent, and the diol residues comprise about 95 mole percent 1,4-butanediol residues. Such compositions are commercially available under the trademark EASTAR BIO® copolyester from Eastman Chemical Company, Kingsport, Tenn., and under the trademark ECOFLEX® from BASF Corporation.

Additional, specific examples of preferred AAPEs include a poly(tetra-methylene glutarate-co-terephthalate) containing (a) 50 mole percent glutaric acid residues, 50 mole percent terephthalic acid residues, and 100 mole percent 1,4-butanediol residues, (b) 60 mole percent glutaric acid residues, 40 mole percent terephthalic acid residues, and 100 mole percent 1,4-butanediol residues, or (c) 40 mole percent glutaric acid residues, 60 mole percent terephthalic acid residues, and 100 mole percent 1,4-butanediol residues; a poly (tetramethylene succinate-co-terephthalate) containing (a) 85 mole percent succinic acid residues, 15 mole percent terephthalic acid residues, and 100 mole percent 1,4-butanediol residues or (b) 70 mole percent succinic acid residues, 30 mole percent terephthalic acid residues, and 100 mole percent 1,4-butanediol residues; a poly(ethylene succinate-co-terephthalate) containing 70 mole percent succinic acid residues, 30 mole percent terephthalic acid residues, and 100 mole percent ethylene glycol residues; and a poly(tetramethylene adipate-co-terephthalate) containing (a) 85 mole percent adipic acid residues, 15 mole percent terephthalic acid residues, and 100 mole percent 1,4-butanediol residues; or (b) 55 mole percent adipic acid residues, 45 mole percent terephthalic acid residues, and 100 mole percent 1,4-butanediol residues.

The AAPE preferably comprises from about 10 to about 1,000 repeating units and preferably, from about 15 to about 600 repeating units. The AAPE may have an inherent viscosity of about 0.4 to about 2.0 dL/g, or more preferably about 0.7 to about 1.6 dL/g, as measured at a temperature of 25° C. using a concentration of 0.5 g copolyester in 100 ml of a 60/40 by weight solution of phenol/tetrachloroethane.

The AAPE, optionally, may contain the residues of a branching agent. The mole percent ranges for the branching agent are from about 0 to about 2 mole percent, preferably about 0.1 to about 1 mole percent, and most preferably about 0.1 to about 0.5 mole percentbased on the total moles of diacid or diol residues (depending on whether the branching agent contains carboxyl or hydroxyl groups). The branching agent preferably has a weight average molecular weight of about 50 to about 5,000, more preferably about 92 to about 3,000, and a functionality of about 3 to about 6. The branching agent, for example, may be the esterified residue of a polyol having 3 to 6 hydroxyl groups, a polycarboxylic acid having 3 or 4 carboxyl groups (or ester-forming equivalent groups), or a hydroxy acid having a total of 3 to 6 hydroxyl and carboxyl groups. In addition, the AAPE may be branched by the addition of a peroxide during reactive extrusion.

The water non-dispersible component of the multicomponent fiber may comprise any of those water non-dispersible synthetic polymers described previously. Spinning of the fiber may also occur according to any method described herein. However, the improved rheological properties of the multicomponent fibers in accordance with this aspect of the invention provide for enhanced drawings speeds. When the sulfopolyester and water non-dispersible synthetic polymer are extruded to produce multicomponent extrudates, the multicomponent extrudate is capable of being melt drawn to produce the multicomponent fiber, using any of the methods disclosed herein, at a speed of at least about 2,000, 3,000, 4,000, or 4,500 m/min. Although not intending to be bound by theory, melt drawing of the multicomponent extrudates at these speeds results in at least some oriented crystallinity in the water non-dispersible component of the multicomponent fiber. This oriented crystallinity can increase the dimensional stability of nonwoven materials made from the multicomponent fibers during subsequent processing.

Another advantage of the multicomponent extrudate is that it can be melt drawn to a multicomponent fiber having an as-spun denier of less than 15, 10, 5, or 2.5 deniers per filament.

Therefore, in another embodiment of the invention, a multicomponent extrudate having a shaped cross section, comprising:

(a) at least one water dispersible sulfopolyester; and (b) a plurality of domains comprising one or more water non-dispersible synthetic polymers immiscible with the sulfopolyester, wherein the domains are substantially isolated from each other by the sulfopolyester intervening between the domains, wherein the extrudate is capable of being melt drawn at a speed of at least about 2000 m/min.

Optionally, the drawn fibers may be textured and wound-up to form a bulky continuous filament. This one-step technique is known in the art as spin-draw-texturing. Other embodiments include flat filament (non-textured) yarns, or cut staple fiber, either crimped or uncrimped.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

A sulfopolyester polymer was prepared with the following diacid and diol composition: diacid composition (71 mole percent terephthalic acid, 20 mole percent isophthalic acid, and 9 mole percent 5-(sodiosulfo) isophthalic acid) and diol composition (60 mole percent ethylene glycol and 40 mole percent diethylene glycol). The sulfopolyester was prepared by high temperature polyesterification under a vacuum. The esterification conditions were controlled to produce a sulfopolyester having an inherent viscosity of about 0.31. The melt viscosity of this sulfopolyester was measured to be in the range of about 3,000 to 4,000 poise at 240° C. and 1 rad/sec shear rate.

Example 2

The sulfopolyester polymer of Example 1 was spun into bicomponent segmented pie fibers and formed into a nonwoven web according to the procedure described in Example 9 of U.S. 2008/0311815, herein incorporated by reference. During the process, the primary extruder (A) fed Eastman F61 HC PET polyester melt to form the larger segment slices into the segmented pie structure. The extrusion zones were set to melt the PET entering the spinnerette die at a temperature of 285° C. The secondary extruder (B) processed the sulfopolyester polymer of Example 1, which was fed at a melt temperature of 255° C. into the spinnerette die. The melt throughput rate per hole was 0.6 gm/min. The volume ratio of PET to sulfopolyester in the bicomponent extrudates was set at 70/30, which represents the weight ratio of about 70/30. The cross-section of the bicomponent extrudates had wedge shaped domains of PET with sulfopolyester polymer separating these domains.

The bicomponent extrudates were melt drawn using the same aspirator assembly used in Comparative Example 8 of U.S. 2008/0311815, herein incorporated by reference. The maximum available pressure of the air to the aspirator without breaking the bicomponent fibers during drawing was 45 psi. Using 45 psi air, the bicomponent extrudates were melt drawn down to bicomponent fibers with as-spun denier of about 1.2 with the bicomponent fibers exhibiting a diameter of about 11 to 12 microns when viewed under a microscope. The speed during the melt drawing process was calculated to be about 4,500 m/min.

The bicomponent fibers were laid down into nonwoven webs having weights of 140 gsm and 110 gsm. The shrinkage of the webs was measured by conditioning the material in a forced-air oven for five minutes at 120° C. The area of the nonwoven webs after shrinkage was about 29 percent of the webs' starting areas.

Microscopic examination of the cross section of the melt drawn fibers and fibers taken from the nonwoven web displayed a very good segmented pie structure where the individual segments were clearly defined and exhibited similar size and shape. The PET segments were completely separated from each other so that they would form eight separate PET monocomponent fibers having a pie-slice shape after removal of the sulfopolyester from the bicomponent fiber.

The nonwoven web, having a 110 gsm fabric weight, was soaked for eight minutes in a static deionized water bath at various temperatures. The soaked nonwoven web was dried and the percent weight loss due to soaking in deionized water at the various temperatures was measured as shown in Table 2.

TABLE 2

| Soaking Temperature | 36° C. | 41° C. | 46° C. | 51° C. | 56° C. | 72° C. |
|---|---|---|---|---|---|---|
| Nonwoven Web Weight Loss | 1.1 | 2.2 | 14.4 | 25.9 | 28.5 | 30.5 |

The sulfopolyester polymer dissipated very readily into deionized water at temperatures above about 46° C., with the removal of the sulfopolyester polymer from the fibers being very extensive or complete at temperatures above 51° C. as shown by the weight loss. A weight loss of about 30 percent represented complete removal of the sulfopolyester from the bicomponent fibers in the nonwoven web. If hydroentanglement is used to process this nonwoven web of bicomponent fibers comprising this sulfopolyester, it would be expected that the polymer would not be extensively removed by the hydroentangling water jets at water temperatures below 40° C.

Example 3

The nonwoven webs of Example 2 having basis weights of both 140 gsm and 110 gsm were hydroentangled using a hydroentangling apparatus manufactured by Fleissner, GmbH, Egelsbach, Germany. The machine had five total hydroentangling stations wherein three sets of jets contacted the top side of the nonwoven web and two sets of jets contacted the opposite side of the nonwoven web. The water jets comprised a series of fine orifices about 100 microns in diameter machined in two-feet wide jet strips. The water pressure to the jets was set at 60 bar (Jet Strip #1), 190 bar (Jet Strips #2 and 3), and 230 bar (Jet Strips #4 and 5). During the hydroentanglement process, the temperature of the water to the jets was found to be in the range of about 40 to 45° C. The nonwoven fabric exiting the hydroentangling unit was strongly tied together. The continuous fibers were knotted together to produce a hydroentangled nonwoven fabric with high resistance to tearing when stretched in both directions.

Next, the hydroentangled nonwoven fabric was fastened onto a tenter frame comprising a rigid rectangular frame with a series of pins around the periphery thereof. The fabric was fastened to the pins to restrain the fabric from shrinking as it was heated. The frame with the fabric sample was placed in a forced-air oven for three minutes at 130° C. to cause the fabric to heat set while being restrained. After heat setting, the conditioned fabric was cut into a sample specimen of measured size and the specimen was conditioned at 130° C. without restraint by a tenter frame. The dimensions of the hydroentangled nonwoven fabric after this conditioning were measured and only minimal shrinkage (<0.5 percent reduction in dimension) was observed. It was apparent that heat setting of the hydroentangled nonwoven fabric was sufficient to produce a dimensionally stable nonwoven fabric.

The hydroentangled nonwoven fabric, after being heat set as described above, was washed in 90° C. deionized water to remove the sulfopolyester polymer and leave the PET monocomponent fiber segments remaining in the hydroentangled fabric.

After repeated washings, the dried fabric exhibited a weight loss of approximately 26 percent. Washing the nonwoven web before hydroentangling demonstrated a weight loss of 31.3 percent. Therefore, the hydroentangling process removed some of the sulfopolyester from the nonwoven web, but this amount was relatively small. In order to lessen the amount of sulfopolyester removed during hydroentanglement, the water temperature of the hydroentanglement jets should be lowered to below 40° C.

The sulfopolyester of Example 1 was found to produce segmented pie fibers having good segment distribution wherein the water non-dispersable polymer segments formed individual fibers of similar size and shape after removal of the sulfopolyester polymer. The rheology of the sulfopolyester was suitable to allow the bicomponent extrudates to be melt drawn at high rates to achieve fine denier bicomponent fibers with as-spun denier as low as about 1.0. These bicomponent fibers are capable of being laid down into a nonwoven web, which could be hydroentangled without experiencing significant loss of sulfopolyester polymer to produce the nonwoven fabric. The nonwoven fabric produced by hydroentangling the nonwoven web exhibited high strength and could be heat set at temperatures of about 120° C. or higher to produce a nonwoven fabric with excellent dimensional stability. The sulfopolyester polymer was removed from the hydroentangled nonwoven fabric in a washing step. This resulted in a strong nonwoven fabric product with a lighter fabric weight, greater flexibility, and softer hand. The PET microfibers in this nonwoven fabric product were wedge shaped and exhibited an average denier of about 0.1.

Example 4

A sulfopolyester polymer was prepared with the following diacid and diol composition: diacid composition (69 mole percent terephthalic acid, 22.5 mole percent isophthalic acid, and 8.5 mole percent 5-(sodiosulfo) isophthalic acid) and diol composition (65 mole percent ethylene glycol and 35 mole percent diethylene glycol). The sulfopolyester was prepared by high temperature polyesterification under a vacuum. The esterification conditions were controlled to produce a sulfopolyester having an inherent viscosity of about 0.33. The melt viscosity of this sulfopolyester was measured to be in the range of about 6000 to 7000 poise at 240° C. and 1 rad/sec shear rate.

Example 5

The sulfopolyester polymer of Example 4 was spun into bicomponent fibers having an islands-in-sea cross-section configuration with 16 islands on a spunbond line. The primary extruder (A) fed Eastman F61 HC PET polyester melt to form the islands in the islands-in-sea structure. The extrusion zones were set to melt the PET entering the spinnerette die at a temperature of about 290° C. The secondary extruder (B) processed the sulfopolyester polymer of Example 4, which was fed at a melt temperature of about 260° C. into the spinnerette die. The volume ratio of PET to sulfopolyester in the bicomponent extrudates was set at 70/30, which represents the weight ratio of about 70/30. The melt throughput rate through the spinneret was 0.6 g/hole/minute. The cross-section of the bicomponent extrudates had round shaped island domains of PET with sulfopolyester polymer separating these domains.

The bicomponent extrudates were melt drawn using an aspirator assembly. The maximum available pressure of air to the aspirator without breaking the bicomponent fibers during melt drawing was 50 psi. Using 50 psi air, the bicomponent extrudates were melt drawn down to bicomponent fibers with an as-spun denier of about 1.4 with the bicomponent fibers exhibiting a diameter of about 12 microns when viewed under a microscope. The speed during the drawing process was calculated to be about 3,900 m/min.

Example 6

The sulfopolyester polymer of Example 4 was spun into bicomponent islands-in-the-sea cross-section fibers with 64 islands fibers using a bicomponent extrusion line. The primary extruder (A) fed Eastman F61HC PET polyester melt to form the islands in the islands-in-the-sea fiber cross-section structure. The secondary extruder (B) fed the sulfopolyester polymer melt to form the sea in the islands-in-sea bicomponent fiber.

The inherent viscosity of polyester was 0.61 dL/g while the melt viscosity of the dry sulfopolyester was about 7,000 poise measured at 240° C. and 1 rad/sec strain rate using the melt viscosity measurement procedure described earlier. These islands-in-sea bicomponent fibers were made using a spinneret with 198 holes and a throughput rate of 0.85 gms/minute/hole. The polymer ratio between "islands" polyester and "sea" sulfopolyester was 65 percent to 35 percent. These bicomponent fibers were spun using an extrusion temperature of 280° C. for the polyester component and 260° C. for the sulfopolyester component. The bicomponent fiber contains a multiplicity of filaments (198 filaments) and was melt spun at a speed of about 530 meters/minute, forming filaments with a nominal denier per filament of about 14. A finish solution of 24 weight percent PT 769 finish from Goulston Technologies was applied to the bicomponent fiber using a kiss roll applicator.

The filaments of the bicomponent fiber were then drawn in line using a set of two godet rolls, heated to 90° C. and 130° C. respectively, and the final draw roll operating at a speed of about 1,750 meters/minute, to provide a filament draw ratio of about 3.3× forming the drawn islands-in-sea bicomponent filaments with a nominal denier per filament of about 4.5 or an average diameter of about 25 microns. These filaments comprised the polyester microfiber "islands" having an average diameter of about 2.5 microns.

Example 7

The drawn islands-in-sea bicomponent fibers of Example 6 were cut into short length fibers of 3.2 millimeters and 6.4 millimeters cut lengths, thereby producing short length bicomponent fibers with 64 islands-in-sea cross-section configurations. These short cut bicomponent fibers comprised "islands" of polyester and a "sea" of water dispersible sulfopolyester polymer. The cross-sectional distribution of islands and sea was essentially consistent along the length of these short cut bicomponent fibers.

Example 8

The drawn islands-in-sea bicomponent fibers of Example 6 were soaked in soft water for about 24 hours and then cut into short length fibers of 3.2 millimeters and 6.4 millimeters cut lengths. The water dispersible sulfopolyester was at least partially emulsified prior to cutting into short length fibers. Partial separation of islands from the sea component was therefore effected, thereby producing partially emulsified short length islands-in-sea bicomponent fibers.

Example 9

The short cut length islands-in-sea bicomponent fibers of Example 8 were washed using soft water at 80° C. to remove the water dispersible sulfopolyester "sea" component, thereby releasing the polyester microfibers which were the "islands" component of the bicomponent fibers. The washed polyester microfibers were rinsed using soft water at 25° C. to essentially remove most of the "sea" component. The optical microscopic observation of the washed polyester microfibers showed an average diameter of about 2.5 microns and lengths of 3.2 and 6.4 millimeters.

Comparative Example 10

Wet-laid hand sheets were prepared using the following procedure: 7.5 gms of Albacel Southern Bleached Softwood Kraft (SBSK) from International Paper, Memphis, Tenn., U.S.A., and 188 gms of room temperature water were placed in a 1,000 ml pulper and pulped for 30 seconds at 7,000 rpm to produce a pulped mixture. This pulped mixture was transferred into an 8 liter metal beaker along with 7,312 grams of room temperature water to make about 0.1 percent consistency (7,500 gms water and 7.5 gms fibrous material) pulp slurry. This pulp slurry was agitated using a high speed impeller mixer for 60 seconds. Procedure to make the hand sheet from this pulp slurry was as follows. The pulp slurry was poured into a 25 centimeters×30 centimeters hand sheet mold while continuing to stir. The drop valve was pulled, and the pulp fibers were allowed to drain on a screen to form a hand sheet. 750 grams per square meter (gsm) blotter paper was placed on top of the formed hand sheet, and the blotter paper was flattened onto the hand sheet. The screen frame was raised and inverted onto a clean release paper and allowed to sit for 10 minutes. The screen was raised vertically away from the formed hand sheet. Two sheets of 750 gsm blotter paper were placed on top of the formed hand sheet. The hand sheet was dried along with the three blotter papers using a Norwood Dryer at about 88° C. for 15 minutes. One blotter paper was removed leaving one blotter paper on each side of the hand sheet. The hand sheet was dried using a Williams Dryer at 65° C. for 15 minutes. The hand sheet was then further dried for 12 to 24 hours using a 40 kg dry press. The blotter paper was removed to obtain the dry hand sheet sample. The hand sheet was trimmed to 21.6 centimeters by 27.9 centimeters dimensions for testing.

Comparative Example 11

Wet-laid hand sheets were prepared using the following procedure: 7.5 gms of Albacel Southern Bleached Softwood Kraft (SBSK) from International Paper, Memphis, Tenn., U.S.A., 0.3 gms of Solivitose N pre-gelatinized quaternary cationic potato starch from Avebe, Foxhol, the Netherlands, and 188 gms of room temperature water were placed in a 1,000 ml pulper and pulped for 30 seconds at 7,000 rpm to produce a pulped mixture. This pulped mixture was transferred into an 8 liter metal beaker along with 7,312 gms of room temperature water to make about 0.1 percent consistency (7,500 gms water and 7.5 gms fibrous material) to produce a pulp slurry. This pulp slurry was agitated using a high speed impeller mixer for 60 seconds. The rest of procedure for making hand sheet from this pulp slurry was same as in Comparative Example 10.

Example 12

Wet-laid hand sheets were prepared using the following procedure. 6.0 gms of Albacel Southern Bleached Softwood Kraft (SBSK) from International Paper, Memphis, Tenn., U.S.A., 0.3 gms of Solivitose N pre-gelatinized quaternary cationic potato starch from Avebe, Foxhol, the Netherlands, 1.5 gms of 3.2 millimeter cut length islands-in-sea fibers of Example 7 and 188 gms of room temperature water were placed in a 1,000 ml pulper and pulped for 30 seconds at 7,000 rpm to produce a fiber mix slurry. This fiber mix slurry was heated to 82° C. for 10 seconds to emulsify and remove the water dispersible sulfopolyester component in the islands-in-sea fibers and release the polyester microfibers. The fiber mix slurry was then strained to produce a sulfopolyester dispersion comprising the sulfopolyester and a microfiber-containing mixture comprising pulp fibers and polyester microfiber. The microfiber-containing mixture was further rinsed using 500 gms of room temperature water to further remove the water dispersible sulfopolyester from the microfiber-containing mixture. This microfiber-containing mixture was transferred into an 8 liter metal beaker along with 7,312 gms of room temperature water to make about 0.1 percent consistency (7,500 gms water and 7.5 gms fibrous material) to produce a microfiber-containing slurry. This microfiber-containing slurry was agitated using a high speed impeller mixer for 60 seconds. The rest of procedure for making hand sheet from this microfiber-containing slurry was same as in Comparative Example 10.

Comparative Example 13

Wet-laid hand sheets were prepared using the following procedure. 7.5 gms of MicroStrand 475-106 micro glass fiber available from Johns Manville, Denver, Colo., U.S.A., 0.3 gms of Solivitose N pre-gelatinized quaternary cationic potato starch from Avebe, Foxhol, the Netherlands, and 188 gms of room temperature water were placed in a 1,000 ml pulper and pulped for 30 seconds at 7,000 rpm to produce a glass fiber mixture. This glass fiber mixture was transferred into an 8 liter metal beaker along with 7,312 gms of room temperature water to make about 0.1 percent consistency (7,500 gms water and 7.5 gms fibrous material) to produce a glass fiber slurry. This glass fiber slurry was agitated using a high speed impeller mixer for 60 seconds. The rest of procedure for making hand sheet from this glass fiber slurry was same as in Comparative Example 10.

Example 14

Wet-laid hand sheets were prepared using the following procedure. 3.8 gms of MicroStrand 475-106 micro glass fiber available from Johns Manville, Denver, Colo., U.S.A., 3.8 gms of 3.2 millimeter cut length islands-in-sea fibers of Example 7, 0.3 gms of Solivitose N pre-gelatinized quaternary cationic potato starch from Avebe, Foxhol, the Netherlands, and 188 gms of room temperature water were placed in a 1,000 ml pulper and pulped for 30 seconds at 7,000 rpm to produce a fiber mix slurry. This fiber mix slurry was heated to 82° C. for 10 seconds to emulsify and remove the water dispersible sulfopolyester component in the islands-in-sea bicomponent fibers and release polyester microfibers. The fiber mix slurry was then strained to produce a sulfopolyester dispersion comprising the sulfopolyester and a microfiber-containing mixture comprising glass microfibers and polyester microfiber. The microfiber-containing mixture was further rinsed using 500 gms of room temperature water to further remove the sulfopolyester from the microfiber-containing mixture. This microfiber-containing mixture was transferred into an 8 liter metal beaker along with 7,312 gms of room temperature water to make about 0.1 percentconsistency (7,500 gms water and 7.5 gms fibrous material) to produce a microfiber-containing slurry. This microfiber-containing slurry was agitated using a high speed impeller mixer for 60 seconds. The rest of procedure for making hand sheet from this microfiber-containing slurry was same as in Comparative Example 10.

Example 15

Wet-laid hand sheets were prepared using the following procedure. 7.5 gms of 3.2 millimeter cut length islands-in-sea fibers of Example 7, 0.3 gms of Solivitose N pre-gelatinized quaternary cationic potato starch from Avebe, Foxhol, the Netherlands, and 188 gms of room temperature water were placed in a 1,000 ml pulper and pulped for 30 seconds at 7,000 rpm to produce a fiber mix slurry. This fiber mix slurry was heated to 82° C. for 10 seconds to emulsify and remove the water dispersible sulfopolyester component in the islands-in-sea fibers and release polyester microfibers. The fiber mix slurry was then strained to produce a sulfopolyester dispersion and polyester microfibers. The sulfopolyester dispersion was comprised of water dispersible sulfopolyester. The polyester microfibers were rinsed using 500 gms of room temperature water to further remove the sulfopolyester from the polyester microfibers. These polyester microfibers were transferred into an 8 liter metal beaker along with 7,312 gms of room temperature water to make about 0.1 percent consistency (7,500 gms water and 7.5 gms fibrous material) to produce a microfiber slurry. This microfiber slurry was agitated using a high speed impeller mixer for 60 seconds. The rest of procedure for making hand sheet from this microfiber slurry was same as in Comparative Example 10.

The hand sheet samples of Examples 10-15 were tested and properties are provided in Table 3.

TABLE 3

| Example Number | Composition | Basis Weight (gsm) | Hand Sheet Thickness (mm) | Density (gm/cc) | Porosity Greiner (seconds/100 cc) | Tensile Strength (kg/15 mm) | Elongation to Break (%) | Tensile × Elongation |
|---|---|---|---|---|---|---|---|---|
| 10 | 100% SBSK | 94 | 0.45 | 0.22 | 4 | 1.0 | 7 | 7 |
| 11 | SBSK + 4% Starch | 113 | 0.44 | 0.22 | 4 | 1.5 | 7 | 11 |
| 12 | 80 SBSK + Starch + 20% 3.2 mm polyester microfibers of Example 9 | 116 | 0.30 | 0.33 | 4 | 2.2 | 9 | 20 |
| 13 | 100% Glass MicroStrand 475-106 + Starch | 103 | 0.68 | 0.15 | 4 | 0.2 | 15 | 3 |
| 14 | 50% Glass Microstand 475-106 + 50% 3.2 mm polyester microfibers of Example 9 + Starch | 104 | 0.45 | 0.22 | 4 | 1.4 | 7 | 10 |

TABLE 3-continued

| Example Number | Composition | Basis Weight (gsm) | Hand Sheet Thickness (mm) | Density (gm/cc) | Porosity Greiner (seconds/ 100 cc) | Tensile Strength (kg/15 mm) | Elongation to Break (%) | Tensile × Elongation |
|---|---|---|---|---|---|---|---|---|
| 15 | 100% 3.2 mm polyester microfibers of Example 9 | 80 | 0.38 | 0.26 | 4 | 3.0 | 15 | 44 |

The hand sheet basis weight was determined by weighing the hand sheet and calculating weight in grams per square meter (gsm). Hand sheet thickness was measured using an Ono Sokki EG-233 thickness gauge and reported as thickness in millimeters. Density was calculated as weight in grams per cubic centimeter. Porosity was measured using a Greiner Porosity Manometer with $1.9 \times 1.9$ cm$^2$ opening head and 100 cc capacity. Porosity is reported as average time in seconds (4 replicates) for 100 cc of water to pass through the sample. Tensile properties were measured using an Instron Model TM for six 30 mm×105 mm test strips. An average of six measurements is reported for each example. It can be observed from these test results that significant improvement in tensile properties of wet-laid fibrous structures is obtained by the addition of polyester microfibers of the current invention.

Example 16

The sulfopolyester polymer of Example 4 was spun into bicomponent islands-in-the-sea cross-section fibers with 37 islands using a bicomponent extrusion line. The primary extruder (A) fed Eastman F61HC PET polyester to form the "islands" in the islands-in-the-sea cross-section structure. The secondary extruder (B) fed the water dispersible sulfopolyester polymer to form the "sea." The inherent viscosity of the polyester was 0.61 dL/g while the melt viscosity of the dry sulfopolyester was about 7,000 poise measured at 240° C. and 1 rad/sec strain rate using the melt viscosity measurement procedure described previously. These islands-in-sea bicomponent fibers were made using a spinneret with 72 holes and a throughput rate of 1.15 gms/minute/hole. The polymer ratio between "islands" polyester and "sea" sulfopolyester was 2 to 1. These bicomponent fibers were spun using an extrusion temperature of 280° C. for the polyester component and 255° C. for the water dispersible sulfopolyester component. This bicomponent fiber contained a multiplicity of filaments (198 filaments) and was melt spun at a speed of about 530 meters/minute forming filaments with a nominal denier per filament of 19.5. A finish solution of 24 percent by weight PT 769 finish from Goulston Technologies was applied to the bicomponent fiber using a kiss roll applicator. The filaments of the bicomponent fiber were then drawn in line using a set of two godet rolls, heated to 95° C. and 130° C., respectively, and the final draw roll operating at a speed of about 1,750 meters/minute, to provide a filament draw ratio of about 3.3× forming the drawn islands-in-sea bicomponent filaments with a nominal denier per filament of about 5.9 or an average diameter of about 29 microns. These filaments comprising the polyester microfiber islands had an average diameter of about 3.9 microns.

Example 17

The drawn islands-in-sea bicomponent fibers of Example 16 were cut into short length bicomponent fibers of 3.2 millimeters and 6.4 millimeters cut length, thereby, producing short length fibers with 37 islands-in-sea cross-section configurations. These fibers comprised "islands" of polyester and a "sea" of water dispersible sulfopolyester polymers. The cross-sectional distribution of "islands" and "sea" was essentially consistent along the length of these bicomponent fibers.

Example 18

The short cut length islands-in-sea fibers of Example 17 were washed using soft water at 80° C. to remove the water dispersible sulfopolyester "sea" component, thereby releasing the polyester microfibers which were the "islands" component of the bicomponent fibers. The washed polyester microfibers were rinsed using soft water at 25° C. to essentially remove most of the "sea" component. The optical microscopic observation of the washed polyester microfibers had an average diameter of about 3.9 microns and lengths of 3.2 and 6.4 millimeters.

Example 19

The sulfopolyester polymer of Example 4 was spun into bicomponent islands-in-the-sea cross-section fibers with 37 islands using a bicomponent extrusion line. The primary extruder (A) fed polyester to form the "islands" in the islands-in-the-sea fiber cross-section structure. The secondary extruder (B) fed the water dispersible sulfopolyester polymer to form the "sea" in the islands-in-sea bicomponent fiber. The inherent viscosity of the polyester was 0.52 dL/g while the melt viscosity of the dry water dispersible sulfopolyester was about 3,500 poise measured at 240° C. and 1 rad/sec strain rate using the melt viscosity measurement procedure described previously. These islands-in-sea bicomponent fibers were made using two spinnerets with 175 holes each and a throughput rate of 1.0 gms/minute/hole. The polymer ratio between the "islands" polyester and "sea" sulfopolyester was 70 percent to 30 percent. These bicomponent fibers were spun using an extrusion temperature of 280° C. for the polyester component and 255° C. for the sulfopolyester component. The bicomponent fibers contained a multiplicity of filaments (350 filaments) and were melt spun at a speed of about 1,000 meters/minute using a take-up roll heated to 100° C. forming filaments with a nominal denier per filament of about 9 and an average fiber diameter of about 36 microns. A finish solution of 24 weight percent PT 769 finish was applied to the bicomponent fiber using a kiss roll applicator. The filaments of the bicomponent fiber were combined and were then drawn 3.0× on a draw line at draw roll speed of 100 m/minute and temperature of 38° C. forming drawn islands-in-sea bicomponent filaments with an average denier per filament of about 3 and average diameter of about 20 microns. These drawn island-in-sea bicomponent fibers were cut into short length fibers of about 6.4 millimeters length. These short length islands-in-sea bicomponent fibers were comprised of polyester microfiber "islands" having an average diameter of about 2.8 microns.

Example 20

The short cut length islands-in-sea bicomponent fibers of Example 19 were washed using soft water at 80° C. to remove the water dispersible sulfopolyester "sea" component, thereby releasing the polyester microfibers which were the "islands" of the fibers. The washed polyester microfibers were rinsed using soft water at 25° C. to essentially remove most of the "sea" component. The optical microscopic observation of washed fibers showed polyester microfibers of average diameter of about 2.8 microns and lengths of about 6.4 millimeters.

Example 21

Wet-laid microfiber stock hand sheets were prepared using the following procedure. 56.3 gms of 3.2 millimeter cut length islands-in-sea bicomponent fibers of Example 6, 2.3 gms of Solivitose N pre-gelatinized quaternary cationic potato starch from Avebe, Foxhol, the Netherlands, and 1,410 gms of room temperature water were placed in a 2 liter beaker to produce a fiber slurry. The fiber slurry was stirred. One quarter amount of this fiber slurry, about 352 ml, was placed in a 1,000 ml pulper and pulped for 30 seconds at 7,000 rpm. This fiber slurry was heated to 82° C. for 10 seconds to emulsify and remove the water dispersible sulfopolyester component in the islands-in-sea bicomponent fibers and release the polyester microfibers. The fiber slurry was then strained to produce a sulfopolyester dispersion and polyester microfibers. These polyester microfibers were rinsed using 500 gms of room temperature water to further remove the sulfopolyester from the polyester microfibers. Sufficient room temperature water was added to produce 352 ml of microfiber slurry. This microfiber slurry was re-pulped for 30 seconds at 7,000 rpm. These microfibers were transferred into an 8 liter metal beaker. The remaining three quarters of the fiber slurry were similarly pulped, washed, rinsed, re-pulped, and transferred to the 8 liter metal beaker. 6,090 gms of room temperature water was then added to make about 0.49 percent consistency (7,500 gms water and 36.6 gms of polyester microfibers) to produce a microfiber slurry. This microfiber slurry was agitated using a high speed impeller mixer for 60 seconds. The rest of procedure for making hand sheet from this microfiber slurry was same as in Comparative Example 10. The microfiber stock hand sheet with the basis weight of about 490 gsm was comprised of polyester microfibers of average diameter of about 2.5 microns and average length of about 3.2 millimeters.

Example 22

Wet-laid hand sheets were prepared using the following procedure. 7.5 gms of polyester microfiber stock hand sheet of Example 21, 0.3 gms of Solivitose N pre-gelatinized quaternary cationic potato starch from Avebe, Foxhol, the Netherlands, and 188 gms of room temperature water were placed in a 1,000 ml pulper and pulped for 30 seconds at 7,000 rpm. The microfibers were transferred into an 8 liter metal beaker along with 7,312 gms of room temperature water to make about 0.1 percent consistency (7,500 gms water and 7.5 gms fibrous material) to produce a microfiber slurry. This microfiber slurry was agitated using a high speed impeller mixer for 60 seconds. The rest of procedure for making hand sheet from this slurry was same as in Comparative Example 10. A 100 gsm wet-laid hand sheet of polyester microfibers was obtained having an average diameter of about 2.5 microns.

Example 23

The 6.4 millimeter cut length islands-in-sea bicomponent fibers of Example 19 were washed using soft water at 80° C. to remove the water dispersible sulfopolyester "sea" component, thereby releasing the polyester microfibers which were the "islands" component of the bicomponent fibers. The washed polyester microfibers were rinsed using soft water at 25° C. to essentially remove most of the "sea" component. The optical microscopic observation of the washed polyester microfibers showed an average diameter of about 2.5 microns and lengths of 6.4 millimeters.

Example 24

The short cut length islands-in-sea bicomponent fibers of Example 6, Example 16, and Example 19 were washed separately using soft water at 80° C. containing about 1 percent by weight based on the weight of the bicomponent fibers of ethylene diamine tetra acetic acid tetra sodium salt ($Na_4$ EDTA) from Sigma-Aldrich Company, Atlanta, Ga., to remove the water dispersible sulfopolyester "sea" component, thereby releasing the polyester microfibers which were the "islands" of the bicomponent fibers. The addition of at least one water softener, such as $Na_4$ EDTA, aids in the removal of the water dispersible sulfopolyester polymer from the islands-in-sea bicomponent fibers. The washed polyester microfibers were rinsed using soft water at 25° C. to essentially remove most of the "sea" component. The optical microscopic observation of washed polyester microfibers showed excellent release and separation of polyester microfibers. Use of a water softening agent such as $Na_4$ EDTA in the water prevents any $Ca^{++}$ ion exchange on the sulfopolyester, which can adversely affect the water dispersiblity of sulfopolyester. Typical soft water may contain up to 15 ppm of $Ca^{++}$ ion concentration. It is desirable that the soft water used in the processes described here should have essentially zero concentration of $Ca^{++}$ and other multi-valent ions, or alternately, use sufficient amount of water softening agent, such as $Na_4$ EDTA, to bind the $Ca^{++}$ ions and other multi-valent ions. These polyester microfibers can be used in preparing the wet-laid sheets using the procedures of examples disclosed previously.

Example 25

The short cut length islands-in-sea bicomponent fibers of Example 6 and Example 16 were processed separately using the following procedure: 17 grams of Solivitose N pre-gelatinized quaternary cationic potato starch from Avebe, Foxhol, the Netherlands, were added to distilled water. After the starch was fully dissolved or hydrolyzed, then 429 grams of short cut length islands-in-sea bicomponent fibers were slowly added to the distilled water to produce a fiber slurry. A Williams Rotary Continuous Feed Refiner (5 inch diameter) was turned on to refine or mix the fiber slurry in order to provide sufficient shearing action for the water dispersible sulfopolyester to be separated from the polyester microfibers. The contents of the stock chest were poured into a 24 liter stainless steel container and the lid was secured. The stainless steel container was placed on a propane cooker and heated until the fiber slurry began to boil at about 97° C. in order to remove the sulfopolyester component in the island-in-sea fibers and release polyester microfibers. After the fiber slurry reached boiling, it was agitated with a manual agitating paddle. The contents of the stainless steel container were poured into a 27 in×15 in×6 in deep False Bottom Knuche with a 30 mesh screen to produce a sulfopolyester dispersion and polyester microfibers. The sulfopolyester dispersion comprised water and water dispersible sulfopolyester. The polyester microfibers were rinsed in the Knuche for 15 seconds with 10 liters of soft water at 17° C., and squeezed to remove excess water.

After removing excess water, 20 grams of polyester microfiber (dry fiber basis) was added to 2,000 ml of water at 70° C. and agitated using a 2 liter 3000 rpm ¾ horse power hydropulper manufactured by Hermann Manufacturing Company for 3 minutes (9,000 revolutions) to make a microfiber slurry of 1 percent consistency. Handsheets were made using the procedure described previously in Comparative Example 10.

The optical and scanning electron microscopic observation of these handsheets showed excellent separation and formation of polyester microfibers.

Example 26

The sulfopolyester polymer of Example 4 was spun into bicomponent islands-in-the-sea cross-section fibers with 37 islands using a bicomponent extrusion line. The primary extruder (A) fed Eastman F61HC PET polyester to form the "islands" in the islands-in-the-sea cross-section structure. The secondary extruder (B) fed the water dispersible sulfopolyester polymer to form the "sea" in the islands-in-sea bicomponent fiber. The inherent viscosity of the polyester was 0.61 dlg while the melt viscosity of the dry sulfopolyester was about 7,000 poise measured at 240° C. and 1 rad/sec strain rate using the melt viscosity measurement procedure described previously. These islands-in-sea bicomponent fibers were made using a spinneret with 72 holes. The polymer ratio between "islands" polyester and "sea" sulfopolyester was 2.33 to 1.

These bicomponent fibers were spun using an extrusion temperature of 280° C. for the polyester component and 255° C. for the water dispersible sulfopolyester component. This bicomponent fiber contained a multiplicity of filaments (198 filaments) and was melt spun at a speed of about 530 meters/minute, forming filaments with a nominal denier per filament of 19.5. A finish solution of 18 percent by weight PT 769 finish from Goulston Technologies was applied to the bicomponent fiber using a kiss roll applicator. The filaments of the bicomponent fiber were then drawn in line using a set of two godet rolls, heated to 95° C. and 130° C., respectively, and the final draw roll operating at a speed of about 1,750 meters/minute to provide a filament draw ratio of about 3.3×, thus forming the drawn islands-in-sea bicomponent filaments with a nominal denier per filament of about 3.2. These filaments comprised the polyester microfiber islands having an average diameter of about 2.2 microns.

Example 27

The drawn islands-in-sea bicomponent fibers of Example 26 were cut into short length bicomponent fibers of 1.5 millimeters cut length, thereby producing short length fibers with 37 islands-in-sea cross-section configurations. These fibers comprised "islands" of polyester and a "sea" of water dispersible sulfopolyester polymers. The cross-sectional distribution of "islands" and "sea" was essentially consistent along the length of these bicomponent fibers.

Example 28

The short cut length islands-in-sea fibers of Example 27 were washed using soft water at 80° C. to remove the water dispersible sulfopolyester "sea" component, thereby releasing the polyester microfibers which were the "islands" component of the bicomponent fibers. The washed polyester microfibers were rinsed using soft water at 25° C. to essentially remove most of the "sea" component. The optical microscopic observation of the washed polyester microfibers had an average diameter of about 2.2 microns and a length of 1.5 millimeters.

Example 29

Wet-laid hand sheets were prepared using the following procedure. Two grams total of a mixture of MicroStrand 475-106 glass fiber and the polyester microfiber of Example 28 were added to 2,000 ml of water and agitated using a modified blender for 1 to 2 minutes in order to make a microfiber slurry of 0.1 percent consistency. The pulp slurry was poured into a 25 centimeters×30 centimeters hand sheet mold while continuing to stir. The drop valve was pulled, and the pulp fibers were allowed to drain on a screen to form a hand sheet. 750 grams per square meter (gsm) blotter paper was placed on top of the formed hand sheet, and the blotter paper was flattened onto the hand sheet. The screen frame was raised and inverted onto a clean release paper and allowed to sit for 10 minutes. The screen was raised vertically away from the formed hand sheet. Two sheets of 750 gsm blotter paper were placed on top of the formed hand sheet. The hand sheet was dried along with the three blotter papers using a Norwood Dryer at about 88° C. for 15 minutes. One blotter paper was removed leaving one blotter paper on each side of the hand sheet. The hand sheet was dried using a Williams Dryer at 65° C. for 15 minutes. The hand sheet was then further dried for 12 to 24 hours using a 40 kg dry press. The blotter paper was removed to obtain the dry hand sheet sample. The hand sheet was trimmed to 21.6 centimeters by 27.9 centimeters dimensions for testing. Table 3 describes the physical characteristics of the resulting wet-laid nonwoven media. Coresta porosity and average pore size when reported in these examples were determined using a QuantaChrome Porometer 3G Micro obtained from QuantaChrome Instruments located in Boynton Beach, Fla.

TABLE 4

| Sample[1] | wt % synthetic microfiber[2] | wt % glass microfiber[3] | Tensile strength (kg/15 mm) | Coresta porosity | Pressure drop (mm H$_2$O) | Average pore size (microns) | Filtration efficiency |
|---|---|---|---|---|---|---|---|
| 1 | 100 | 0 | 0.88 | 388 | 8 | 7.4 | 71.0% |
| 2 | 60 | 40 | 0.77 | 288 | 32 | 5.0 | 99.97% |
| 3 | 40 | 60 | 0.71 | 176 | 44 | 3.8 | 99.999% |
| 4 | 0 | 100 | 0.58 | 132 | 55 | 3.2 | 99.999% |

[1] 80 gram per square meter
[2] 2.2 micron in diameter, 1.5 mm in length synthetic microfibers of Example 28
[3] Johns-Manville Microstrand 106X (0.65 micron BET average diameter)

Example 30

Wet-laid hand sheets were prepared using the following procedure: 1.2 grams of MicroStrand 475-106 glass fiber and 0.8 grams of the polyester microfiber of Example 28 (dry fiber basis) were added to 2,000 ml of water and agitated using a modified blender for 1 to 2 minutes to make a microfiber slurry of 0.1 percent consistency. Handsheets were made using the procedure described previously in Comparative Example 10. The resulting handsheets were evaluated for filtration efficiency by exposing the substrate to an aerosol of sodium chloride particles (number average diameter 0.075 micron, mass average diameter 0.26 micron). A filtration efficiency of 99.999 percent was measured. This data indicates that ULPA filtration efficiency can be obtained by utilizing the polymeric microfibers of the invention.

Comparative Example 31

Wet-laid hand sheets were prepared using the following procedure: 1.2 grams of MicroStrand 475-106 glass fiber and 0.8 grams of MicroStrand 475-110× glass fiber (both available from Johns Manville, Denver, Colo., USA) were added to 2,000 ml of water and agitated using a modified blender for 1 to 2 minutes to make a glass microfiber slurry of 0.1 percent consistency. Handsheets were made using the procedure described previously in Example 29.

Example 32

The wet-laid handsheets of Samples 2 and 3 from Example 29 and Comparative Example 31 were subjected to a calendaring process which involved passing the handsheets between two stainless steel rolls with a nip pressure of 300 pounds per linear inch. Due to the fragile nature of its 100 percent glass composition, the handsheets of Comparative Example 31 were destroyed in the calendaring process with the remaining sheet fragments turning essentially to glass powder with even minimal physical handling. The glass/polyester microfiber blends of Samples 2 and 3 from Example 29, when calendared, yielded very uniform nonwoven sheets with significant mechanical integrity and flexibility. It was observed that the calendared nonwoven sheet of Sample 2 of Example 29 was somewhat stronger than the calendared nonwoven sheet of Sample 3 of Example 29. These data suggests that very durable, high efficiency filtration media can be enabled by the polymeric microfibers of the invention.

Example 33

Handsheets of Sample 1 of Example 29 were mechanically densified by subjecting them to different pressures via a calendaring process. The effect of this densification is demonstrated below in Table 5 and clearly indicates that significant improvements to pore size and porosity can be made when the wet-laid substrates are calendared, which is a design feature which Example 32 indicates cannot be accomplished with media comprised of 100 percent glass fibers.

TABLE 5

| Sample | Calendar Pressure (psig) | Average pore size (microns) | Coresta porosity |
| --- | --- | --- | --- |
| 1 | 0 | 9.3 | —[2] |
| 2 | 100 | 7.6 | —[2] |
| 3 | 200 | 7.3 | —[2] |
| 4 | 400 | 4.5 | 268 |
| 5 | 500 | 3.9 | 176 |
| HEPA[1] | — | 3.9 | 255 |

[1]commercial HEPA filtration media
[2]could not be measured as samples did not fit test unit

Example 34

Wet-laid hand sheets were prepared using the following procedure: 0.4 grams of 3 denier per filament PET fibers cut to 12.7 millimeters and 1.6 grams of the polyester microfiber of Example 28 (dry fiber basis) were added to 2,000 ml of water and agitated using a modified blender for 1 to 2 minutes to make a microfiber slurry of 0.1 percent consistency. Handsheets were made using the procedure described previously in Comparative Example 10. A series of polymeric binders (as described in the table below) were applied to these handsheets at a rate of 7 percent binder based on the dry weight of nonwoven sheet. The binder-containing nonwoven sheets were dried in a forced air oven at 63° C. for 7 to 12 minutes and then heat-set at 120° C. for 3 minutes. The final basis weight of the binder-containing nonwoven sheets was 90 g/m². The data indicates the significant strength benefits to be obtained by combining a polymeric binder with the polymeric microfibers of the invention.

TABLE 6

| Sample | Polymer Binder | Dry Tensile (kg/15 mm) | Wet Tensile (kg/15 mm) | Tear Force[3] (grams) | Burst[4] (psig) | Hercules Size[5] (seconds) |
| --- | --- | --- | --- | --- | --- | --- |
| A | none | 0.6 | 0.6 | 201 | 5 | 4 |
| B | Synthomer 7100[1] | 1.3 | 0.8 | 411 | 47 | 2 |
| C | Eastek 1100[2] | 3.8 | 2.9 | 521 | 76 | 9 |
| D | Eastek 1200[2] | 3.5 | 3.2 | 516 | 82 | 150 |

[1]Synthomer 7100 is a styrenic latex binder supplied by Synthomer GmbH, Frankfurt, Germany
[2]Eastek 1100 and Eastek 1200 are sulfopolyester binder dispersions supplied by Eastman Chemical Company, Kingsport, TN, USA
[3]as measured by INDA/EDANA test method WSP 100.1 5
[4]as measured by INDA/EDANA test method WSP 110.5
[5]as measured by TAPPI test method T 530 OM07

Example 35

Samples C and D of Example 34 were reproduced with the addition to the sulfopolyester binder dispersion of triethyl citrate (TEC) as a plasticizer. The amount of TEC added to the sulfopolyester binder dispersion was 7.5 and 15 weight percent plasticizer based on total weight of sulfopolyester.

TABLE 7

| Sample | Polymer Binder | Dry Tensile (kg/15 mm) | Wet Tensile (kg/15 mm) | Tear Force[3] (grams) | Average Pore Size (microns) | Porosity |
| --- | --- | --- | --- | --- | --- | --- |
| A | Eastek 1100 | 3.8 | 2.9 | 521 | 12 | 596 |
| B | Eastek 1100 with | 2.7 | 2.5 | 641 | 6.4 | 660 |

TABLE 7-continued

| Sample | Polymer Binder | Dry Tensile (kg/15 mm) | Wet Tensile (kg/15 mm) | Tear Force[3] (grams) | Average Pore Size (microns) | Porosity |
|---|---|---|---|---|---|---|
| C | 7.5% TEC Eastek 1100 with 15% TEC | 2.3 | 2.6 | 546 | 8.8 | 664 |
| D | Eastek 1200 | 3.5 | 3.2 | 516 | 10 | 480 |
| E | Eastek 1200 with 7.5% TEC | 2.7 | 2.7 | 476 | 7.1 | 588 |
| F | Eastek 1200 with 15% TEC | 2.8 | 3.2 | 601 | 6.4 | 568 |

Example 36

Wet-laid handsheets were prepared as described for Sample D of Example 34 with the exception that the handsheets were not subjected to the heat-setting condition of 120° C. for three minutes.

Example 37

The handsheets of Example 35 and Sample D of Example 34 were subjected to the following test procedure in order to simulate a paper repulping process. Two liters of room temperature tap water were added to a 2 liter 3,000 rpm ¾ Hp hydropulper tri-rotor with 6 in diameter×10 in height brass pulper (manufactured by Hermann Manufacturing Company according to TAPPI 10 Standards). Two one-inch square samples of the nonwoven sheet to be tested were added to the water in the hydropulper. The squares were pulped for 500 revolutions at which time the hydropulper was stopped and the status of the squares of nonwoven sheet evaluated. If the squares were not completely disintegrated to their constituent fibers, the squares were pulped for an additional 500 revolutions, and re-evaluated. This process was continued until the squares had completely disintegrated to their constituent fibers at which time the test was concluded and the total number of revolutions was recorded. The nonwoven squares from Sample D of Example 34 had not completely disintegrated after 15,000 revolutions. The nonwoven squares of Example 34 were completely disintegrated to their constituent fibers after 5,000 revolutions. This data suggests that readily repulpable/recyclable nonwoven sheets can be prepared from the polymeric microfibers of the invention with the appropriate binder selection and heat treatment.

Example 38

The processes outlined in Examples 26-28 were modified by increasing the nominal denier of the bicomponent fiber of Example 26 such that the end result following the process steps of Examples 27 and 28 was a short-cut polyester microfiber with a diameter of 4.0 microns and a length of 1.5 mm. These short-cut microfibers were blended at varying ratios with the 2.2 micron diameter and 1.5 mm in length short cut microfibers described in Example 28. 80 gram per square meter handsheets were prepared from these microfiber blends as outlined in Example 29. The ability to predictably control both pore size and porosity of a wet-laid nonwoven by blending synthetic microfibers with different diameters is clearly demonstrated in the table below.

TABLE 8

| Sample[1] | Wt % 2.2 micron synthetic fiber[2] | Porosity | Average Pore Size (microns) |
|---|---|---|---|
| 1 | 20 | 1548 | 6.5 |
| 2 | 40 | 1280 | 8.2 |
| 3 | 60 | 1080 | 8.6 |
| 4 | 80 | 760 | 10.3 |
| 5 | 100 | 488 | 10.8 |

[1]80 gram per square meter handsheets with no binder
[2]synthetic microfibers of Example 28

Example 39

Following the procedure as outlined in Example 29, handsheets were prepared which comprised ternary mixtures of the synthetic polyester microfibers of Example 28, Lyocell nano-fibrillated cellulosic fibers, and T043 polyester fiber (a 7 micron diameter 5.0 mm in length PET fiber). The characteristics of these wet-laid nonwovens are described below.

TABLE 9

| Sample[1] | wt % synthetic microfiber | wt % Lyocell nano-fibrillated cellulosic fiber[2] | wt % T043 polyester fiber[3] | Tensile strength (kg/15 mm) | Burst (psig) |
|---|---|---|---|---|---|
| 1 | 40 | 60 | 0 | 15 | 2.0 |
| 2 | 40 | 55 | 5 | 15 | 2.6 |
| 3 | 40 | 40 | 20 | 38 | 3.1 |

[1]80 gram per square meter, 7percentSynthomer 7100 binder supplied by Synthomer GmbH, Frankfurt, Germany
[2]2.2 micron in diameter, 1.5 mm in length synthetic microfibers of Example 28
[3]Lenzing Example 40

Wet-laid hand sheets were prepared using the following procedure. 1.6 grams of the polyester microfiber of Example 28 and 0.4 grams of 3.0 dpf, ½ inch long PET staple fibers were added to 2,000 ml of water and agitated using a modified blender for 1 to 2 minutes in order to make a microfiber slurry of 0.1 percent consistency. The pulp slurry was poured into a 25 centimeters×30 centimeters hand sheet mold while continuing to stir. The drop valve was pulled, and the pulp fibers were allowed to drain on a screen to form a hand sheet. 750 grams per square meter (gsm) blotter paper was placed on top of the formed hand sheet, and the blotter paper was flattened onto the hand sheet. The screen frame was raised and inverted onto a clean release paper and allowed to sit for 10 minutes. The screen was raised vertically away from the formed hand sheet. Two sheets of 750 gsm blotter paper were placed on top of the formed hand sheet. The hand sheet was dried along with the three blotter papers using a Norwood Dryer at about 88° C. for 15 minutes. One blotter paper was removed leaving one blotter paper on each side of the hand sheet. The hand sheet was dried using a Williams Dryer at 65° C. for 15 minutes. The hand sheet was then further dried for 12 to 24 hours using a 40 kg dry press. The blotter paper was removed to obtain the dry hand sheet sample. The hand sheet was then trimmed for binder application.

The binding material was then added as follows. A powder-coated steel coating board (with dried latex layer) having greater than 45-dyne surface energy was used. One side of the formed handsheet was coated with binding material, and then the other side was coated with binding material. Using a syringe, dilution water was added to the area on the steel coating board corresponding to the size of the handsheet. Dilution water in an amount sufficient to fully but not excessively wet the first side of the handsheet was added to the steel coating board. Using a syringe, binding material in an amount based on the dry weight desired was added to the dilution water on the steel coating board. The amount of binding material added is a function of the density of the sheet. A lower density non-woven sheet generally requires a greater percentage of binding material than a higher density non-woven sheet. The total amount of binding material to be added was split, and fifty percent of the amount was added to the dilution water for the first side.

The dilution water and the binding material were then spread out to completely pool the correct-size area on the steel coating board. The handsheet was positioned over the correct size area and allowed to gently settle in the liquid to coat the first side. After 30-60 seconds of settling into the liquid, the handsheet was removed from the liquid.

Using a syringe, dilution water in an amount sufficient to fully but not excessively wet the second side of the handsheet was added to the correct size area on the steel coating board. Using a syringe, the remaining fifty percent of the binding material was added to the dilution water for the second side on the steel coating board. The dilution water and the binding material were then spread out to completely pool the correct size area on the steel coating board. The handsheet was inverted, positioned over the correct size area and allowed to gently settle in the liquid to coat the second side. After 60-180 seconds of settling into the liquid, the handsheet was removed from the liquid. A 12 mm glass lab rod was used to roll the binding material into the handsheet interior, as needed.

The coated handsheet was then placed on a sheet of foil-backed release paper on a tray. The coated handsheet, the foil-backed release paper and the tray were placed in a forced air oven at 145° F. for two minutes. The handsheet was then flipped and returned to the forced air oven at 145° F. The handsheet was then removed from the forced air oven, and a sheet of foil-backed release paper was placed on each side (i.e., the top and bottom) of the handsheet. The handsheet with a sheet of foil-backed release paper on each of the top and bottom was then placed in a Norwood handsheet dryer. The screen was locked and the handsheet with a sheet of foil-backed release paper on each of the top and bottom was dried at 250° F. for three minutes Utilizing the procedure outlined above, a series of aqueous dispersions of polymeric binders were applied handsheets comprised of the aforementioned 80/20 blend of synthetic polyester microfiber of Example 28 and 3 dpf, ½ inch PET fibers at a level to yield a 7% binder level (based on total weight of solid binder and fiber) in a 90 gram per square meter nonwoven. Both the polymeric binders and the characteristics of the nonwovens resulting from their application are described in Table 10 below.

TABLE 10

| Sample | Polymeric Binder | Tensile Strength (kg/15 mm) Dry | Tensile Strength (kg/15 mm) Wet | Tear Strength (grams) | Burst (psig) | Avg. Pore Size (microns) | Porosity |
|---|---|---|---|---|---|---|---|
| 1 (comp.) | none | 0.6 | 0.6 | 201 | 5 | 7.8 | 552 |
| 2 | Eastek 1100 [1] | 3.8 | 2.9 | 521 | 76 | 12.0 | 596 |
| 3 | Eastek 1200 [1] | 3.5 | 3.2 | 516 | 82 | 10.0 | 480 |
| 4 | Eastek 1400 [1] | 2.1 | 1.9 | 429 | 74 | 10.3 | 544 |
| 5 (comp.) | Synthomer 7100 [2] | 1.3 | 0.8 | 411 | 47 | 7.3 | 476 |

[1] sulfopolyester dispersions available from Eastman Chemical Company
[2] ABS latex available from Dow Chemical Company Example 41

Samples 2 and 3 of Example 40 were reproduced with the addition to the sulfopolyester binder dispersion of triethyl citrate (TEC) as a plasticizer. The amount of TEC added to the sulfopolyester binder dispersion was 7.5 and 15 weight percent plasticizer based on total weight of sulfopolyester. The characteristics of the resulting nonwoven handsheets are described in Table 11.

TABLE 11

| Sample | Polymer Binder | Dry Tensile (kg/15 mm) | Wet Tensile (kg/15 mm) | Tear Force (grams) | Average Pore Size (microns) | Porosity |
|---|---|---|---|---|---|---|
| 1 | Eastek 1100 | 3.8 | 2.9 | 521 | 12 | 596 |
| 2 | Eastek 1100 with 7.5% TEC | 2.7 | 2.5 | 641 | 6.4 | 660 |
| 3 | Eastek 1100 with 15% TEC | 2.3 | 2.6 | 546 | 8.8 | 664 |
| 4 | Eastek 1200 | 3.5 | 3.2 | 516 | 10 | 480 |
| 5 | Eastek 1200 with 7.5% TEC | 2.7 | 2.7 | 476 | 7.1 | 588 |
| 6 | Eastek 1200 with 15% TEC | 2.8 | 3.2 | 601 | 6.4 | 568 |

Example 42

Wet-laid handsheets were prepared as described for Sample 4 of Example 41 with the exception that the handsheets were not subjected to the heat-setting condition of 120° C. for three minutes.

Example 43

The handsheets of Example 42 and Sample 4 of Example 41 were subjected to the following test procedure in order to simulate a paper repulping process. Two liters of room temperature tap water were added to a 2 liter 3,000 rpm ¾ Hp hydropulper tri-rotor with 6 in diameter×10 in height brass pulper (manufactured by Hermann Manufacturing Company according to TAPPI 10 Standards). Two one-inch square samples of the nonwoven sheet to be tested were added to the water in the hydropulper. The squares were pulped for 500 revolutions at which time the hydropulper was stopped and the status of the squares of nonwoven sheet evaluated. If the squares were not completely disintegrated to their constituent fibers, the squares were pulped for an additional 500 revolutions, and re-evaluated. This process was continued until the squares had completely disintegrated to their constituent fibers at which time the test was concluded and the total number of revolutions was recorded. The nonwoven squares from Sample 4 of 41 had not completely disintegrated after 15,000 revolutions. The nonwoven squares of Example 42 were completely disintegrated to their constituent fibers after 5,000 revolutions. This data suggests that readily repulpable/recyclable nonwoven sheets can be prepared from the polymeric microfibers of the invention with the appropriate binder selection and heat treatment.

Example 44

Following the procedures outlined in Example 40, handsheets comprising 100% of the synthetic polyester microfiber of Example 28 were prepared and aqueous dispersions of polymer binders were applied to the handsheets at varying rates to yield final nonwoven articles with a basis weight of 80 grams per square meter. Both the polymeric binders and the characteristics of the nonwovens resulting from their application are described in Table 12 below.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A wet-laid process to produce a bound nonwoven article, said wet-laid process comprising:
    (a) melt spinning multicomponent fibers comprising at least one water dispersible sulfopolyester and one or more water non-dispersible polymers immiscible with said sulfopolyester, wherein said multicomponent fibers have a striped configuration and an as-spun denier of less than 15 dpf;
    (b) cutting said multicomponent fibers into cut multicomponent fibers having a length of less than 25 millimeters;
    (c) contacting said cut multicomponent fibers with water to remove said sulfopolyester thereby forming a wet lap comprising cut water non-dispersible fibers, wherein said cut water non-dispersible fibers are formed of a thermoplastic polycondensate, wherein said cut water non-dispersible fibers comprise ribbon fibers having a transverse aspect ratio of at least 2:1 and not more than 100:1;
    (d) transferring said wet lap to a wet-laid nonwoven zone to produce an unbound nonwoven article; and
    (e) applying a binder dispersion comprising at least one sulfopolyester binder to said nonwoven article; wherein said sulfopolyester binder contains substantially equimolar proportions of acid moiety repeating units (100 mole percent) to hydroxy moiety repeating units (100 mole percent), wherein said sulfopolyester binder comprises repeating units of components (i), (ii), (iii), and (iv) as follows, wherein all stated mole percentages are based on the total of all acid and hydroxy moiety repeating units being equal to 200 mole percent:

TABLE 12

| Sample | Polymeric Binder and % | Tensile Strength (kg/15 mm) Dry | Tensile Strength (kg/15 mm) Wet | Tear Strength (grams) | Burst (psig) | Avg. Pore Size (microns) | Porosity |
|---|---|---|---|---|---|---|---|
| 1 (comp.) | none | 0.1 | 0.2 | 50 | 2 | 6.9 | 574 |
| 2 | Eastek 1100 - 7.5% [1] | 2.6 | 1.1 | 332 | 49 | 6.6 | 460 |
| 3 | Eastek 1100 - 15.0% [1] | 3.4 | 2.2 | 225 | 54 | 7.0 | 489 |
| 4 | Eastek 1100 - 22.5% [1] | 4.7 | 3.7 | 189 | 54 | 7.3 | 329 |
| 5 | Eastek 1200 - 7.5% [1] | 2.0 | 1.4 | 288 | 37 | 6.3 | 576 |
| 6 | Eastek 1200 - 15.0% [1] | 4.2 | 3.0 | 201 | 46 | 6.4 | 393 |
| 7 | Eastek 1200 - 22.5% [1] | 4.6 | 5.0 | 175 | 42 | 10.0 | 357 |
| 8 (comp.) | Synthomer 7100 - 7.5% [2] | 0.9 | 1.1 | 237 | 10 | 5.9 | 409 |
| 9 (comp.) | Synthomer 7100 - 22.5% [2] | 1.2 | 1.8 | 315 | 51 | 6.2 | 353 |
| 10 (comp.) | Lubrizol 26469 - 7.5% [3] | 0.8 | 0.5 | 226 | 10 | 7.3 | 500 |
| 11 (comp.) | Lubrizol 26469 - 15.0% [3] | 1.0 | 0.5 | 338 | 17 | 6.8 | 471 |
| 12 (comp.) | Lubrizol 26469 - 22.5% [3] | 1.4 | 0.7 | 333 | 25 | 6.8 | 412 |

[1] sulfopolyester dispersions available from Eastman Chemical Company
[2] ABS latex available from Dow Chemical Company
[3] acrylic latex available from Lubrizol Corporation i. at least 50 mole percent and not more than 99 mole percent of isophthalic acid, ii. at least 1 mole percent and not more than 50 mole percent of 5-sulfoisophthalic acid, iii. at least 20 mole percent and not more than 95 mole percent of 1,4-cyclohexanedimethanol, and iv. at least 5 mole percent and not more than 80 mole percent of diethylene glycol and/or ethylene glycol.

2. The wet-laid process of claim 1, wherein said cut multicomponent fibers have a length of at least 0.25 millimeters and not more than 25 millimeters.

3. The wet-laid process of claim 1, wherein said bound nonwoven article comprises said sulfopolyester binder in an amount of at least 1 weight percent and not more than 40 weight percent.

4. The wet-laid process of claim 1, further comprising, subsequent to said applying of step (e), subjecting said nonwoven article and binder dispersion to heat setting.

5. The wet-laid process of claim 1, further comprising, prior to said transferring of step (d), adding additional fibers and/or additives to said wet lap.

6. The wet-laid process of claim 5, wherein said additional fibers are selected from the group consisting of cellulosic fiber pulp, inorganic fibers, polyester fibers, nylon fibers, polyolefin fibers, rayon fibers, lyocell fibers, cellulose ester fibers, and combinations thereof.

7. The wet-laid process of claim 5, wherein said nonwoven article comprises said additional fibers in an amount of at least 10 weight percent and not more than 80 weight percent, wherein said nonwoven article comprises said cut water non-dispersible fibers in an amount of at least 20 weight percent and not more than 90 weight percent, wherein said bound nonwoven article comprises said sulfopolyester binder in an amount of at least 1 weight percent and not more than 40 weight percent.

8. The wet-laid process of claim 1, wherein said nonwoven article is selected from the group consisting of a battery separator, a high efficiency filter, and a high strength paper.

9. The wet-laid process of claim 5, wherein said nonwoven article comprises said additional fibers in an amount of at least 20 weight percent and not more than 95 weight percent, wherein said nonwoven article comprises said cut water non-dispersible fibers in an amount of at least 1 weight percent and not more than 25 weight percent, wherein said nonwoven article comprises said sulfopolyester binder in an amount of at least 1 weight percent and not more than 40 weight percent.

10. The wet-laid process of claim 1, further comprising, subsequent to said applying of step (e), drying said nonwoven article and binder dispersion.

11. The wet-laid process of claim 1, further comprising, subsequent to said applying of step (e), applying a coating to said nonwoven article and binder dispersion.

12. The wet-laid process of claim 11, further comprising, prior to said applying a coating, drying said nonwoven article and binder dispersion.

13. The wet-laid process of claim 1, wherein said binder dispersion comprises a blend of at least a first sulfopolyester and a second sulfopolyester, wherein said first sulfopolyester or said second sulfopolyester comprise said sulfopolyester binder.

14. The wet-laid process of claim 13, wherein said first and second sulfopolyesters comprise different amounts of a sulfomonomer.

15. The wet-laid process of claim 14, wherein said sulfomonomer is 5-sulfoisophthalic acid.

16. The wet-laid process of claim 13, wherein said first and second sulfopolyesters comprise different amounts of a hydrophobic glycol.

17. The wet-laid process of claim 16, wherein said hydrophobic glycol is 1,4-cyclohexanedimethanol.

18. The wet-laid process of claim 13, wherein said first sulfopolyester is hydrophilic and said second sulfopolyester is hydrophobic.

19. The wet-laid process of claim 13, wherein said first sulfopolyester comprises repeating units of components (a), (b), (c) and (d) as follows, wherein all stated mole percentages are based on the total of all acid and hydroxy moiety repeating units being equal to 200 mole percent:

(a) at least 70 mole percent and not more than 90 mole percent of isophthalic acid, (b) at least 10 mole percent and not more than 30 mole percent of 5-sulfoisophthalic acid, (c) at least 25 mole percent and not more than 70 mole percent of 1,4-cyclohexanedimethanol; and (d) at least 30 mole percent and not more than 75 mole percent of diethylene glycol and/or ethylene glycol and;

wherein said second sulfopolyester comprises repeating units of components (a), (b), (c) and (d) as follows, wherein all stated mole percentages are based on the total of all acid and hydroxy moiety repeating units being equal to 200 mole percent:

(a) at least 80 mole percent and not more than 98 mole percent of isophthalic acid, (b) at least 2 mole percent and not more than 20 mole percent of 5-sulfoisophthalic acid, (c) at least 50 mole percent and not more than 95 mole percent of 1,4-cyclohexanedimethanol; and (d) at least 5 mole percent and not more than 50 mole percent of diethylene glycol and/or ethylene glycol.

20. The wet-laid process of claim 1, wherein the major transverse axis of at least 75 weight percent of said ribbon fibers in said bound nonwoven article are oriented at an angle of less than 30 degrees from the nearest surface of said bound nonwoven article.

* * * * *